United States Patent
Tsai et al.

(10) Patent No.: US 8,482,863 B2
(45) Date of Patent: Jul. 9, 2013

(54) IMAGERY OPTICAL SYSTEM

(75) Inventors: Tsung-Han Tsai, Taichung (TW); Hsin-Hsuan Huang, Taichung (TW)

(73) Assignee: Largan Precision Co., Taichung (TW)

( * ) Notice: Subject to any disclaimer, the term of this patent is extended or adjusted under 35 U.S.C. 154(b) by 147 days.

(21) Appl. No.: 13/182,853

(22) Filed: Jul. 14, 2011

(65) Prior Publication Data

US 2012/0154929 A1    Jun. 21, 2012

(30) Foreign Application Priority Data

Dec. 15, 2010  (TW) ............................... 99143882 A

(51) Int. Cl.
*G02B 9/60* (2006.01)
*G02B 3/02* (2006.01)
*G02B 13/18* (2006.01)

(52) U.S. Cl.
USPC .......................................... 359/714; 359/767

(58) Field of Classification Search
CPC ... G02B 3/02; G02B 13/02; G02B 9/00; G02B 9/60; G02B 9/62; G02B 9/64
USPC ................. 359/708, 713, 714, 754–757, 759, 359/760, 763, 764, 767–769
See application file for complete search history.

(56) References Cited

U.S. PATENT DOCUMENTS

| 7,443,610 B1* | 10/2008 | Lin et al. ........................ 359/714 |
| 7,710,665 B2 | 5/2010 | Park et al. |
| 7,826,151 B2 | 11/2010 | Tsai |
| 2003/0117722 A1 | 6/2003 | Chen |
| 2004/0196571 A1 | 10/2004 | Shinohara |
| 2010/0053776 A1* | 3/2010 | Tanaka et al. ................. 359/793 |
| 2010/0253829 A1 | 10/2010 | Shinohara |
| 2010/0254029 A1 | 10/2010 | Shinohara |

FOREIGN PATENT DOCUMENTS

| JP | 2003131136 A | 5/2003 |
| JP | 2003161879 A | 6/2003 |
| JP | 2003185917 A | 7/2003 |
| JP | 2005266771 A | 9/2005 |
| JP | 2006293042 A | 10/2006 |
| TW | M313246 | 6/2007 |
| TW | M313781 | 6/2007 |
| TW | M332199 | 5/2008 |
| TW | 201022714 | 6/2010 |
| TW | 201038966 | 11/2010 |

* cited by examiner

*Primary Examiner* — Darryl J Collins

(74) *Attorney, Agent, or Firm* — Wang Law Firm, Inc.; Li K. Wang; Stephen Hsu

(57) ABSTRACT

An imagery optical system, sequentially from an object side to an image side on an optical axis comprising: the first lens element with positive refractive power, the second lens element with positive refractive power, the third lens element, the fourth lens element, and the fifth lens element having at least one inflection point. Each of the five lens elements may be made of plastic and comes with bi-aspheric surfaces. The imagery optical system satisfies conditions related to shorten the total length and to reduce the sensitivity for use in compact cameras and mobile phones with a camera function.

26 Claims, 45 Drawing Sheets

Table 1
(Embodiment 1)
f = 3.86 mm, Fno = 2.40, HFOV = 36.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.541300 (ASP) | 0.445 | Plastic | 1.544 | 55.9 | 2.82 |
| 2 | | -2.580720 (ASP) | -0.109 | | | | |
| 3 | Ape. Stop | Plano | 0.189 | | | | |
| 4 | Lens 2 | -1.879180 (ASP) | 0.370 | Plastic | 1.544 | 55.9 | 18.20 |
| 5 | | -1.689100 (ASP) | 0.070 | | | | |
| 6 | Lens 3 | -19.084000 (ASP) | 0.274 | Plastic | 1.650 | 21.4 | -4.48 |
| 7 | | 3.454900 (ASP) | 0.984 | | | | |
| 8 | Lens 4 | -3.793200 (ASP) | 0.797 | Plastic | 1.544 | 55.9 | 2.13 |
| 9 | | -0.953970 (ASP) | 0.350 | | | | |
| 10 | Lens 5 | -2.381700 (ASP) | 0.429 | Plastic | 1.530 | 55.8 | -2.10 |
| 11 | | 2.219150 (ASP) | 0.700 | | | | |
| 12 | IR-filter | Plano | 0.300 | Glass | 1.517 | 64.2 | - |
| 13 | | Plano | 0.405 | | | | |
| 14 | Image | Plano | - | | | | |

Note: Reference wavelength is d-line 587.6 nm. ASP stands for aspherical surfaces.

FIG. 12

Table 2
Aspheric Coefficients

| Surface # | 1 | 2 | 4 | 5 | 6 |
|---|---|---|---|---|---|
| k = | -1.05281E+01 | -1.00000E+01 | -8.80257E+00 | -1.21026E+01 | -3.00000E+01 |
| A4 = | -5.59420E-02 | -6.17040E-02 | 1.04574E-01 | 3.23807E-02 | -9.20680E-02 |
| A6 = | -4.85504E-02 | 1.70850E-02 | 6.94599E-02 | -6.21152E-02 | -3.48280E-02 |
| A8 = | -1.23441E-01 | 4.30957E-03 | -2.37400E-02 | 2.93128E-02 | -2.74204E-02 |
| A10 = | 1.36142E-01 | -1.01810E-01 | -6.53466E-02 | -3.32650E-03 | 5.69288E-02 |
| A12 = | -6.16192E-02 | 5.51693E-02 | 2.00451E-02 | -2.83201E-02 | -3.29767E-02 |

| Surface # | 7 | 8 | 9 | 10 | 11 |
|---|---|---|---|---|---|
| k = | -7.29336E+01 | 6.40300E+00 | -1.50600E+00 | 0.00000E+00 | -1.00000E+00 |
| A4 = | -5.92369E-02 | -1.79431E-01 | -3.39616E-02 | 9.63075E-02 | -9.04018E-02 |
| A6 = | -2.08993E-02 | 1.00679E-01 | -1.12404E-02 | -3.02165E-02 | 2.19297E-02 |
| A8 = | -4.97261E-03 | -2.25678E-02 | 1.09327E-02 | 7.87622E-03 | -4.11762E-03 |
| A10= | 6.48674E-03 | -2.53676E-04 | 4.04572E-03 | -1.03047E-03 | 4.33414E-04 |
| A12 = | -3.40359E-03 | -1.74351E-03 | -1.09499E-04 | 3.25225E-05 | -1.48251E-05 |
| A14 = |  |  | -3.63802E-04 | 3.55085E-06 | -9.22089E-07 |

FIG. 13

Table 3

Embodiment 2
f = 3.48 mm, Fno = 2.40, HFOV = 38.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.203800 (ASP) | 0.390 | Plastic | 1.544 | 55.9 | 4.64 |
| 2 | | -11.411300 (ASP) | -0.066 | | | | |
| 3 | Ape. Stop | Plano | 0.276 | | | | |
| 4 | Lens 2 | -3.513500 (ASP) | 0.363 | Plastic | 1.544 | 55.9 | 4.57 |
| 5 | | -1.509750 (ASP) | 0.070 | | | | |
| 6 | Lens 3 | 4.693200 (ASP) | 0.280 | Plastic | 1.634 | 23.8 | -3.62 |
| 7 | | 1.505710 (ASP) | 0.570 | | | | |
| 8 | Lens 4 | -1.756120 (ASP) | 0.783 | Plastic | 1.544 | 55.9 | 3.78 |
| 9 | | -1.095500 (ASP) | 0.320 | | | | |
| 10 | Lens 5 | 3.621800 (ASP) | 0.814 | Plastic | 1.634 | 23.8 | -6.82 |
| 11 | | 1.799550 (ASP) | 0.700 | | | | |
| 12 | IR-filter | Plano | 0.300 | Glass | 1.517 | 64.2 | - |
| 13 | | Plano | 0.403 | | | | |
| 14 | Image | Plano | - | | | | |

Note: Reference wavelength is d-line 587.6 nm. ASP stands for aspherical surfaces.

FIG. 14

Table 4
Aspheric Coefficients

| Surface # | 1 | 2 | 4 | 5 | 6 |
|---|---|---|---|---|---|
| k = | -1.09908E+01 | 2.98832E+00 | -1.38627E+00 | -1.05058E+01 | -1.05725E+01 |
| A4 = | -5.77532E-02 | -1.55024E-01 | 3.04616E-02 | 1.45145E-03 | -9.98864E-02 |
| A6 = | -7.14889E-02 | -7.67370E-02 | 3.43982E-02 | 3.55222E-02 | -3.88338E-02 |
| A8 = | -1.45295E-01 | 3.70670E-02 | 1.15610E-01 | 1.05778E-01 | -5.21087E-02 |
| A10 = | 1.02214E-01 | -8.98762E-03 | -3.41912E-02 | -1.28928E-01 | 9.89030E-02 |
| A12 = | -5.61821E-02 | -2.46654E-03 | -1.12640E-02 | 6.62929E-02 | -3.95097E-02 |

| Surface # | 7 | 8 | 9 | 10 | 11 |
|---|---|---|---|---|---|
| k = | -1.22311E+01 | 6.30931E-01 | -1.01676E+00 | -1.00000E+00 | -1.00000E+00 |
| A4 = | 1.25006E-02 | -1.95880E-02 | -6.35210E-03 | -2.55697E-02 | -9.29755E-02 |
| A6 = | -5.38884E-02 | 1.48912E-01 | 6.15116E-03 | -5.84849E-03 | 2.16114E-02 |
| A8 = | 6.94320E-03 | -4.41276E-02 | 1.29731E-03 | 4.35633E-03 | -3.96735E-03 |
| A10= | 2.56632E-02 | 2.19014E-04 | 1.83183E-03 | -1.07644E-03 | 4.62610E-04 |
| A12 = | -1.30819E-02 | 3.99109E-03 | 6.05981E-04 | 1.19088E-04 | -3.17653E-05 |
| A14 = | | | 2.06125E-04 | -4.95595E-06 | 9.23144E-07 |

FIG. 15

Table 5

Embodiment 3 f = 3.84 mm, Fno = 2.40, HFOV = 36.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.076 | | | | |
| 2 | Lens 1 | 2.500620 (ASP) | 0.486 | Plastic | 1.544 | 55.9 | 4.12 |
| 3 | | -20.286500 (ASP) | 0.100 | | | | |
| 4 | Lens 2 | -4.233700 (ASP) | 0.369 | Plastic | 1.544 | 55.9 | 8.94 |
| 5 | | -2.332830 (ASP) | 0.070 | | | | |
| 6 | Lens 3 | 8.158500 (ASP) | 0.311 | Plastic | 1.632 | 23.4 | -4.75 |
| 7 | | 2.162120 (ASP) | 0.819 | | | | |
| 8 | Lens 4 | -4.200500 (ASP) | 0.733 | Plastic | 1.544 | 55.9 | 2.16 |
| 9 | | -0.975410 (ASP) | 0.437 | | | | |
| 10 | Lens 5 | -2.432260 (ASP) | 0.350 | Plastic | 1.530 | 55.8 | -2.31 |
| 11 | | 2.588280 (ASP) | 0.700 | | | | |
| 12 | IR-filter | Plano | 0.300 | Glass | 1.517 | 64.2 | - |
| 13 | | Plano | 0.429 | | | | |
| 14 | Image | Plano | - | | | | |

Note: Reference wavelength is d-line 587.6 nm. ASP stands for aspherical surfaces.

FIG. 16

Table 6
Aspheric Coefficients

| Surface # | 2 | 3 | 4 | 5 | 6 |
|---|---|---|---|---|---|
| k = | -2.36025E+00 | -7.97081E+00 | 1.93217E+00 | -1.81668E+01 | -1.00000E+00 |
| A4 = | -2.62585E-02 | -6.24736E-02 | 7.35490E-02 | 1.98702E-02 | -1.31360E-01 |
| A6 = | 1.37830E-02 | -1.04760E-02 | 1.95440E-02 | -5.58527E-02 | -5.40429E-02 |
| A8 = | -1.25218E-01 | -3.32391E-03 | -5.20592E-02 | 3.37180E-02 | -2.63768E-02 |
| A10 = | 1.25309E-01 | -8.84133E-02 | -1.22560E-02 | -6.85979E-03 | 8.29672E-02 |
| A12 = | -8.75630E-02 | 3.37164E-02 | 6.13528E-03 | -8.48154E-03 | -2.25164E-02 |

| Surface # | 7 | 8 | 9 | 10 | 11 |
|---|---|---|---|---|---|
| k = | -1.50000E+01 | 5.31257E+00 | -1.44837E+00 | 0.00000E+00 | -1.00000E+00 |
| A4 = | -5.47245E-02 | -1.39765E-01 | -2.46135E-02 | 9.06341E-02 | -8.95180E-02 |
| A6 = | -2.37773E-02 | 1.09936E-01 | -6.43186E-03 | -3.33728E-02 | 2.06369E-02 |
| A8 = | -1.33671E-03 | -2.75527E-02 | 1.31952E-02 | 7.78582E-03 | -4.38052E-03 |
| A10= | 8.46797E-03 | -6.14322E-04 | 4.22606E-03 | -9.30590E-04 | 4.56470E-04 |
| A12 = | -1.60325E-03 | -1.37017E-03 | -3.28959E-04 | 5.24080E-05 | -1.17927E-05 |
| A14 = | | | -4.27118E-04 | 3.78897E-07 | -1.22717E-06 |

FIG. 17

Table 7

Embodiment 4 f = 3.62 mm, Fno = 2.50, HFOV = 38.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.162 | | | | |
| 2 | Lens 1 | 1.322010 (ASP) | 0.375 | Plastic | 1.544 | 55.9 | 8.69 |
| 3 | | 1.651690 (ASP) | 0.211 | | | | |
| 4 | Lens 2 | 15.723300 (ASP) | 0.366 | Plastic | 1.544 | 55.9 | 3.15 |
| 5 | | -1.906570 (ASP) | 0.050 | | | | |
| 6 | Lens 3 | 1.846630 (ASP) | 0.252 | Plastic | 1.632 | 23.4 | -5.09 |
| 7 | | 1.111250 (ASP) | 0.403 | | | | |
| 8 | Lens 4 | -1.651410 (ASP) | 0.503 | Plastic | 1.544 | 55.9 | 4.76 |
| 9 | | -1.116530 (ASP) | 0.453 | | | | |
| 10 | Lens 5 | -9.749400 (ASP) | 0.687 | Plastic | 1.632 | 23.4 | -4.91 |
| 11 | | 4.681000 (ASP) | 0.400 | | | | |
| 12 | IR-filter | Plano | 0.300 | Glass | 1.517 | 64.2 | - |
| 13 | | Plano | 0.507 | | | | |
| 14 | Image | Plano | - | | | | |

Note: Reference wavelength is d-line 587.6 nm. ASP stands for aspherical surfaces.

FIG. 18

Table 8
Aspheric Coefficients

| Surface # | 2 | 3 | 4 | 5 | 6 |
|---|---|---|---|---|---|
| k =  | -1.00462E+00 | -2.03900E+00 | 3.00000E+00 | -2.62452E+00 | -1.00000E+00 |
| A4 = | -7.30229E-03 | -5.25992E-02 | -7.33735E-02 | -1.86399E-03 | -2.54310E-01 |
| A6 = | 2.02652E-02 | -9.34681E-02 | -6.32841E-02 | 1.66166E-02 | 1.25104E-01 |
| A8 = | -3.14254E-01 | -1.29174E-01 | 2.68840E-01 | 2.43457E-01 | -1.51752E-01 |
| A10 = | 4.59421E-01 | -4.04803E-01 | 9.85308E-02 | 3.10452E-01 | 2.19354E-01 |
| A12 = | -4.86679E-01 | 4.19815E-01 | -7.30392E-02 | -1.11368E-01 | -1.99169E-01 |

| Surface # | 7 | 8 | 9 | 10 | 11 |
|---|---|---|---|---|---|
| k = | -3.59500E+00 | 5.67026E-01 | -1.73142E+00 | 0.00000E+00 | -1.00000E+00 |
| A4 = | -6.09190E-02 | 1.59373E-01 | 6.72034E-02 | 3.99136E-02 | -6.41182E-02 |
| A6 = | -1.19608E-02 | 2.22152E-01 | 6.64679E-02 | -3.69809E-02 | 1.74524E-02 |
| A8 = | 3.62977E-02 | -8.54833E-02 | 9.23300E-03 | 1.26629E-02 | -5.49656E-03 |
| A10= | -3.12707E-02 | -4.99167E-02 | -1.05904E-02 | -1.39231E-03 | 8.32861E-04 |
| A12 = | 1.51488E-03 | 2.80118E-02 | -3.96401E-03 | -1.10506E-04 | -1.95921E-05 |
| A14 = | | | 1.40249E-03 | 2.32228E-05 | -4.86132E-06 |

FIG. 19

Table 9

Embodiment 5 f = 4.32 mm, Fno = 2.80, HFOV = 33.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.572450 (ASP) | 0.350 | Plastic | 1.544 | 55.9 | 8.01 |
| 2 | | 5.978200 (ASP) | 0.037 | | | | |
| 3 | Ape. Stop | Plano | 0.027 | | | | |
| 4 | Lens 2 | 12.478700 (ASP) | 0.412 | Plastic | 1.544 | 55.9 | 4.72 |
| 5 | | -3.197800 (ASP) | 0.050 | | | | |
| 6 | Lens 3 | 6.114300 (ASP) | 0.375 | Plastic | 1.632 | 23.4 | -5.21 |
| 7 | | 2.089780 (ASP) | 1.007 | | | | |
| 8 | Lens 4 | -3.597600 (ASP) | 0.947 | Plastic | 1.544 | 55.9 | 2.61 |
| 9 | | -1.112400 (ASP) | 0.636 | | | | |
| 10 | Lens 5 | -2.412370 (ASP) | 0.350 | Plastic | 1.544 | 55.9 | -2.45 |
| 11 | | 3.144200 (ASP) | 0.700 | | | | |
| 12 | IR-filter | Plano | 0.300 | Glass | 1.517 | 64.2 | - |
| 13 | | Plano | 0.301 | | | | |
| 14 | Image | Plano | - | | | | |

Note: Reference wavelength is d-line 587.6 nm. ASP stands for aspherical surfaces.

FIG. 20

Table 10
Aspheric Coefficients

| Surface # | 1 | 2 | 4 | 5 | 6 |
|---|---|---|---|---|---|
| k = | -6.82631E+00 | -5.00000E+01 | 1.00000E+01 | -6.23505E+00 | -4.68455E+01 |
| A4 = | -2.81616E-02 | -1.08636E-01 | -5.51301E-03 | 4.34339E-02 | -8.08802E-02 |
| A6 = | -6.13050E-02 | -6.80178E-02 | 4.34952E-02 | -1.60565E-03 | -5.09937E-03 |
| A8 = | -5.80286E-02 | 2.85017E-02 | 3.30063E-02 | 4.02226E-02 | 3.98852E-03 |
| A10 = | 1.12262E-02 | 6.76795E-03 | 3.49351E-02 | -1.72279E-04 | 4.01410E-02 |
| A12 = | 1.32001E-02 | -7.44039E-03 | -4.14487E-02 | -8.11519E-03 | -2.08528E-02 |

| Surface # | 7 | 8 | 9 | 10 | 11 |
|---|---|---|---|---|---|
| k = | -8.09083E+00 | 6.53423E+00 | -1.28354E+00 | 0.00000E+00 | -1.00000E+00 |
| A4 = | -3.00005E-02 | -7.38253E-02 | -3.25669E-03 | 7.72615E-02 | -5.51995E-02 |
| A6 = | 1.68879E-03 | 3.64203E-02 | -7.72935E-03 | -2.26903E-02 | 1.20051E-02 |
| A8 = | 5.88219E-03 | -1.72670E-02 | -2.33818E-03 | 6.50550E-03 | -2.08099E-03 |
| A10= | 9.11524E-03 | 8.60574E-04 | 1.01432E-03 | -9.84144E-04 | 2.30261E-04 |
| A12 = | -5.64398E-03 | 1.60154E-03 | 5.16375E-05 | 5.97265E-05 | -1.35387E-05 |

FIG. 21

Table 11

Embodiment 6
f = 3.77 mm, Fno = 2.40, HFOV = 36.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.323000 (ASP) | 0.406 | Plastic | 1.544 | 55.9 | 3.75 |
| 2 | | -5.047800 (ASP) | -0.091 | | | | |
| 3 | Ape. Stop | Plano | 0.194 | | | | |
| 4 | Lens 2 | -2.662480 (ASP) | 0.374 | Plastic | 1.544 | 55.9 | 8.61 |
| 5 | | -1.782070 (ASP) | 0.070 | | | | |
| 6 | Lens 3 | 2.259360 (ASP) | 0.260 | Plastic | 1.634 | 23.8 | -4.61 |
| 7 | | 1.217550 (ASP) | 0.692 | | | | |
| 8 | Lens 4 | -1.838520 (ASP) | 0.723 | Plastic | 1.544 | 55.9 | 3.63 |
| 9 | | -1.084700 (ASP) | 0.454 | | | | |
| 10 | Lens 5 | 9.363400 (ASP) | 0.717 | Plastic | 1.583 | 30.2 | -4.95 |
| 11 | | 2.145390 (ASP) | 0.700 | | | | |
| 12 | IR-filter | Plano | 0.300 | Glass | 1.517 | 64.2 | - |
| 13 | | Plano | 0.403 | | | | |
| 14 | Image | Plano | - | | | | |

Note: Reference wavelength is d-line 587.6 nm. ASP stands for aspherical surfaces.

FIG. 22

Table 12
Aspheric Coefficients

| Surface # | 1 | 2 | 4 | 5 | 6 |
|---|---|---|---|---|---|
| k = | -9.36872E+00 | 3.00000E+00 | -9.32075E+00 | -8.95160E+00 | -1.76168E+01 |
| A4 = | -7.23454E-02 | -1.29499E-01 | 7.19056E-02 | 5.86339E-02 | -9.66330E-02 |
| A6 = | -6.86408E-02 | 5.51780E-02 | 1.02981E-01 | -4.41871E-02 | -6.69938E-02 |
| A8 = | -1.25296E-01 | -3.50968E-03 | 5.88774E-02 | 3.76891E-02 | -1.45792E-02 |
| A10 = | 1.05255E-01 | -7.11357E-02 | -1.27570E-01 | 6.35285E-03 | 1.25481E-01 |
| A12 = | -1.58810E-02 | 4.10677E-02 | 6.30173E-02 | 1.61128E-02 | -6.07445E-02 |

| Surface # | 7 | 8 | 9 | 10 | 11 |
|---|---|---|---|---|---|
| k = | -6.77067E+00 | 8.61038E-01 | -1.27070E+00 | -1.00000E+00 | -1.00000E+00 |
| A4 = | -2.40897E-02 | 5.07373E-03 | -8.91701E-03 | -2.47466E-02 | -1.00568E-01 |
| A6 = | -3.80411E-02 | 6.62126E-02 | -1.13281E-02 | -1.30317E-02 | 2.35126E-02 |
| A8 = | 1.73416E-02 | -2.36863E-02 | 1.99955E-03 | 6.71528E-03 | -5.16014E-03 |
| A10 = | 2.34465E-02 | 1.63951E-02 | 2.13119E-03 | -1.32645E-03 | 6.43820E-04 |
| A12 = | -1.64141E-02 | -1.66975E-03 | 1.15222E-03 | 7.70928E-05 | -3.19732E-05 |
| A14 = | | | 7.51747E-04 | 3.90109E-06 | -4.73260E-07 |

FIG. 23

Table 13

Embodiment 7
f = 3.89 mm, Fno = 2.40, HFOV = 36.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.143 | | | | |
| 2 | Lens 1 | 1.854440 (ASP) | 0.494 | Plastic | 1.544 | 55.9 | 4.73 |
| 3 | | 6.018300 (ASP) | 0.100 | | | | |
| 4 | Lens 2 | -10.424500 (ASP) | 0.302 | Plastic | 1.544 | 55.9 | 8.26 |
| 5 | | -3.173500 (ASP) | 0.070 | | | | |
| 6 | Lens 3 | 7.355500 (ASP) | 0.262 | Plastic | 1.632 | 23.4 | -5.26 |
| 7 | | 2.258610 (ASP) | 0.746 | | | | |
| 8 | Lens 4 | -3.920900 (ASP) | 0.673 | Plastic | 1.544 | 55.9 | 2.48 |
| 9 | | -1.065910 (ASP) | 0.533 | | | | |
| 10 | Lens 5 | -3.284100 (ASP) | 0.320 | Plastic | 1.530 | 55.8 | -2.70 |
| 11 | | 2.616780 (ASP) | 0.700 | | | | |
| 12 | IR-filter | Plano | 0.300 | Glass | 1.517 | 64.2 | - |
| 13 | | Plano | 0.402 | | | | |
| 14 | Image | Plano | - | | | | |

Note: Reference wavelength is d-line 587.6 nm. ASP stands for aspherical surfaces.

FIG. 24

Table 14
Aspheric Coefficients

| Surface # | 2 | 3 | 4 | 5 | 6 |
|---|---|---|---|---|---|
| k = | -5.91027E-01 | -1.28512E+01 | 1.00000E+01 | -2.70095E+01 | -1.00000E+00 |
| A4 = | -1.04951E-02 | -7.38397E-02 | 2.78725E-02 | 3.49590E-02 | -1.97335E-01 |
| A6 = | 1.15134E-02 | -1.47923E-02 | 1.41008E-02 | -7.21834E-02 | -7.95898E-02 |
| A8 = | -1.14318E-01 | -7.99880E-02 | -3.19769E-02 | 5.57232E-02 | -5.39478E-02 |
| A10 = | 1.64825E-01 | -6.81571E-02 | -6.25327E-02 | 2.03272E-02 | 8.19219E-02 |
| A12 = | -1.49370E-01 | 5.13404E-02 | 6.60823E-02 | -8.27604E-03 | 3.75539E-02 |

| Surface # | 7 | 8 | 9 | 10 | 11 |
|---|---|---|---|---|---|
| k = | -1.50000E+01 | 8.85156E+00 | -1.46214E+00 | 0.000000E+00 | -1.00000E+00 |
| A4 = | -9.29509E-02 | -7.16015E-02 | -4.93124E-03 | 6.05524E-02 | -8.72519E-02 |
| A6 = | -3.95069E-02 | 1.01849E-01 | 2.44547E-03 | -2.83245E-02 | 2.26359E-02 |
| A8 = | 1.03962E-03 | -3.83497E-02 | 1.27143E-02 | 8.05452E-03 | -4.91865E-03 |
| A10= | 3.25749E-02 | 2.49347E-04 | 2.52007E-03 | -1.00101E-03 | 5.02703E-04 |
| A12 = | -8.36544E-03 | 1.49079E-03 | -8.59689E-04 | 3.87955E-05 | -7.64745E-06 |
| A14 = |  |  | -3.84459E-04 | 8.98373E-07 | -1.32628E-06 |

FIG. 25

Table 15

Embodiment 8
f = 3.79 mm, Fno = 2.40, HFOV = 36.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.068 | | | | |
| 2 | Lens 1 | 2.388360 (ASP) | 0.536 | Plastic | 1.544 | 55.9 | 3.11 |
| 3 | | -5.373700 (ASP) | 0.100 | | | | |
| 4 | Lens 2 | -1.494240 (ASP) | 0.281 | Plastic | 1.544 | 55.9 | 29.53 |
| 5 | | -1.457720 (ASP) | 0.070 | | | | |
| 6 | Lens 3 | 3.904400 (ASP) | 0.272 | Plastic | 1.632 | 23.4 | -4.84 |
| 7 | | 1.669420 (ASP) | 0.689 | | | | |
| 8 | Lens 4 | -3.619400 (ASP) | 0.669 | Plastic | 1.544 | 55.9 | 2.57 |
| 9 | | -1.073990 (ASP) | 0.563 | | | | |
| 10 | Lens 5 | -4.745500 (ASP) | 0.320 | Plastic | 1.530 | 55.8 | -2.76 |
| 11 | | 2.168340 (ASP) | 0.700 | | | | |
| 12 | IR-filter | Plano | 0.300 | Glass | 1.517 | 64.2 | - |
| 13 | | Plano | 0.401 | | | | |
| 14 | Image | Plano | - | | | | |

Note: Reference wavelength is d-line 587.6 nm. ASP stands for aspherical surfaces.

FIG. 26

Table 16
Aspheric Coefficients

| Surface # | 2 | 3 | 4 | 5 | 6 |
|---|---|---|---|---|---|
| k = | -2.12910E+00 | 2.42258E+00 | -7.00083E+00 | -9.76788E+00 | -1.00000E+00 |
| A4 = | -3.24801E-02 | -1.03335E-01 | 9.13732E-02 | 1.05915E-01 | -2.87633E-01 |
| A6 = | -1.30428E-02 | 6.83649E-02 | 4.28454E-02 | -1.00217E-01 | 3.09290E-02 |
| A8 = | -1.28406E-01 | -5.75245E-02 | 1.77642E-02 | 7.00120E-02 | -7.00243E-02 |
| A10 = | 1.03040E-01 | -1.17242E-01 | -3.01394E-02 | -1.35338E-02 | 1.36739E-01 |
| A12 = | -7.45584E-02 | -1.31203E-02 | 3.22742E-03 | 1.07454E-02 | -3.40862E-02 |

| Surface # | 7 | 8 | 9 | 10 | 11 |
|---|---|---|---|---|---|
| k = | -1.49993E+01 | 5.98331E+00 | -1.60530E+00 | 0.00000E+00 | -1.00000E+00 |
| A4 = | -9.39923E-02 | -4.55185E-03 | 1.85931E-02 | 3.98386E-02 | -1.18457E-01 |
| A6 = | -2.73208E-02 | 1.01611E-01 | 3.46251E-03 | -5.83936E-02 | 3.27281E-02 |
| A8 = | 2.19239E-02 | -7.57276E-02 | 1.92372E-04 | 1.94100E-02 | -9.75578E-03 |
| A10= | 6.57819E-03 | 3.03003E-02 | 5.93463E-03 | -1.71902E-03 | 1.94866E-03 |
| A12 = | -3.48481E-03 | -4.35277E-03 | 2.77021E-03 | -1.32885E-04 | -2.05852E-04 |
| A14 = | | | -1.65117E-03 | 2.00187E-05 | 7.73536E-06 |

FIG. 27

Table 17

Embodiment 9 f = 4.20 mm, Fno = 2.60, HFOV = 34.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 4.284000 (ASP) | 0.350 | Plastic | 1.544 | 55.9 | 4.32 |
| 2 | | -5.059300 (ASP) | -0.070 | | | | |
| 3 | Ape. Stop | Plano | 0.161 | | | | |
| 4 | Lens 2 | -3.641400 (ASP) | 0.468 | Plastic | 1.544 | 55.9 | 8.43 |
| 5 | | -2.121560 (ASP) | 0.050 | | | | |
| 6 | Lens 3 | 9.822100 (ASP) | 0.571 | Plastic | 1.632 | 23.4 | -5.15 |
| 7 | | 2.389250 (ASP) | 0.722 | | | | |
| 8 | Lens 4 | -3.801100 (ASP) | 0.939 | Plastic | 1.544 | 55.9 | 2.84 |
| 9 | | -1.192940 (ASP) | 0.660 | | | | |
| 10 | Lens 5 | -2.667620 (ASP) | 0.350 | Plastic | 1.530 | 55.8 | -2.66 |
| 11 | | 3.122000 (ASP) | 0.600 | | | | |
| 12 | IR-filter | Plano | 0.300 | Glass | 1.517 | 64.2 | - |
| 13 | | Plano | 0.399 | | | | |
| 14 | Image | Plano | - | | | | |

Note: Reference wavelength is d-line 587.6 nm. ASP stands for aspherical surfaces.

FIG. 28

Table 18
Aspheric Coefficients

| Surface # | 1 | 2 | 4 | 5 | 6 |
|---|---|---|---|---|---|
| k = | -3.06970E+01 | -2.78818E+01 | -2.76477E+01 | -4.45446E+00 | -1.24801E+02 |
| A4 = | -5.32712E-02 | -1.06185E-01 | 1.86944E-02 | 1.29691E-02 | -8.72735E-02 |
| A6 = | -9.28359E-02 | -2.25282E-02 | 4.17621E-02 | -7.34870E-02 | -1.85834E-02 |
| A8 = | -5.55610E-02 | 4.03451E-02 | 1.72392E-02 | 2.23468E-02 | -7.16220E-03 |
| A10 = | 7.94719E-02 | -1.96304E-02 | -1.07088E-02 | 2.20773E-02 | 4.36394E-02 |
| A12 = | -1.48941E-02 | 6.28457E-03 | -2.52696E-02 | -2.53361E-02 | -2.07486E-02 |

| Surface # | 7 | 8 | 9 | 10 | 11 |
|---|---|---|---|---|---|
| k = | -1.23314E+01 | 3.26179E+00 | -1.49971E+00 | 0.00000E+00 | -1.00000E+00 |
| A4 = | -2.07989E-02 | -3.57996E-02 | 9.69439E-03 | 5.80123E-02 | -6.45240E-02 |
| A6 = | -1.03486E-02 | 5.27742E-02 | 2.47810E-03 | -2.57820E-02 | 1.48873E-02 |
| A8 = | -6.00467E-03 | -2.08415E-02 | 1.58726E-03 | 6.73180E-03 | -3.39857E-03 |
| A10= | 9.65470E-03 | 6.72537E-04 | 1.76610E-03 | -1.12522E-03 | 3.95579E-04 |
| A12 = | -3.18304E-03 | 1.03823E-03 | -1.39849E-04 | 1.04357E-04 | -2.03200E-05 |

FIG. 29

Table 19

Embodiment 10 f = 3.96 mm, Fno = 2.80, HFOV = 35.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.104 | | | | |
| 2 | Lens 1 | 1.357710 (ASP) | 0.320 | Plastic | 1.544 | 55.9 | 18.80 |
| 3 | | 1.435490 (ASP) | 0.242 | | | | |
| 4 | Lens 2 | 12.007600 (ASP) | 0.463 | Plastic | 1.544 | 55.9 | 2.32 |
| 5 | | -1.391590 (ASP) | 0.050 | | | | |
| 6 | Lens 3 | 1.510570 (ASP) | 0.241 | Plastic | 1.632 | 23.4 | -4.15 |
| 7 | | 0.899260 (ASP) | 0.400 | | | | |
| 8 | Lens 4 | -1.562660 (ASP) | 0.359 | Plastic | 1.583 | 30.2 | 222.39 |
| 9 | | -1.674760 (ASP) | 0.402 | | | | |
| 10 | Lens 5 | -9.240400 (ASP) | 1.250 | Plastic | 1.544 | 55.9 | 42.67 |
| 11 | | -6.925100 (ASP) | 0.600 | | | | |
| 12 | IR-filter | Plano | 0.300 | Glass | 1.517 | 64.2 | - |
| 13 | | Plano | 0.496 | | | | |
| 14 | Image | Plano | - | | | | |

Note: Reference wavelength is d-line 587.6 nm. ASP stands for aspherical surfaces.

FIG. 30

Table 20
Aspheric Coefficients

| Surface # | 2 | 3 | 4 | 5 | 6 |
|---|---|---|---|---|---|
| k = | -1.23599E+00 | -9.72945E-01 | -3.51485E+00 | -2.86901E+00 | -1.00000E+00 |
| A4 = | -2.14933E-02 | -3.18585E-02 | -3.10418E-03 | -1.32393E-02 | -3.64696E-01 |
| A6 = | -1.50451E-02 | -1.71417E-01 | -1.25461E-01 | -7.54283E-02 | 2.20012E-01 |
| A8 = | -4.02976E-01 | -9.17839E-03 | 1.98263E-01 | 9.81198E-02 | -1.83207E-01 |
| A10 = | 5.34709E-01 | -4.93320E-01 | 8.24990E-02 | 1.77150E-01 | 2.09079E-01 |
| A12 = | -5.14898E-01 | 3.55614E-01 | -1.88474E-01 | 1.68787E-01 | -1.28286E-01 |

| Surface # | 7 | 8 | 9 | 10 | 11 |
|---|---|---|---|---|---|
| k = | -3.67712E+00 | 3.55253E-01 | -2.87208E+00 | 0.00000E+00 | -1.00000E+00 |
| A4 = | -7.38347E-02 | 2.45188E-01 | 9.25542E-02 | 1.98945E-02 | 2.80246E-03 |
| A6 = | -1.64597E-03 | 1.71004E-01 | 6.14510E-02 | -3.80279E-02 | -1.02968E-02 |
| A8 = | 5.70847E-02 | -7.83120E-02 | 1.54365E-03 | 1.46358E-02 | 8.84123E-04 |
| A10= | -3.63105E-02 | -4.12991E-02 | -1.11128E-02 | -1.24128E-03 | 1.99326E-04 |
| A12 = | -2.69895E-03 | 2.30566E-02 | -3.30662E-03 | -2.24873E-04 | -4.97905E-05 |
| A14 = | | | 1.60669E-03 | 4.22699E-05 | 1.66021E-06 |

FIG. 31

Table 21

Embodiment 11 f = 3.60 mm, Fno = 2.40, HFOV = 37.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 4.594100 (ASP) | 0.382 | Glass | 1.516 | 64.1 | 3.57 |
| 2 | | -2.990790 (ASP) | 0.080 | | | | |
| 3 | Lens 2 | -3.481200 (ASP) | 0.307 | Plastic | 1.530 | 55.8 | 16.77 |
| 4 | | -2.577770 (ASP) | -0.090 | | | | |
| 5 | Ape. Stop | Plano | 0.290 | | | | |
| 6 | Lens 3 | -19.082400 (ASP) | 0.230 | Plastic | 1.650 | 21.4 | -6.70 |
| 7 | | 5.667900 (ASP) | 0.808 | | | | |
| 8 | Lens 4 | -5.904000 (ASP) | 0.747 | Plastic | 1.530 | 55.8 | 2.06 |
| 9 | | -0.962560 (ASP) | 0.349 | | | | |
| 10 | Lens 5 | -1.980240 (ASP) | 0.389 | Plastic | 1.530 | 55.8 | -1.97 |
| 11 | | 2.361450 (ASP) | 0.600 | | | | |
| 12 | IR-filter | Plano | 0.300 | Glass | 1.517 | 64.2 | - |
| 13 | | Plano | 0.411 | | | | |
| 14 | Image | Plano | - | | | | |

Note: Reference wavelength is d-line 587.6 nm. ASP stands for aspherical surfaces.

FIG. 32

Table 22
Aspheric Coefficients

| Surface # | 1 | 2 | 3 | 4 | 6 |
|---|---|---|---|---|---|
| k = | -1.84600E+01 | -8.89136E+00 | -9.55822E+00 | -9.10654E+00 | -2.93067E+01 |
| A4 = | -9.31226E-02 | -3.86275E-02 | 1.26210E-01 | 5.31439E-03 | -8.51022E-02 |
| A6 = | -3.66845E-02 | 1.18077E-02 | 1.99200E-02 | -1.19327E-01 | -5.64810E-02 |
| A8 = | -6.24432E-02 | 4.13387E-02 | -5.87013E-02 | 5.85799E-02 | -1.13774E-01 |
| A10 = | 1.42777E-01 | -5.10204E-02 | 4.24729E-02 | 4.00469E-02 | 1.58224E-01 |
| A12 = | -5.83396E-02 | 5.63734E-02 | 2.00457E-02 | -2.83195E-02 | -3.29761E-02 |

| Surface # | 7 | 8 | 9 | 10 | 11 |
|---|---|---|---|---|---|
| k = | -4.55365E+01 | 1.86281E+01 | -1.37446E+00 | 0.00000E+00 | -1.00000E+00 |
| A4 = | -5.99205E-02 | -1.56374E-01 | -2.12973E-02 | 4.65710E-02 | -1.19931E-01 |
| A6 = | -6.54934E-02 | 1.10785E-01 | -2.14497E-03 | -2.29815E-02 | 2.96028E-02 |
| A8 = | -1.88715E-03 | -3.06832E-02 | 1.07791E-02 | 1.42774E-02 | -6.16770E-03 |
| A10= | 4.89006E-03 | -6.09688E-03 | 4.80830E-03 | -2.39746E-03 | 5.94816E-04 |
| A12 = | -4.61183E-03 | -7.76714E-03 | 4.76303E-04 | -1.71497E-04 | 1.73415E-06 |
| A14 = | | | -4.51526E-04 | 8.16905E-05 | -4.19504E-06 |

FIG. 33

Table 23

| | EM1 | EM2 | EM3 | EM4 | EM5 | EM6 | EM7 | EM8 | EM9 | EM10 | EM11 |
|---|---|---|---|---|---|---|---|---|---|---|---|
| f | 3.86 | 3.48 | 3.84 | 3.62 | 4.32 | 3.77 | 3.89 | 3.79 | 4.20 | 3.96 | 3.60 |
| Fno | 2.40 | 2.40 | 2.40 | 2.50 | 2.80 | 2.40 | 2.40 | 2.40 | 2.60 | 2.80 | 2.40 |
| HFOV | 36.0 | 38.9 | 36.1 | 38.0 | 33.7 | 36.7 | 36.1 | 36.9 | 34.2 | 35.2 | 37.9 |
| V1-V3 | 34.5 | 32.1 | 32.5 | 32.5 | 32.5 | 32.1 | 32.5 | 32.5 | 32.5 | 32.5 | 42.7 |
| T34/CT4 | 1.23 | 0.73 | 1.12 | 0.80 | 1.06 | 0.96 | 1.11 | 1.03 | 0.77 | 1.11 | 1.08 |
| T45/T34 | 0.36 | 0.56 | 0.53 | 1.12 | 0.63 | 0.66 | 0.71 | 0.82 | 0.91 | 1.01 | 0.43 |
| R4/R5 | 0.09 | -0.32 | -0.29 | -1.03 | -0.52 | -0.79 | -0.43 | -0.37 | -0.22 | -0.92 | 0.14 |
| (R7-R8)/(R7-R8) | 1.67 | 4.32 | 1.60 | 5.17 | 1.90 | 3.88 | 1.75 | 1.84 | 1.91 | -28.88 | 1.39 |
| (f/f1)+(f/f2) | 1.58 | 1.51 | 1.36 | 1.57 | 1.46 | 1.44 | 1.29 | 1.35 | 1.47 | 1.92 | 1.22 |
| f/f3 | -0.86 | -0.96 | -0.81 | -0.71 | -0.83 | -0.82 | -0.74 | -0.78 | -0.82 | -0.95 | -0.54 |
| \|f5/f4\| | 0.99 | 1.81 | 1.07 | 1.03 | 0.94 | 1.36 | 1.09 | 1.08 | 0.94 | 0.19 | 0.96 |
| Dr1r6/Td | 0.33 | 0.35 | 0.36 | 0.38 | 0.30 | 0.32 | 0.35 | 0.36 | 0.36 | 0.35 | 0.34 |
| SL/TTL | 0.93 | 0.94 | 0.99 | 0.96 | 0.93 | 0.94 | 0.97 | 0.99 | 0.95 | 0.98 | 0.86 |
| TTL/ImgH | 1.80 | 1.80 | 1.76 | 1.55 | 1.90 | 1.80 | 1.69 | 1.69 | 1.90 | 1.77 | 1.66 |

FIG. 34

IMAGERY OPTICAL SYSTEM

BACKGROUND OF THE INVENTION

1. Field of the Invention

The present invention relates to an imagery optical system, and more particularly to a low-priced optical lens assembly with five lens elements constituting the total length of the optical lens assembly and the imagery optical system is applied to an electronic product.

2. Description of the Related Art

As science and technology advance, the development of electronic products such as digital still cameras, web cameras and mobile phone cameras tends to have a compact design to meet the user requirements for an optical lens assembly with good aberration correction ability, high resolution, and high image quality, in addition to the compact and low-cost requirements.

In general, a conventional optical lens assembly of a mini electronic product comes with different designs, including two-lens, three-lens, four-lens, and five-or-more lens designs. If the image quality is taken into consideration, the optical lens assemblies with the four-lens and five-lens designs have advantages on aberration corrections with a better performance of their modulation transfer function (MTF), and the five-lens design having a higher resolution than the four-lens design is applicable for electronic products of high video quality or high pixel requirement.

In various mini five-lens designs of an imagery optical system with a fixed focal length, different combinations of positive and negative refractive powers are adopted. As disclosed in Japanese Pat. Publication Nos. JP2003-131136 and JP2005-266771, two sets of cemented doublets are used for reducing the total length of the optical system. As disclosed in Japanese Pat. Publication Nos. JP2003-185917 and JP2006-293042, U.S. Pat. Publication Nos. US2004/0196571 and US2003/0117722, and R.O.C. Pat. No. TW M313781, one set of cemented doublets is used to achieve a wide-angle effect. As disclosed in Japanese Pat. Publication No. JP2003-161879, the fourth-lens and the fifth-lens with different refractive powers are used to construct an optical system, but the excess total length of such optical system is not applicable for compact electronic devices.

In small products such as a digital camera, web camera, and mobile phone camera, the optical lens assembly requires a compact design, a short focal length and a good aberration correction. For different designs of the imagery optical systems with a fixed focal length and five lens elements, a better aberration correction and an appropriate total length can be achieved by utilizing the fourth and fifth lens elements with different refractive powers and an inflection point. As disclosed in R.O.C. Pat. Nos. TWM313246, TW201038966, TW201022714 and TWM332199 and U.S. Pat. No. 7,710,665, a good aberration correction is achieved, but the total length of the optical system still cannot meet the requirements of compact electronic devices. As disclosed in U.S. Pat. No. 7,826,151, US2010/0254029 and US2010/0253829, the fourth lens element and the fifth lens element having an inflection point each are adopted for achieving a shorter total length of the optical system, but these patents disclose the fourth lens element and the fifth lens element with inflection points to correct the aberration or image distortion, and thus a longer gap exists between the third lens element and the fourth lens element which is not favorable in achieving a shorter total length. Furthermore, excess variation of the fourth lens element brings the fabrication lots of difficulties and is unfavorable for the cost reduction. Therefore, the present invention provides a feasible design to shorten the optical lens assembly, while using the refractive powers of the five lens elements with the combination of convex and concave surfaces to improve the image quality for the application on compact electronic devices and simplify the complexity of the manufacturing, in addition to the effect of reducing the total length of the optical lens assembly.

SUMMARY OF THE INVENTION

Therefore, it is a primary objective of the invention to provide an imagery optical system sequentially arranged from an object side to an image side along an optical axis comprising: the first lens element, the second lens element, the third lens element, the fourth lens element and the fifth lens element, wherein the first lens element with positive refractive power has each of the object-side and image-side surfaces being aspheric or spheric; the second lens element with positive refractive power has each of the object-side and image-side surfaces being aspheric or spheric; the third lens element with refractive power has each of the object-side and image-side surfaces being aspheric or spheric; the fourth lens element with refractive power has a concave object-side surface and a convex image-side surface at positions proximate to the optical axis, and at least one of the object-side and image-side surfaces is aspheric; and the fifth lens element with refractive power is made of plastic and has at least one of object-side and image-side surfaces being aspheric, and at least one of the object-side and image-side surfaces has at least one inflection point, and the imagery optical system satisfies the following relations:

$$0.1 < T_{45}/T_{34} < 2.0; \quad (1)$$

$$-3.0 < R_4/R_5 < 0.7; \quad (2)$$

$$28.0 < v_1 - v_3; \quad (3)$$

wherein, $T_{34}$ is an axial distance between the third lens element and the fourth lens element, $T_{45}$ is an axial distance between the fourth lens element and the fifth lens element, $R_4$ is a curvature radius of the image-side surface of the second lens element, $R_5$ is a curvature radius of the object-side surface of the third lens element, $v_1$ is an Abbe number of the first lens element, $v_3$ is an Abbe number of the third lens element.

The imagery optical system as described above further comprises a stop and an image sensor, wherein the image sensor is installed at an image plane after the first lens element, the second lens element, the third lens element, the fourth lens element and the fifth lens element are assembled, and satisfies the following relation, in addition to Relations (1), (2) and (3):

$$TTL/ImgH < 2.1; \quad (4)$$

wherein, TTL is an axial distance from the object-side surface of the first lens element to the image plane, and the image sensor is installed at the image plane, and ImgH is half of the diagonal length of an effective photosensitive area of the image sensor.

The present invention further provides an imagery optical system, sequentially arranged from an object side to an image side along an optical axis, comprising: the first lens element, the second lens element, the third lens element, the fourth lens element and the fifth lens element, wherein the first lens element with positive refractive power has a convex object-side surface proximate to the optical axis, and each of the object-side and image-side surfaces can be aspheric or spheric; the second lens element with positive refractive power has a convex image-side surface proximate to the optical axis, and each of the object-side and image-side surfaces can be aspheric or spheric; the third lens element with refractive power has an object-side surface and an image-side surface wherein each of the surfaces can be aspheric or spheric; the fourth lens element with refractive power, has a concave object-side surface and a convex image-side surface proximate to the optical axis, and at least one of the object-side and image-side surfaces is aspheric; and the fifth lens element with refractive power is made of plastic and has a concave image-side surface proximate to the optical axis, where at least one of the object-side and image-side surfaces is aspheric, and at least one of the image-side and object-side surface has at least one inflection point. For the purpose of different applications, the imagery optical system satisfies one or a combination of the following relations, in addition to Relations (1), (2) and (3):

$$0.1 < T_{45}/T_{34} < 2.0, \text{ or} \tag{1}$$

$$\text{preferably, } 0.3 < T_{45}/T_{34} < 1.3; \tag{5}$$

$$0.7 < SL/TTL < 1.2; \tag{7}$$

$$0.3 < T_{34}/CT_4 < 2.0; \tag{8}$$

$$-1.2 < f/f_3 < -0.4; \tag{9}$$

$$1.0 < (f/f_1) + (f/f_2) < 2.2; \tag{10}$$

$$0.7 < |f_5/f_4| < 2.0; \tag{11}$$

wherein, TTL is the axial distance from the object-side surface of the first lens element to the image plane, SL is an axial distance from the stop to the image plane, $T_{34}$ is the axial distance between the third lens element and the fourth lens element, $T_{45}$ is the axial distance between the fourth lens element and the fifth lens element, $CT_4$ is a thickness of the fourth lens element near the optical axis, f is a focal length of the imagery optical system, $f_3$ is a focal length of the third lens element, $f_1$ is a focal length of the first lens element, $f_2$ is a focal length of the second lens element, $f_4$ is a focal length of the fourth lens element, $f_5$ is a focal length of the fifth lens element, $R_4$ is the curvature radius of the image-side surface of the second lens element, and $R_5$ is the curvature radius of the object-side surface of the third lens element.

The present invention further provides an imagery optical system, sequentially arranged from an object side to an image side along an optical axis, comprising: the first lens element, the second lens element, the third lens element, the fourth lens element and the fifth lens element, wherein the first lens element with positive refractive power has a convex object-side surface proximate to the optical axis, and each of the object-side and image-side surfaces can be aspheric or spheric; the second lens element with positive refractive power has a convex image-side surface proximate to the optical axis, and each of the object-side and image-side surfaces can be aspheric or spheric; the third lens element with refractive power has a concave image-side surface proximate to the optical axis, and each of the object-side and image-side surfaces can be aspheric or spheric; the fourth lens element with positive refractive power has a concave object-side surface and a convex image-side surface proximate to the optical axis, and at least one of the object-side and image-side surfaces is aspheric; and the fifth lens element with negative refractive power is made of plastic, has a concave image-side surface proximate to the optical axis, at least one of the object-side and image-side surfaces is aspheric, and at least one of the object-side and image-side surface has at least one inflection point. For the purpose of different applications, the imagery optical system satisfies one or a combination of the following relations, in addition to Relations (1), (2), (3), (7), (8), and (9):

$$\text{preferably, } -1.5 < R_4/R_5 < 0.2; \tag{6}$$

$$0.20 < D_{R1R6}/T_d < 0.45; \tag{12}$$

$$1.30 < (R_7 + R_8)/(R_7 - R_8); \tag{13}$$

wherein, $R_4$ is the curvature radius of the image-side surface of the second lens element, $R_5$ is the curvature radius of the object-side surface of the third lens element, $D_{R1R6}$ is an axial distance from the object-side surface of the first lens element to the image-side surface of the third lens element, $T_d$ is an axial distance from the object-side surface of the first lens element to the image-side surface of the fifth lens element, $R_7$ is a curvature radius of the object-side surface of the fourth lens element, and $R_8$ is a curvature radius of the image-side surface of the fourth lens element.

The present invention further provides an imagery optical system, sequentially arranged from an object side to an image side along an optical axis, comprising: the first lens element, the second lens element, the third lens element, the fourth lens element and the fifth lens element; wherein the first lens element with positive refractive power has a convex object-side surface, and each of the object-side and image-side surfaces can be aspheric or spheric; the second lens element with positive refractive power has each of the object-side and image-side surfaces being aspheric or spheric; the third lens element with negative refractive power, and each of the object-side and image-side surfaces can be aspheric or spheric; the fourth lens element with refractive power has a concave object-side surface and a convex image-side surface proximate to the optical axis, and at least one of the object-side and image-side surfaces is aspheric; and the fifth lens element with refractive power is made of plastic and has at least one of the object-side and image-side surfaces being aspheric, and at least one of the object-side and image-side surface has at least one inflection point. The imagery optical system satisfies the relations of:

$$0.1 < T_{45}/T_{34} < 2.0; \tag{1}$$

$$-3.0 < R_4/R_5 < 0.7; \tag{2}$$

wherein, $T_{34}$ is an axial distance between the third lens element and the fourth lens element, $T_{45}$ is an axial distance between the fourth lens element and the fifth lens element, $R_4$ is a curvature radius of the image-side surface of the second lens element, and $R_5$ is a curvature radius of the object-side surface of the third lens element.

The present invention further provides an imagery optical system, sequentially from an object side to an image side along an optical axis, comprising: the first lens element, the second lens element, the third lens element, the fourth lens element and the fifth lens element; wherein the first lens element with positive refractive power has a convex object-side surface proximate to the optical axis, and each of the object-side and image-side surfaces can be aspheric or spheric; the second lens element with positive refractive power has a convex image-side surface proximate to the optical axis, and each of the object-side and image-side surfaces can be aspheric or spheric; the third lens element with negative refractive power, each of the object-side and image-side surfaces being aspheric or spheric, has a concave image-side surface, and at least one of the object-side and image-side surfaces has at least one inflection point; the fourth lens element with refractive power has a concave object-side surface and a convex image-side surface proximate to the optical axis, and at least one of the object-side and image-side surfaces is aspheric; and the fifth lens element with refractive power is made of plastic, has a concave image-side surface proximate to the optical axis, at least one of the object-side and image-side surfaces is aspheric, and at least one of the object-side and image-side surfaces has at least one inflection point. For the purpose of different applications, the imagery optical system satisfies one or a combination of the following relations, in addition to Relations (1) and (2):

preferably, $0.3<T_{45}/T_{34}<1.3$; (5)

$28.0<v_1-v_3$; (3)

$1.0<(f/f_1)+(f/f_2)<2.2$; (10)

$1.2<(f/f_1)+(f/f_2)<1.7$; (14)

wherein, $T_{34}$ is the axial distance between the third lens element and the fourth lens element, $T_{45}$ is the axial distance between the fourth lens element and the fifth lens element, $v_1$ is an Abbe number of the first lens element, $v_3$ is an Abbe number of the third lens element, f is a focal length of the imagery optical system, $f_1$ is a focal length of the first lens element, and $f_2$ is a focal length of the second lens element.

The present invention further provides an imagery optical system, sequentially arranged from an object side to an image side along an optical axis comprising: the first lens element, the second lens element, the third lens element, the fourth lens element and the fifth lens element, wherein the first lens element with positive refractive power has a convex object-side surface proximate to the optical axis, and each of the object-side and image-side surfaces can be aspheric or spheric; the second lens element with positive refractive power has a convex image-side surface proximate to the optical axis, and each of the object-side and image-side surfaces can be aspheric or spheric; the third lens element with negative refractive power has each of the object-side and image-side surfaces being aspheric or spheric; the fourth lens element with refractive power has a concave object-side surface and a convex image-side surface proximate to the optical axis, and at least one of the object-side and image-side surfaces is aspheric; and the fifth lens element with refractive power is made of plastic, has a concave object-side surface and a concave image-side surface proximate to the optical axis, at least one of the object-side and image-side surfaces is aspheric, and at least one of the object-side and image-side surfaces has at least one inflection point. For the purpose of different applications, the imagery optical system satisfies one or a combination of the following relations, in addition to Relations (1) and (2):

$-1.5<R_4/R_5<0.2$; (6)

$0.7<|f_5/f_4|<2.0$; (11)

$1.30<(R_7+R_8)/(R_7-R_8)$; (13)

wherein, $R_4$ is the curvature radius of the image-side surface of the second lens element, $R_5$ is the curvature radius of the object-side surface of the third lens element, $R_7$ is a curvature radius of the object-side surface of the fourth lens element, $R_8$ is a curvature radius of the image-side surface of the fourth lens element, $f_4$ is a focal length of the fourth lens element, and $f_5$ is a focal length of the fifth lens element.

The present invention further provides an imagery optical system, sequentially arranged from an object side to an image side along an optical axis, comprising: the first lens element, the second lens element, the third lens element, the fourth lens element and the fifth lens element; wherein the first lens element with positive refractive power has a convex object-side surface, and each of the object-side and image-side surfaces can be aspheric or spheric; the second lens element with positive refractive power has each of the object-side and image-side surfaces being aspheric or spheric; the third lens element with negative refractive power has each of the object-side and image-side surfaces being aspheric or spheric; the fourth lens element with positive refractive power has a concave object-side surface and a convex image-side surface proximate to the optical axis, and at least one of the object-side and image-side surfaces is aspheric; and the fifth lens element with negative refractive power is made of plastic, has a concave image-side surface, at least one of the object-side and image-side surfaces is aspheric, and at least one of the object-side and image-side surfaces has at least one inflection point. The imagery optical system satisfies the relations of:

$0.1<T_{45}/T_{34}<2.0$; (1)

$28.0<v_1-v_3$; (3)

wherein, $T_{34}$ is an axial distance between the third lens element and the fourth lens element, $T_{45}$ is an axial distance between the fourth lens element and the fifth lens element, $v_1$ is an Abbe number of the first lens element, $v_3$ is an Abbe number of the third lens element.

The present invention further provides an imagery optical system, sequentially arranged from an object side to an image side along an optical axis comprising: the first lens element, the second lens element, the third lens element, the fourth lens element and the fifth lens element, wherein the first lens element with positive refractive power has a convex object-side surface, and each of the object-side and image-side surfaces can be aspheric or spheric; the second lens element with positive refractive power has each of the object-side and image-side surfaces being aspheric or spheric; the third lens element with negative refractive power has each of the object-side and image-side surfaces can be aspheric or spheric; the fourth lens element with positive refractive power has a concave object-side surface and a convex image-side surface proximate to the optical axis, and at least one of the object-side and image-side surfaces is aspheric; and the fifth lens element with negative refractive power is made of plastic, has a concave image-side surface, at least one of the object-side and image-side surfaces is aspheric, and at least one of the object-side and image-side surfaces has at least one inflection point. For the purpose of different applications, the imagery optical system satisfies one or a combination of the following relations, in addition to Relations (1) and (3):

$1.0<(f/f_1)+(f/f_2)<2.2$; (10)

$0.20<D_{R1R6}/T_d<0.45$; (12)

$0.7<|f_5/f_4|<2.0$; (11)

wherein, f is a focal length of the imagery optical system, $f_1$ is a focal length of the first lens element, $f_2$ is a focal length of the second lens element, $D_{R1R6}$ is an axial distance from the object-side surface of the first lens element to the image-side surface of the third lens element, $T_d$ is an axial distance from the object-side surface of the first lens element to the image-side surface of the fifth lens element, $f_4$ is a focal length of the fourth lens element, and $f_5$ is a focal length of the fifth lens element.

The present invention further provides an imagery optical system, sequentially arranged from an object side to an image side along an optical axis comprising: the first lens element, the second lens element, the third lens element, the fourth lens element and the fifth lens element, wherein the first lens element with positive refractive power has a convex object-side surface, and each of the object-side and image-side surfaces can be aspheric or spheric; the second lens element with positive refractive power has each of the object-side and image-side surfaces being aspheric or spheric; the third lens element with negative refractive power has each of the object-side and image-side surfaces being aspheric or spheric; the fourth lens element with positive refractive power has a concave object-side surface and a convex image-side surface proximate to the optical axis, and at least one of the object-side and image-side surfaces being aspheric; and the fifth lens element with negative refractive power is made of plastic, has a concave object-side surface and a concave image-side surface, at least one of the object-side and image-side surfaces is aspheric, and at least one of the object-side and image-side surfaces has at least one inflection point. For the purpose of different applications, the imagery optical system satisfies one or a combination of the following relations, in addition to Relations (1) and (3):

$$0.7 < SL/TTL < 1.2; \qquad (7)$$

wherein, TTL is an axial distance from the object-side surface of the first lens element to the image plane, and SL is an axial distance from the stop to the image plane.

With appropriate gaps among the first lens element, second lens element, third lens element, fourth lens element and fifth lens element of the present invention, the total length of the optical lens assembly can be shortened and good aberration correction and modulation transfer function (MTF) can be achieved effectively and applied to compact electronic device with a camera function.

In the imagery optical system of the present invention, the first lens element and the second lens element come with positive refractive power for providing a greater positive refractive power to the first lens element and the second lens element, and the third lens element comes with negative refractive power for correcting any aberration produced by the first lens element and the second lens element and for correcting the color difference of the system effectively. Similarly, the fourth lens element comes with positive refractive power for providing an effective refractive power between the fourth lens element and the fifth lens element, and the fifth lens element is provided for correcting the aberration and color difference of images of the fourth lens element and adjusting the modulation transfer function (MTF) to enhance the overall resolution of the imagery optical system, such that the image aberration and distortion of the imagery optical system can meet the high resolution requirement. For different applications, if it is necessary to increase the refractive power of the fifth lens element and correct the aberration and color difference of the image of the fourth lens element, the fifth lens element with positive refractive power is adopted.

In the imagery optical system of the present invention, through the combination of the first lens element with positive refractive power, the second lens element with positive refractive power, and the third lens element with negative refractive power, and the compensation of the fourth lens element with positive refractive power and the fifth lens element with positive or negative refractive power, the total length of the imagery optical system can be effectively shortened, such that a greater effective pixel range of the image sensor can be achieved in the same total length. In other words, a shorter imagery optical system can be designed within the same effective pixel range of the image sensor.

In the imagery optical system of the present invention, the fifth lens element can be made of plastic to favor the manufacturing and lower the cost at the same time.

BRIEF DESCRIPTION OF THE DRAWINGS

FIG. 12 shows Table 1 that lists optical data of the first preferred embodiment of the present invention;

FIG. 13 shows Table 2 that lists aspheric surface data of the first preferred embodiment of the present invention;

FIG. 14 shows Table 3 that lists optical data of the second preferred embodiment of the present invention;

FIG. 15 shows Table 4 that lists aspheric surface data of the second preferred embodiment of the present invention;

FIG. 16 shows Table 5 that lists optical data of the third preferred embodiment of the present invention;

FIG. 17 shows Table 6 that lists aspheric surface data of the third preferred embodiment of the present invention;

FIG. 18 shows Table 7 that lists optical data of the fourth preferred embodiment of the present invention;

FIG. 19 shows Table 8 that lists aspheric surface data of the fourth preferred embodiment of the present invention;

FIG. 20 shows Table 9 that lists optical data of the fifth preferred embodiment of the present invention;

FIG. 21 shows Table 10 that lists aspheric surface data of the fifth preferred embodiment of the present invention;

FIG. 22 shows Table 11 that lists optical data of the sixth preferred embodiment of the present invention;

FIG. 23 shows Table 12 that lists aspheric surface data of the sixth preferred embodiment of the present invention;

FIG. 24 shows Table 13 that lists optical data of the seventh preferred embodiment of the present invention;

FIG. 25 shows Table 14 that lists aspheric surface data of the seventh preferred embodiment of the present invention;

FIG. 26 shows Table 15 that lists optical data of the eighth preferred embodiment of the present invention;

FIG. 27 shows Table 16 that lists aspheric surface data of the eighth preferred embodiment of the present invention;

FIG. 28 shows Table 17 that lists optical data of the ninth preferred embodiment of the present invention;

FIG. 29 shows Table 18 that lists aspheric surface data of the ninth preferred embodiment of the present invention;

FIG. 30 shows Table 19 that lists optical data of the tenth preferred embodiment of the present invention;

FIG. 31 shows Table 20 that lists aspheric surface data of the tenth preferred embodiment of the present invention;

FIG. 32 shows Table 21 that lists optical data of the eleventh preferred embodiment of the present invention;

FIG. 33 shows Table 22 that lists aspheric surface data of the eleventh preferred embodiment of the present invention; and FIG. 34 shows data of related relations of the first to the eleventh preferred embodiments of the present invention.

DETAILED DESCRIPTION OF THE PREFERRED EMBODIMENTS

Figure 1A:
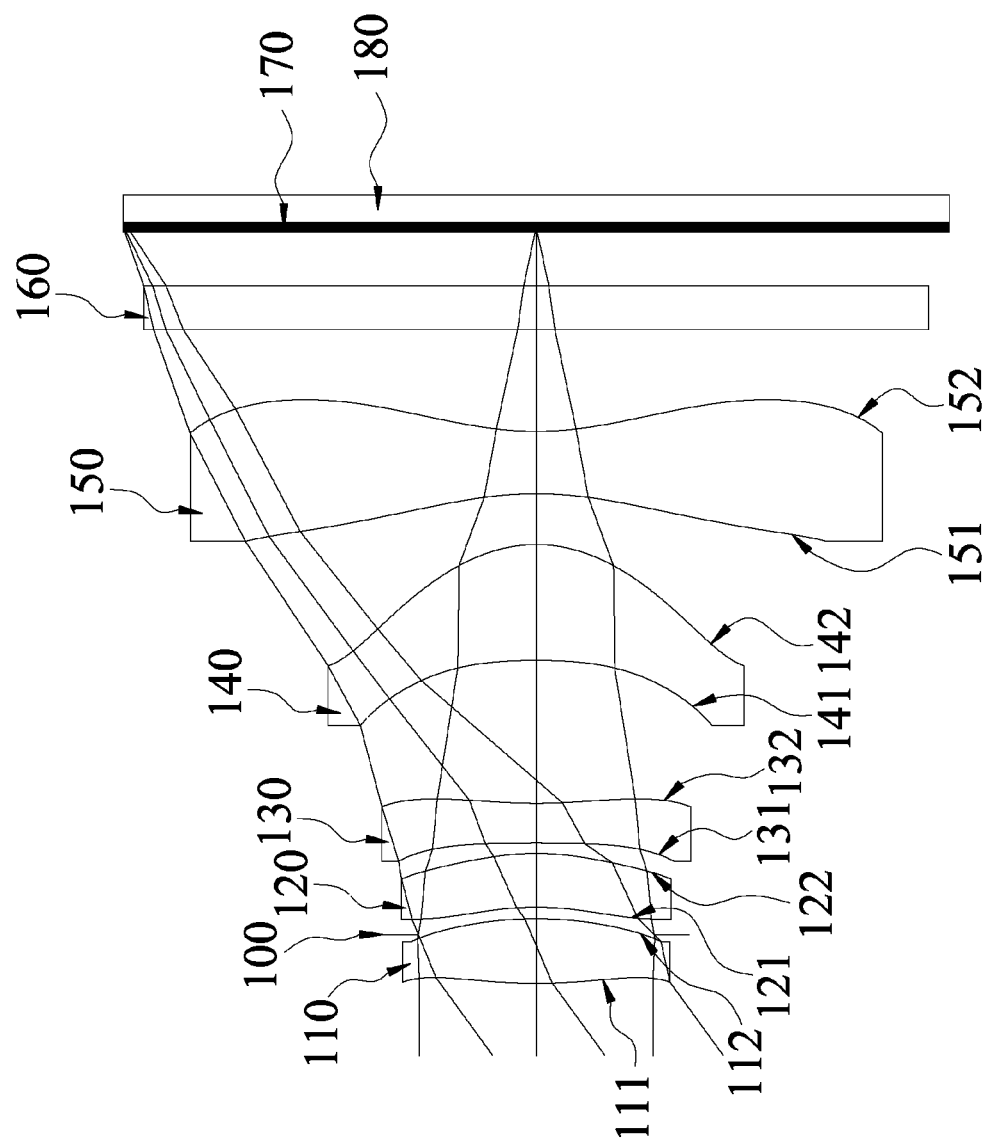
FIG. 1A is a schematic view of an imagery optical system in accordance with the first preferred embodiment of the present invention.

With reference to FIG. 1A, the present invention provides an imagery optical system, sequentially arranged from an object side to an image side along the optical axis comprises: the first lens element (110), the second lens element (120), the third lens element (130), the fourth lens element (140) and the fifth lens element (150), wherein the first lens element (110) with positive refractive power has a convex object-side surface (111) and a convex image-side surface (112) proximate to the optical axis, and each of the object-side surface (111) and image-side surface (112) can be aspheric or spheric; the second lens element (120) with positive refractive power has a convex image-side surface (121) proximate to the optical axis, and each of the object-side surface (121) and image-side surface (122) can be aspheric or spheric; the third lens element (130) with negative refractive power has a concave image-side surface (132) proximate to the optical axis, and each of the object-side surface (131) and image-side surface (132) can be aspheric or spheric; the fourth lens element (140) with positive refractive power has a concave object-side surface (141) and a convex image-side surface (142) proximate to the optical axis, and at least one of the object-side surface (141) and image-side surface (142) is aspheric; and the fifth lens element (150) with negative refractive power has a concave object-side surface (151) and a concave image-side surface (152) proximate to the optical axis, at least one of the object-side surface (151) and the image-side surface (152) is aspheric, and at least one of the object-side surface (151) and image-side surface (152) has at least one inflection point. The imagery optical system further comprises a stop, which can be an aperture stop (100) and an infrared filter (160); the aperture stop (100) is disposed between the first lens element (110) and the second lens element (120), and the infrared filter (160) is installed between the fifth lens element (150) and an image plane (170) and generally made of a panel of an optical material that does not affect the focal length of the imagery optical system of the present invention. The imagery optical system further comprises an image sensor (180) installed at the image plane (170) for imaging an object. The aspheric surfaces of the first lens element (110), second lens element (120), third lens element (130), fourth lens element (140) and fifth lens element (150) are in compliance with the aspheric surface formula as given in Equation (15):

$$X(Y) = \frac{(Y^2/R)}{1+\sqrt{(1-(1+K)(Y/R)^2)}} + \sum_i (A_i)\cdot(Y^i) \quad (15)$$

wherein, X is the relative height between a point on the aspheric surface with a distance Y away from the optical axis and a plane tangent to the vertex of the aspheric surface along the optical axis;

Y is the distance between a point on the aspheric surface and the optical axis;

R is the curvature radius;

K is the conic coefficient; and

Ai is the $i^{th}$ level aspheric surface coefficient.

With the installation of the aforementioned first lens element (110), second lens element (120), third lens element (130), fourth lens element (140), fifth lens element (150), aperture stop (100), and image sensor (180), the imagery optical system of the present invention satisfies Relations (1), (2), and (3).

If the ratio of the axial distance $T_{34}$ from the image-side surface of the third lens element (132) to the object-side surface of the fourth lens element (141) to the axial distance $T_{45}$ from the image-side surface of the fourth lens element (142) to the object-side surface of the fifth lens element (151) is limited as shown in Relation (1), light can pass through the second lens element (120), through the air gap between the second lens element and the third lens element, then enter the third lens element (130) within a specific range of refraction angle to increase the refraction angle in order to decrease the total length. If the ratio of the curvature radius $R_4$ of the image-side surface of the second lens element (122) to the curvature radius $R_5$ of the object-side surface of the third lens element (131) is limited as shown in Relation (2), the exiting angle of the second lens element (120) and the incident angle of the third lens element (130) can be reduced. If the difference between the Abbe number $v_1$ of the first lens element (110) and the Abbe number $v_3$ of the third lens element (130) is limited as shown in Relation (3), the Abbe number difference between the first lens element (110) and the third lens element (130) will be not too small to improve the aberration compensation ability of the third lens element with negative refractive power (130) and the first lens element with positive refractive power (110).

If Relation (4) is satisfied, the total length of the imagery optical system can be reduced effectively, such that a greater effective pixel range of the image sensor can be achieved with the same total length; or if Relation (7) is satisfied, the axial distance SL from the aperture stop (100) to the image plane (170) can be reduced effectively, such that a smaller total length can be achieved in the same axial distance SL from the aperture stop (100) to the image plane (170).

Similarly, if the ratio of the axial distance $T_{34}$ from the image-side surface of the third lens element (132) to the object-side surface of the fourth lens element (140) to the thickness $CT_4$ of the fourth lens element (140) is limited as shown in Relation (8), the thickness $CT_4$ of the fourth lens element (140) can be limited to reduce the total length. If Relation (12) is satisfied, the ratio of the axial distance $D_{R1R6}$ from the object-side surface of the first lens element (111) to the image-side surface of the third lens element (132) to the axial distance $T_d$ from the object-side surface of the first lens element (111) to the image-side surface of the fifth lens element (152) is limited as shown in Relation (12), the total length can be reduced. If Relations (9), (10) or (11) is satisfied, the overall focal length f, the focal length $f_1$ of the first lens element (110), the focal length $f_2$ of the second lens element (120), the focal length $f_3$ of the third lens element (130), the focal length $f_4$ of the fourth lens element (140) and the focal length $f_5$ of the fifth lens element (150) can be adjusted to a balanced condition capable of allocating the required refractive power of the first lens element (110), second lens element (120), third lens element (130), fourth lens element (140) and fifth lens element (150) of the imagery optical system and improve the sensitivity of the imagery optical system.

If the curvature radius $R_7$ of the object-side surface of the fourth lens element (141) and the curvature radius $R_8$ of the image-side surface of the fourth lens element (142) are limited as shown in Relation (13), the surface shapes of the object-side and image-side surfaces (141), (142) of the fourth lens element (140) are changed, not only favoring the correction of the aberration of the fourth lens element (140) to improve the image quality of the fourth lens element (140), but also making the manufacturing of the fourth lens element (140) easier.

Figure 2A:
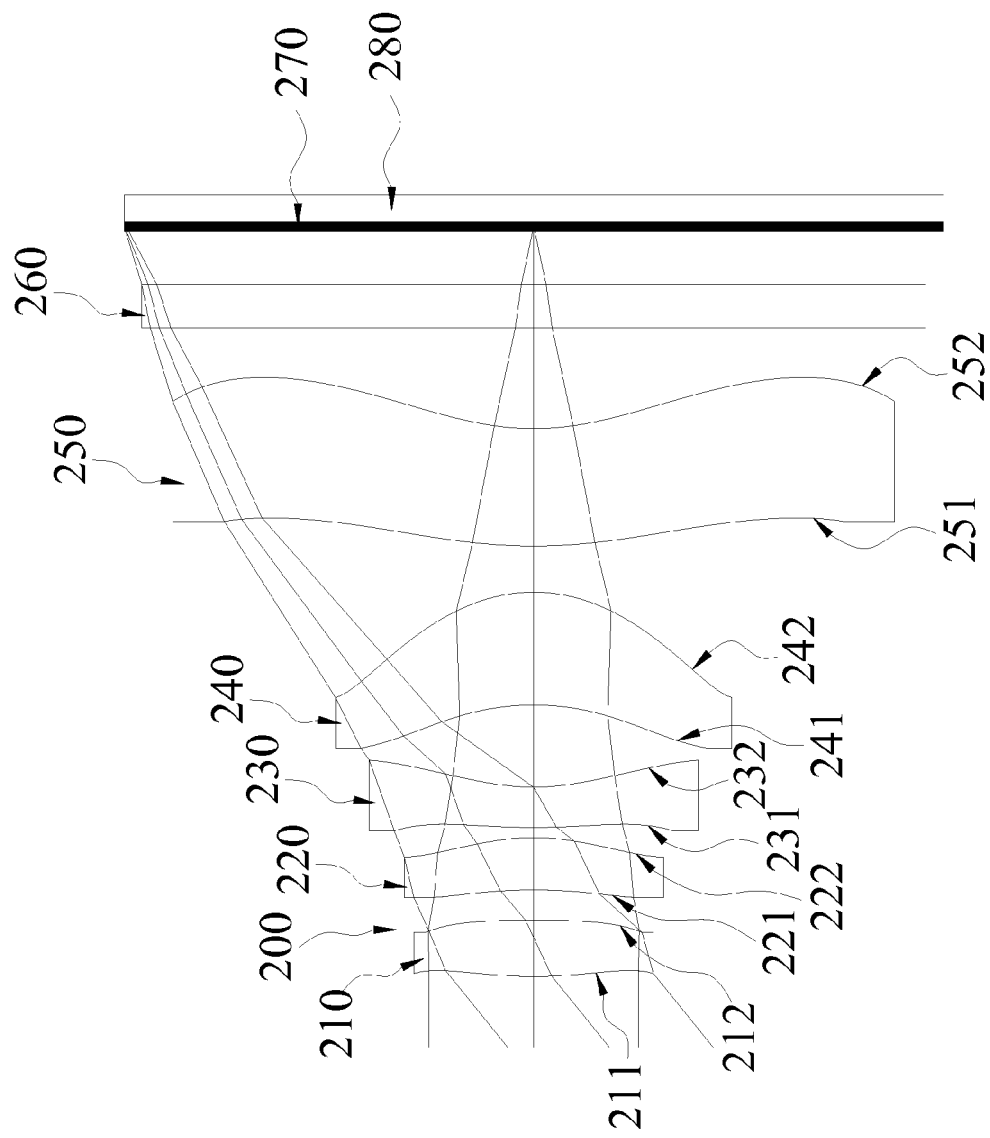
FIG. 2A is a schematic view of an imagery optical system in accordance with the second preferred embodiment of the present invention.

With reference to FIG. 2A, the present invention provides an imagery optical system, sequentially arranged from an object side to an image side along an optical axis, comprises: the first lens element (210), the second lens element (220), the third lens element (230), the fourth lens element (240) and the fifth lens element (250), wherein the first lens element (210) with positive refractive power has a convex object-side surface (211) and a convex image-side surface (212) proximate to the optical axis, and each of the object-side surface (211) and image-side surface (212) can be aspheric or spheric; the second lens element (220) with positive refractive power has a convex image-side surface (221) proximate to the optical axis, and each of the object-side surface (221) and image-side surface (222) can be aspheric or spheric; the third lens element (230) with negative refractive power has a concave image-side surface (232) proximate to the optical axis, and each of the object-side surface (231) and image-side surface (232) can be aspheric or spheric; the fourth lens element (240) with positive refractive power has a concave object-side surface (241) and a convex image-side surface (242) proximate to the optical axis, and at least one of the object-side surface (241) and image-side surface (242) is aspheric; and the fifth lens element (250) with negative refractive power has a convex object-side surface (251) and a concave image-side surface (252) proximate to the optical axis, at least one of the object-side surface (251) and the image-side surface (252) is aspheric, and at least one of the object-side surface (251) and image-side surface (252) has at least one inflection point. The imagery optical system further comprises an aperture stop (200) and an infrared filter (260), and the aperture stop (200) is disposed between the first lens element (210) and the second lens element (220), and the infrared filter (260) is installed between the fifth lens element (250) and an image plane (270) and generally made of a panel optical material that does not affect the focal length of the imagery optical system of the present invention. The imagery optical system further comprises an image sensor (280) installed on the image plane (270) for imaging an object. The aspheric surfaces of the first lens element (210), second lens element (220), third lens element (230), fourth lens element (240) and fifth lens element (250) are in compliance with the aspheric surface formula as given in Equation (15).

With the foregoing setup for the first lens element (210), second lens element (220), third lens element (230), fourth lens element (240), fifth lens element (250) and aperture stop (200) and image sensor (280) of the imagery optical system of the present invention, one or a combination of Relations (1) to (14) is satisfied.

Figure 10A:
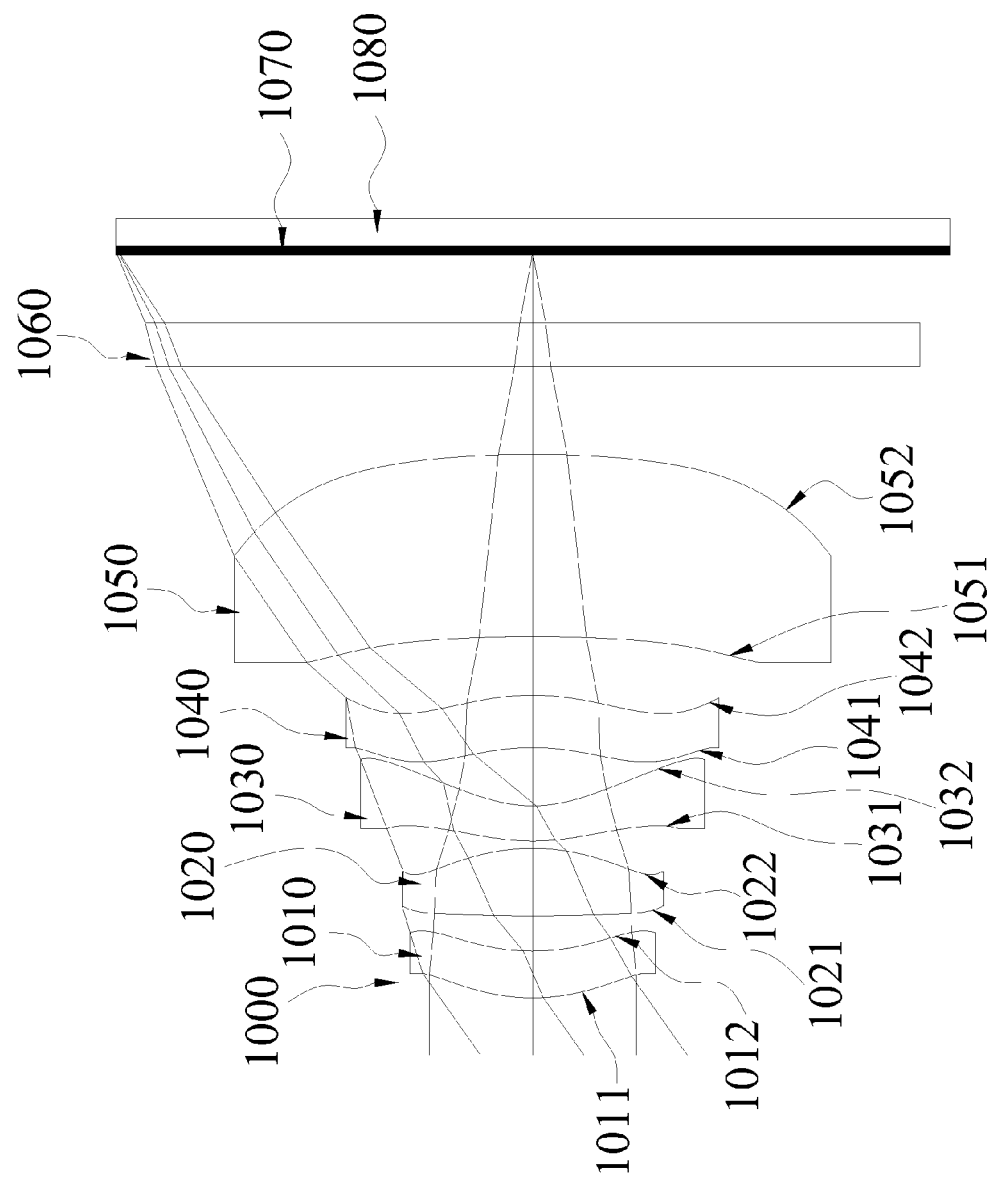
FIG. 10A is a schematic view of an imagery optical system in accordance with the tenth preferred embodiment of the present invention.

With reference to FIG. 10A, the present invention further provides an imagery optical system, sequentially arranged from an object side to an image side along an optical axis comprises: the first lens element (1010), the second lens element (1020), the third lens element (1030), the fourth lens element (1040) and the fifth lens element (1050), wherein the first lens element (1010) with positive refractive power has a convex object-side surface (1011) and a concave image-side surface (1012) proximate to the optical axis, and each of the object-side surface (1011) and image-side surface (1012) can be aspheric or spheric; the second lens element (1020) with positive refractive power has a convex image-side surface (1021) proximate to the optical axis, and each of the object-side surface (1021) and image-side surface (1022) can be aspheric or spheric; the third lens element (1030) with negative refractive power has a concave image-side surface (1032) proximate to the optical axis, and each of the object-side surface (1031) and image-side surface (1032) is aspheric or spheric; the fourth lens element (1040) with positive refractive power has a concave object-side surface (1041) and a convex image-side surface (1042) proximate to the optical axis, and at least one of the object-side surface (1041) and image-side surface (1042) is aspheric; and the fifth lens element (1050) with positive refractive power has a concave object-side surface (1051) and a convex image-side surface (1052) proximate to the optical axis, at least one of the object-side surface (1051) and image-side surface (1052) is aspheric, and at least one of the object-side surface (1051) and image-side surface (1052) has at least one inflection point. The imagery optical system further comprises an aperture stop (1000) and an infrared filter (1060), and the aperture stop (1000) is installed between the first lens element (1010) and an object to be photographed, and the infrared filter (1060) is installed between the fifth lens element (1050) and the image plane (1070) and generally made of a panel optical material that does not affect the focal length of the present invention imagery optical system. The imagery optical system further comprises an image sensor (1080) installed on the image plane (1070) for imaging an object. The aspheric surfaces of the first lens element (1010), second lens element (1020), third lens element (1030), fourth lens element (1040) and fifth lens element (1050) are in compliance with the aspheric surface formula as given in Equation (15).

With the foregoing setup for the first lens element (1010), second lens element (1020), third lens element (1030), fourth lens element (1040), fifth lens element (1050), aperture stop (1000) and image sensor (1080) of the imagery optical system of the present invention, one or a combination of Relations (1) to (14) is satisfied.

The imagery optical system of the present invention is described in details by preferred embodiments and related drawings as follows.

<First Preferred Embodiment>

Figure 1B:
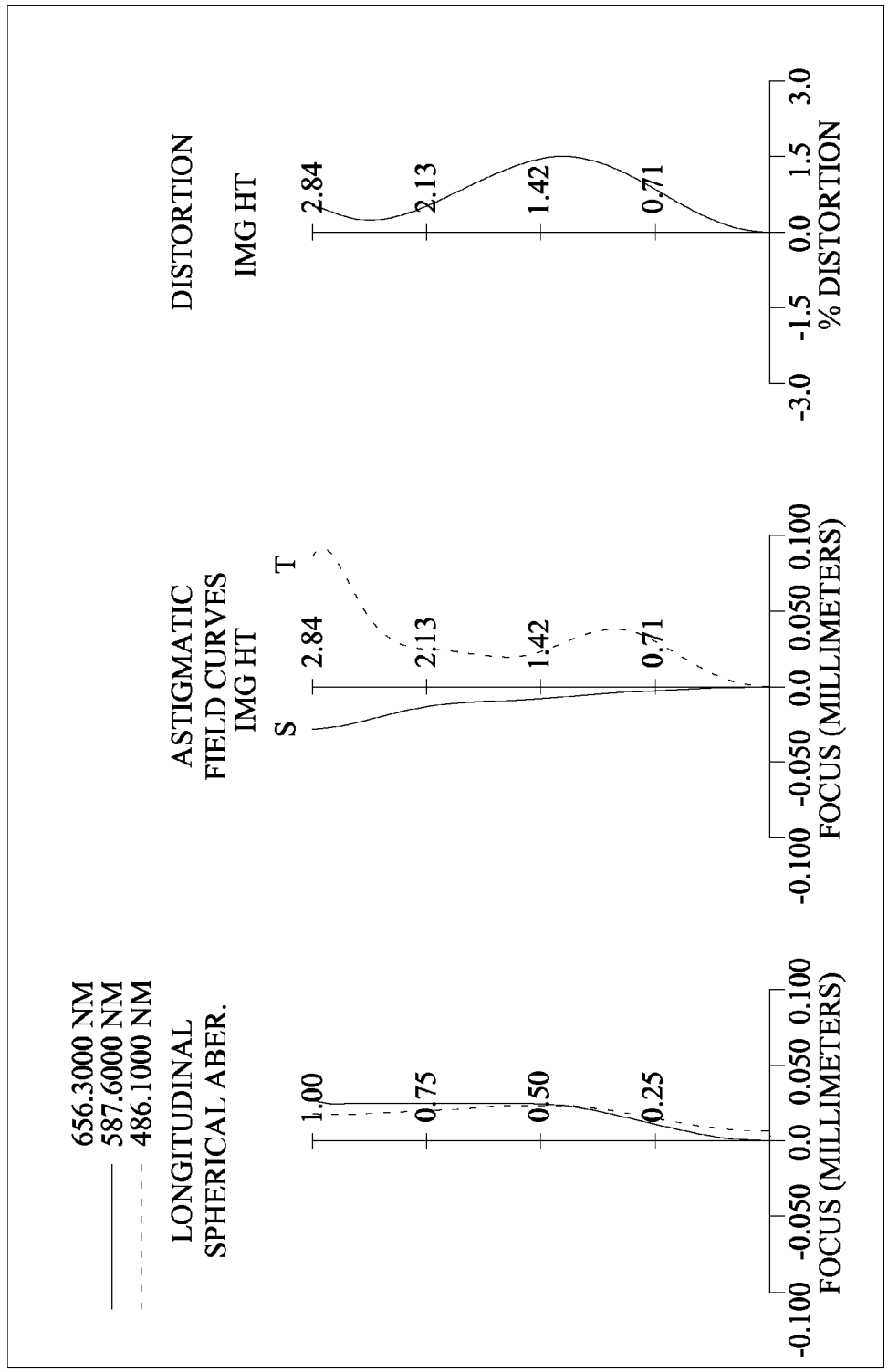
FIG. 1B is a series of aberration curves of the first preferred embodiment of the present invention.

With reference to FIGS. 1A and 1B for a schematic view of an imagery optical system and a series of aberration curves in accordance with the first preferred embodiment of the present invention respectively, the imagery optical system comprises five lens elements, an infrared filter (160), an aperture stop (100) and an image sensor (180), and the five lens elements sequentially arranged from an object side to an image side along an optical axis include: a bi-convex first lens element (110) with positive refractive power and made of plastic, and both object-side surface (111) and image-side surface (112) are aspheric; the second lens element (120) with positive refractive power, made of plastic, and having a concave object-side surface (121) and a convex image-side surface (122) proximate to the optical axis, and both object-side surface (121) and image-side surface (122) are aspheric; the third lens element (130) with negative refractive power, made of plastic, and having a concave object-side surface (131) and a concave image-side surface (132) proximate to the optical axis, and both object-side surface (131) and image-side surface (132) are aspheric; the fourth lens element (140) with positive refractive power, made of plastic, and having a concave object-side surface (141) and a convex image-side surface (142) proximate to the optical axis, and both object-side surface (141) and image-side surface (142) are aspheric; the fifth lens element (150) with negative refractive power, made of plastic, and having a concave object-side surface (151) and a concave image-side surface (152) proximate to the optical axis, and both object-side surface (151) and image-side surface (152) are aspheric, and at least one of the object-side surface (151) and image-side surface (152) has at least one inflection point; an infrared filter (IR-filter) (160), made of glass which is a panel glass and does not affect the focal length of the imagery optical system of the present invention; an image sensor (180) installed on the image plane (170). In this preferred embodiment, the imagery optical system further comprises an aperture stop (100) disposed between the first lens element (110) and the second lens element (120).

With reference to FIG. 12 (Table 1) for the optical data of the object-side surface of the first lens element (111), the image-side surface of the first lens element (112), the object-side surface of the second lens element (121), the image-side surface of the second lens element (122), the object-side surface of the third lens element (131), and the image-side surface of the third lens element (132), the object-side surface of the fourth lens element (141), the image-side surface of the fourth lens element (142), and the object-side surface of the fifth lens element (151) and the image-side surface of the fifth lens element (152) of this preferred embodiment are in compliance with the aspheric formula equation as shown in Equation (15) and the aspheric surface parameters are listed in FIG. 13 (Table 2).

In the imagery optical system of the first preferred embodiment, the overall focal length is f=3.86 (mm), the overall aperture value (f-number) Fno=2.40, and half of the maximum view angle is HFOV=36.0 (degrees).

With reference to Table 1 for the following data of this preferred embodiment, $T_{34}$ is the axial distance from the image-side surface of the third lens element (132) to the object-side surface of the fourth lens element (141); $T_{45}$ is the axial distance from the image-side surface of the fourth lens element (142) and the object-side surface of the fifth lens element (151); $R_4$ is the curvature radius of the image-side surface of the second lens element (122); $R_5$ is the curvature radius of the object-side surface of the third lens element (131); $v_1$ is the Abbe number of the first lens element (110), $v_3$ is the Abbe number of the third lens element (130), and they satisfy Relations (1), (2) and (3) as follows: $T_{45}/T_{34}$=0.36; $R_4/R_5$=0.09; and $v_1-v_3$=34.5.

In this preferred embodiment, the imagery optical system further comprises an aperture stop (100) disposed between the first lens element (110) and the second lens element (120), and the axial distance from the object-side surface of the first lens element (111) to the image sensor (180) at the image plane (170) is TTL, and an image sensor is installed at the image plane, and half of the diagonal of the effective photosensitive area of the image sensor (180) is ImgH, and the axial distance from the aperture stop (100) to the image plane (170) is SL, and they satisfy the relations of TTL/ImgH=1.80 and SL/TTL=0.93 as shown in Relations (4) and (7) respectively. The overall focal length of the imagery optical system is f, the focal length of the first lens element (110) is $f_1$, the focal length of the second lens element (120) is $f_2$, the focal length of the third lens element (130) is $f_3$, the focal length of the fourth lens element (140) is $f_4$, the focal length of the fifth lens element (150) is $f_5$, and they satisfy the relations of $f/f_3$=−0.86; $(f/f_1)+(f/f_2)$=1.58; $|f_5/f_4|$=0.99 as shown in Relations (9), (10) and (11) respectively.

In the imagery optical system of this preferred embodiment, the thickness of the fourth lens element (140) along the optical axis is $CT_4$, the axial distance from the object-side surface of the first lens element (111) to the image-side surface of the third lens element (132) is $D_{R1R6}$, the axial distance from the object-side surface of the first lens element (111) to the image-side surface of the fifth lens element (152) is $T_d$, and they satisfy the relations of $T_{34}/CT_4$=1.23 and $D_{R1R6}/T_d$=0.33 as shown in Relations (8) and (12) respectively. The curvature radius of the object-side surface of the fourth lens element (141) is $R_7$, the curvature radius of the image-side surface of the fourth lens element (142) is $R_8$, and they satisfy the relation of $(R_7+R_8)/(R_7-R_8)$=1.67 as shown in Relation (13), and related computing data of the equation are listed in FIG. 34 (Table 23).

From the optical data as shown in FIG. 12 (Table 1) and the series of aberration curves as shown in FIG. 1B, good compensation effects of the longitudinal spherical aberration, astigmatic field curving and distortion can be achieved by the imagery optical system in accordance with this preferred embodiment of the present invention.

<Second Preferred Embodiment>

Figure 2B:
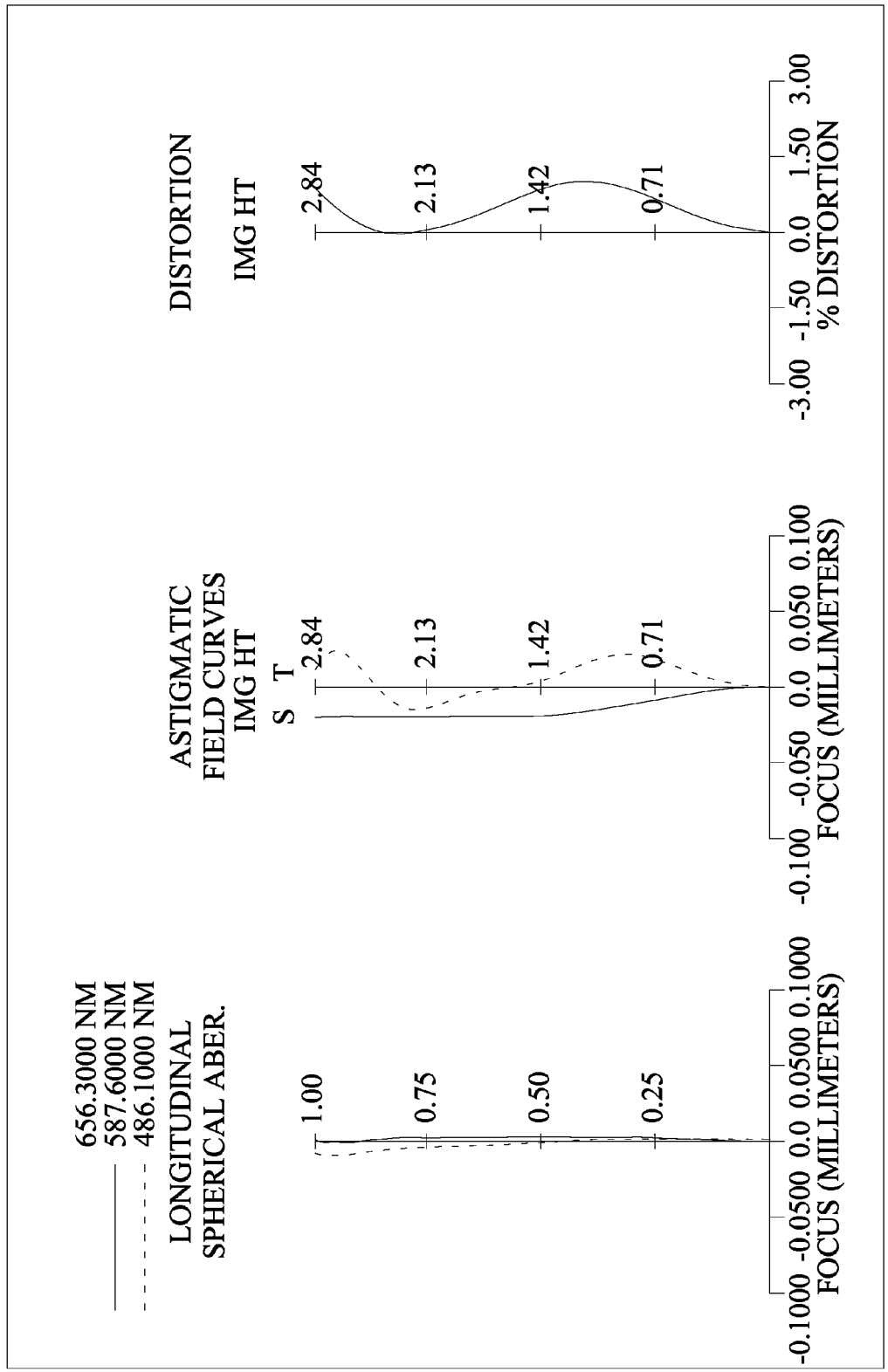
FIG. 2B is a series of aberration curves of the second preferred embodiment of the present invention.

With reference to FIGS. 2A and 2B for a schematic view of an imagery optical system and a series of aberration curves in accordance with the second preferred embodiment of the present invention respectively, the imagery optical system comprises five lens elements, an infrared filter (260), an aperture stop (200) and an image sensor (280), and the five lens elements sequentially arranged from an object side to an image side along an optical axis include: a bi-convex first lens element (210) with positive refractive power and made of plastic, and both object-side surface (211) and image-side surface (212) are aspheric; the second lens element (220) with positive refractive power, made of plastic, and having a concave object-side surface (221) and a convex image-side surface (222) proximate to the optical axis, and both object-side surface (221) and image-side surface (222) are aspheric; the third lens element (230) with negative refractive power, made of plastic, and having a convex object-side surface (231) and a concave image-side surface (232) proximate to the optical axis, and both object-side surface (231) and image-side surface (232) are aspheric; the fourth lens element (240) with positive refractive power, made of plastic, and having a concave object-side surface (241) and a convex image-side surface (242) proximate to the optical axis, and both object-side surface (241) and image-side surface (242) are aspheric; the fifth lens element (250) with negative refractive power, made of plastic, and having a convex object-side surface (251) and a concave image-side surface (252) proximate to the optical axis, and both object-side surface (251) and image-side surface (252) are aspheric, and at least one of the object-side surface (251) and image-side surface (252) has at least one inflection point; an infrared filter (IR-filter) (260), made of glass which is a panel glass and does not affect the focal length of the imagery optical system of the present invention; an image sensor (280) installed at the image plane (270). In this preferred embodiment, the imagery optical system further comprises an aperture stop (200) disposed between the first lens element (210) and the second lens element (220).

With reference to FIG. 14 (Table 3) for the optical data of the object-side surface of the first lens element (211), the image-side surface of the first lens element (212), the object-side surface of the second lens element (221), the image-side surface of the second lens element (222), the object-side surface of the third lens element (231), and the image-side surface of the third lens element (232), the object-side surface of the fourth lens element (241), the image-side surface of the fourth lens element (242), and the object-side surface of the fifth lens element (251) and the image-side surface of the fifth lens element (252) of this preferred embodiment are in compliance with the aspheric formula equation as shown in Equation (15) and the aspheric surface parameters are listed in FIG. 15 (Table 4).

In the imagery optical system of the second preferred embodiment, the overall focal length is f=3.48 (mm), the overall aperture value (f-number) Fno=2.40, and half of the maximum view angle is HFOV=38.9 (degrees).

With reference to Table 3 for the following data of this preferred embodiment, $T_{34}$ is the axial distance from the image-side surface of the third lens element (232) to the object-side surface of the fourth lens element (241); $T_{45}$ is the axial distance from the image-side surface of the fourth lens element (242) and the object-side surface of the fifth lens element (251); $R_4$ is the curvature radius of the image-side surface of the second lens element (222); $R_5$ is the curvature radius of the object-side surface of the third lens element (231); $v_1$ is the Abbe number of the first lens element (210), $v_3$ is the Abbe number of the third lens element (230), and they satisfy Relations (1), (2) and (3) as follows: $T_{45}/T_{34}$=0.56; $R_4/R_5$=−0.32; and $v_1-v_3$=32.1.

In this preferred embodiment, the imagery optical system further comprises an aperture stop (200) disposed between the first lens element (210) and the second lens element (220), and the axial distance from the object-side surface of the first lens element (211) to the image sensor (280) at the image plane (270) is TTL, and an image sensor is installed at the image plane, and half of the diagonal of the effective photosensitive area of the image sensor (280) is ImgH, and the axial distance from the aperture stop (200) to the image plane (270) is SL, and they satisfy the relations of TTL/ImgH=1.80 and SL/TTL=0.94 as shown in Relations (4) and (7) respectively. The overall focal length of the imagery optical system is f, the focal length of the first lens element (210) is $f_1$, the focal length of the second lens element (220) is $f_2$, the focal length of the third lens element (230) is $f_3$, the focal length of the fourth lens element (240) is $f_4$, the focal length of the fifth lens element (250) is $f_5$, and they satisfy the relations of $f/f_3$=−0.96; $(f/f_1)+(f/f_2)$=1.51; and $|f_5/f_4|$=1.81 as shown in Relations (9), (10) and (11) respectively.

In the imagery optical system of this preferred embodiment, the thickness of the fourth lens element (240) along the optical axis is $CT_4$, the axial distance from the object-side surface of the first lens element (211) to the image-side surface of the third lens element (232) is $D_{R1R6}$, the axial distance from the object-side surface of the first lens element (211) to the image-side surface of the fifth lens element (252) is $T_d$, and they satisfy the relations of $T_{34}/CT_4$=0.73 and $D_{R1R6}/T_d$=0.35 as shown in Relations (8) and (12) respectively. The curvature radius of the object-side surface of the fourth lens element (241) is $R_7$, the curvature radius of the image-side surface of the fourth lens element (242) is $R_8$, and they satisfy the relation of $(R_7+R_8)/(R_7-R_8)$=4.32 as shown in Relation (13), and related computing data of the equation are listed in FIG. 34 (Table 23).

From the optical data as shown in FIG. 14 (Table 3) and the series of aberration curves as shown in FIG. 2B, good compensation effects of the longitudinal spherical aberration, astigmatic field curving and distortion can be achieved by the imagery optical system in accordance with this preferred embodiment of the present invention.

<Third Preferred Embodiment>

Figure 3A:
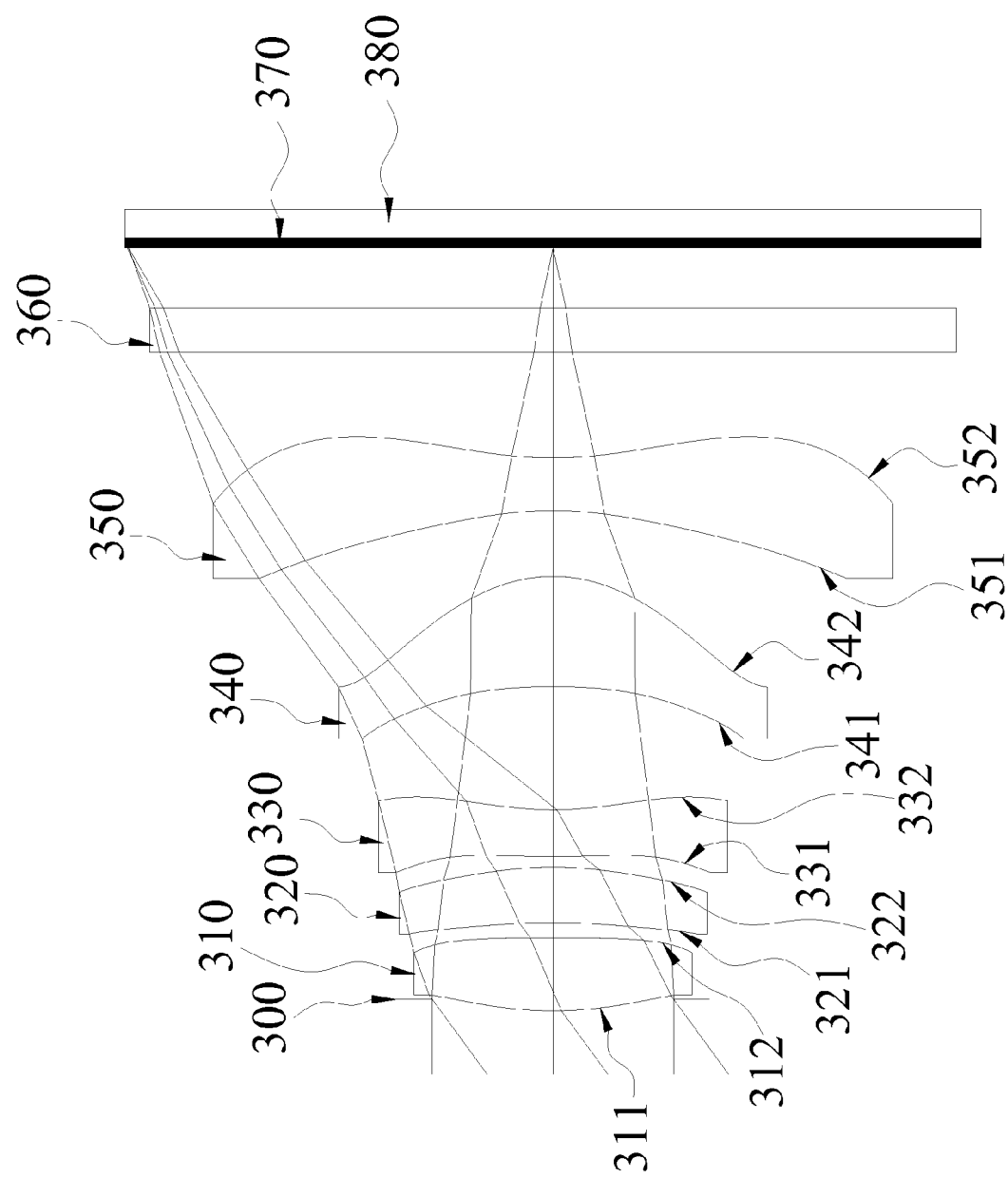
FIG. 3A is a schematic view of an imagery optical system in accordance with the third preferred embodiment of the present invention.
Figure 3B:
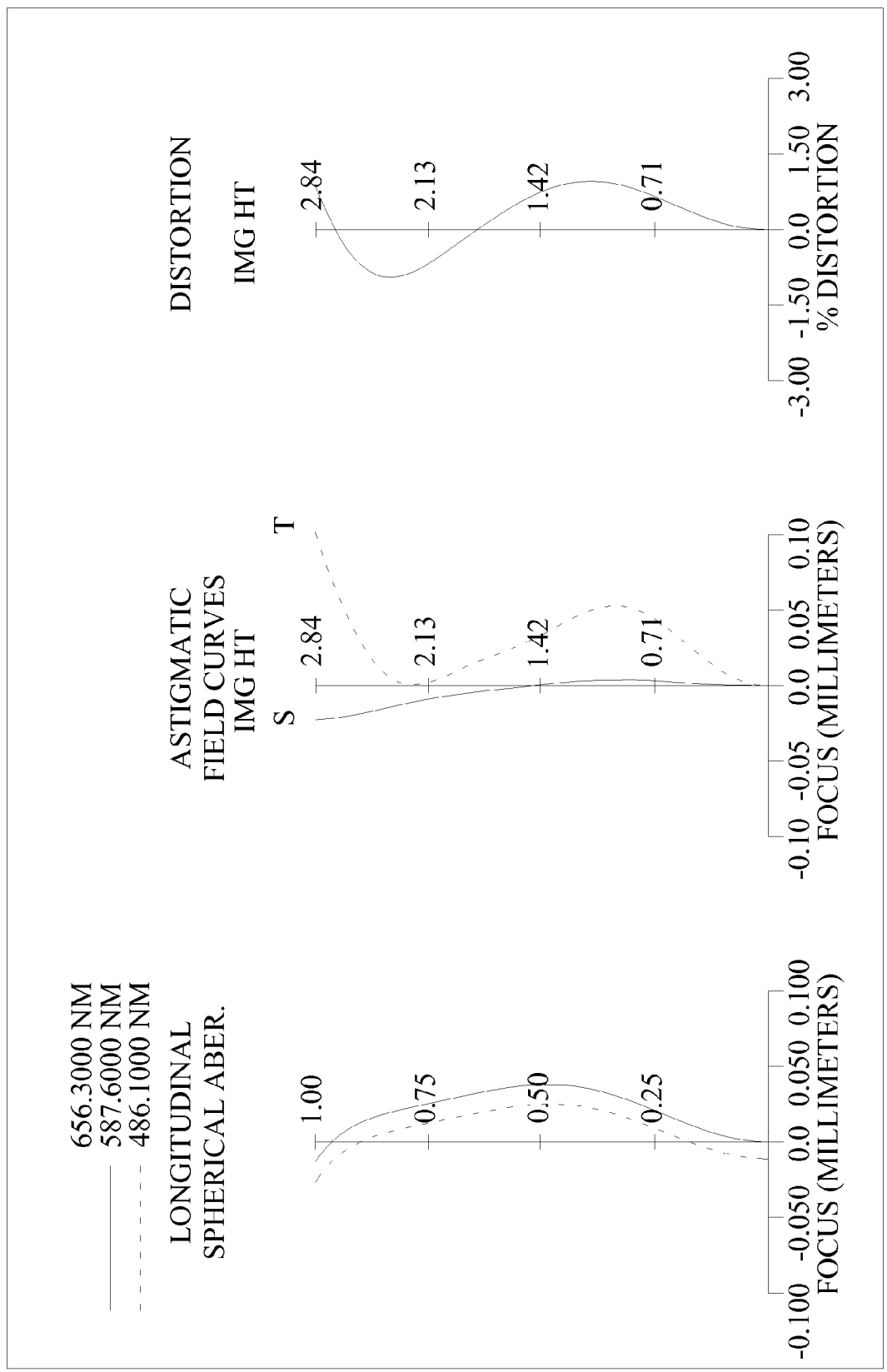
FIG. 3B is a series of aberration curves of the third preferred embodiment of the present invention.

With reference to FIGS. 3A and 3B for a schematic view of an imagery optical system and a series of aberration curves in accordance with the third preferred embodiment of the present invention respectively, the imagery optical system comprises five lens elements, an infrared filter (360), an aperture stop (300) and an image sensor (380), and the five lens elements sequentially arranged from an object side to an image side along an optical axis include: a bi-convex first lens element (310) with positive refractive power and made of plastic, and both object-side surface (311) and image-side surface (312) are aspheric; the second lens element (320) with positive refractive power, made of plastic, and having a concave object-side surface (321) and a convex image-side surface (322) proximate to the optical axis, and both object-side surface (321) and image-side surface (322) are aspheric; the third lens element (330) with negative refractive power, made of plastic, and having a convex object-side surface (331) and a concave image-side surface (332) proximate to the optical axis, and both object-side surface (331) and image-side surface (332) are aspheric; the fourth lens element (340) with positive refractive power, made of plastic, and having a concave object-side surface (341) and a convex image-side surface (342) proximate to the optical axis, and both object-side surface (341) and image-side surface (342) are aspheric; the fifth lens element (350) with negative refractive power, made of plastic, and having a concave object-side surface (351) and a concave image-side surface (352) proximate to the optical axis, and both object-side surface (351) and image-side surface (352) are aspheric, and at least one of the object-side surface (351) and image-side surface (352) has at least one inflection point; an infrared filter (IR-filter) (360), made of glass which is a panel glass and does not affect the focal length of the imagery optical system of the present invention; an image sensor (380) installed on the image plane (370). In this preferred embodiment, the imagery optical system further comprises an aperture stop (300) disposed between the first lens element (310) and an object to be photographed, and the aperture stop (300) is a front aperture.

With reference to FIG. 16 (Table 5) for the optical data of the object-side surface of the first lens element (311), the image-side surface of the first lens element (312), the object-side surface of the second lens element (321), the image-side surface of the second lens element (322), the object-side surface of the third lens element (331), and the image-side surface of the third lens element (332), the object-side surface of the fourth lens element (341), the image-side surface of the fourth lens element (342), and the object-side surface of the fifth lens element (351) and the image-side surface of the fifth lens element (352) of this preferred embodiment are in compliance with the aspheric formula equation as shown in Equation (15) and the aspheric surface parameters are listed in FIG. 17 (Table 6).

In the imagery optical system of the third preferred embodiment, the overall focal length is f=3.84 (mm), the overall aperture value (f-number) Fno=2.40, and half of the maximum view angle is HFOV=36.1 (degrees).

With reference to Table 5 for the following data of this preferred embodiment, $T_{34}$ is the axial distance from the image-side surface of the third lens element (332) to the object-side surface of the fourth lens element (341); $T_{45}$ is the axial distance from the image-side surface of the fourth lens element (342) and the object-side surface of the fifth lens element (351); $R_4$ is the curvature radius of the image-side surface of the second lens element (322); $R_5$ is the curvature radius of the object-side surface of the third lens element (331); $v_1$ is the Abbe number of the first lens element (310), $v_3$ is the Abbe number of the third lens element (330), and they satisfy Relations (1), (2) and (3) as follows: $T_{45}/T_{34}$=0.53; $R_4/R_5$=−0.29; and $v_1-v_3$=32.5.

In this preferred embodiment, the imagery optical system further comprises an aperture stop (300) disposed between the first lens element (310) and an object to be photographed, and the axial distance from the object-side surface of the first lens element (311) to the image sensor (380) at the image plane (370) is TTL, and an image sensor is installed at the image plane, and half of the diagonal of the effective photosensitive area of the image sensor (380) is ImgH, and the axial distance from the aperture stop (300) to the image plane (370) is SL, and they satisfy the relations of TTL/ImgH=1.76 and SL/TTL=0.99 as shown in Relations (4) and (7) respectively. The overall focal length of the imagery optical system is f, the focal length of the first lens element (310) is $f_1$, the focal length of the second lens element (320) is $f_2$, the focal length of the third lens element (330) is $f_3$, the focal length of the fourth lens element (340) is $f_4$, the focal length of the fifth lens element (350) is $f_5$, and they satisfy the relations of $f/f_3$=−0.81; $(f/f_1)+(f/f_2)$=1.36; and $|f_5/f_4|$=1.07 as shown in Relations (9), (10) and (11) respectively.

In the imagery optical system of this preferred embodiment, the thickness of the fourth lens element (340) along the optical axis is $CT_4$, the axial distance from the object-side surface of the first lens element (311) to the image-side surface of the third lens element (332) is $D_{R1R6}$, the axial distance from the object-side surface of the first lens element (311) to the image-side surface of the fifth lens element (352) is $T_d$, and they satisfy the relations of $T_{34}/CT_4$=1.12 and $D_{R1R6}/T_d$=0.36 as shown in Relations (8) and (12) respectively. The curvature radius of the object-side surface of the fourth lens element (341) is $R_7$, the curvature radius of the image-side surface of the fourth lens element (342) is $R_8$, and they satisfy the relation of $(R_7+R_8)/(R_7-R_8)$=1.60 as shown in Relation (13), and related computing data of the equation are listed in FIG. 34 (Table 23).

From the optical data as shown in FIG. 16 (Table 5) and the series of aberration curves as shown in FIG. 3B, good compensation effects of the longitudinal spherical aberration, astigmatic field curving and distortion can be achieved by the imagery optical system in accordance with this preferred embodiment of the present invention.

<Fourth Preferred Embodiment>

Figure 4A:
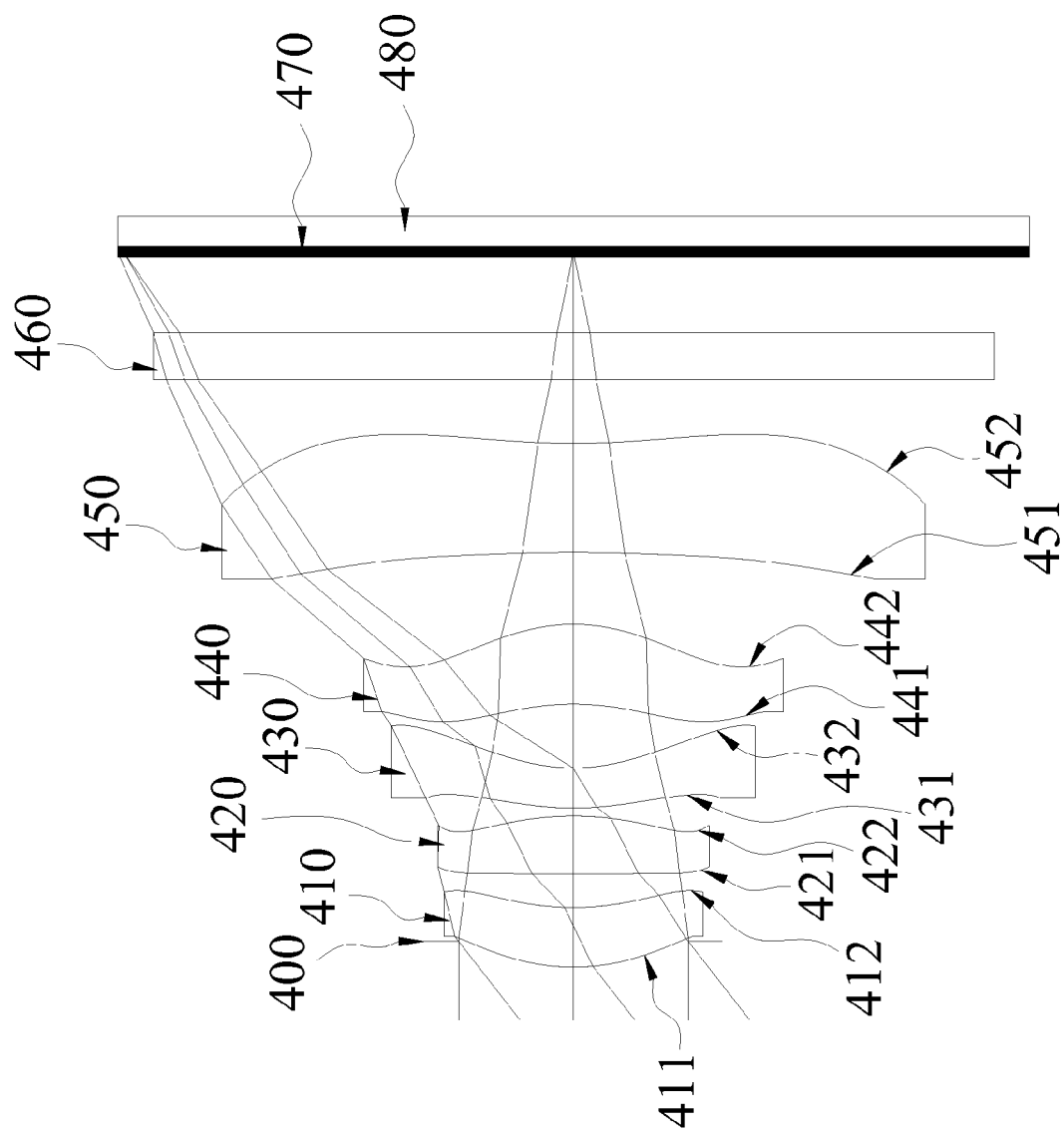
FIG. 4A is a schematic view of an imagery optical system in accordance with the fourth preferred embodiment of the present invention.
Figure 4B:
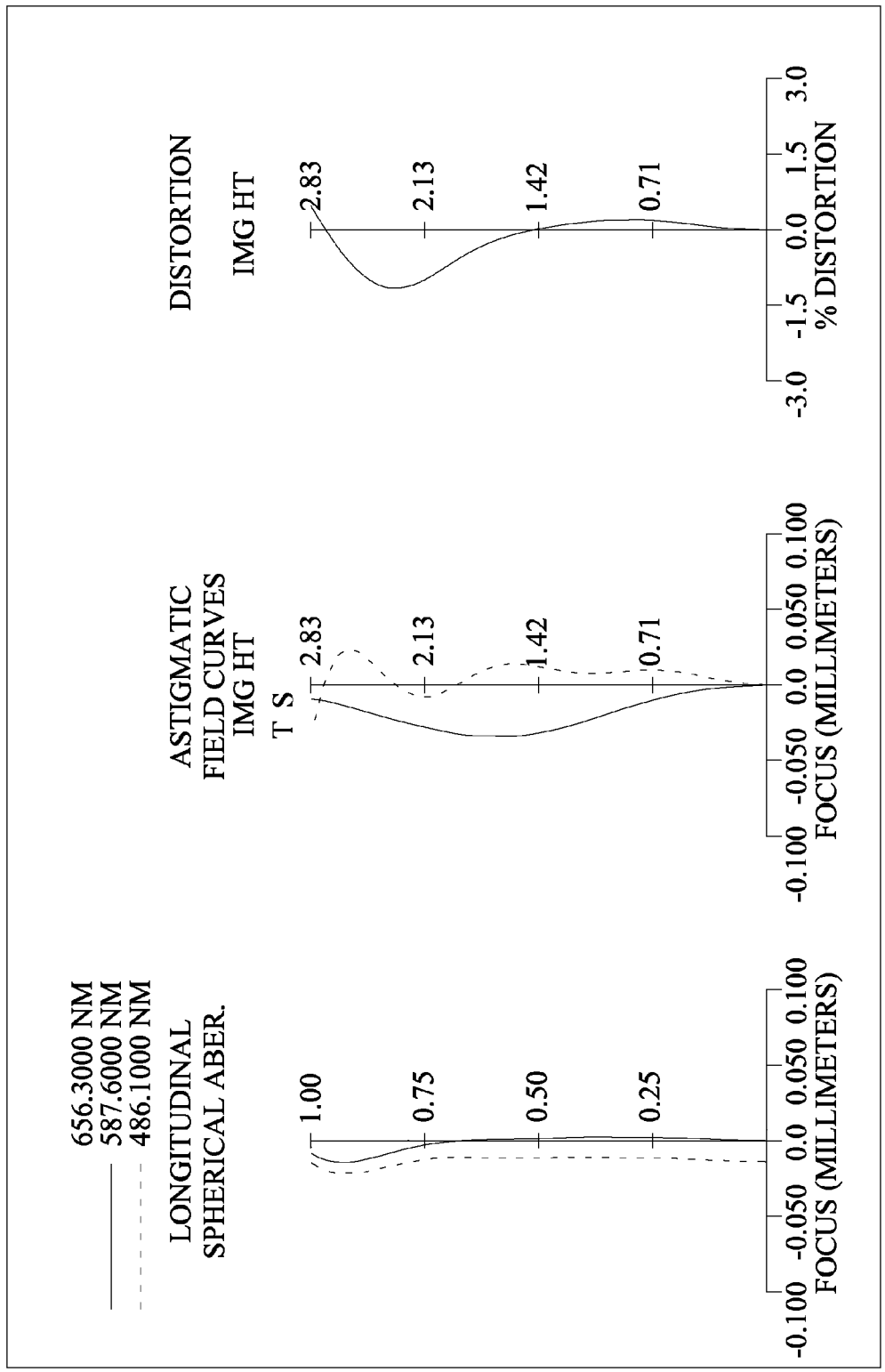
FIG. 4B is a series of aberration curves of the fourth preferred embodiment of the present invention.

With reference to FIGS. 4A and 4B for a schematic view of an imagery optical system and a series of aberration curves in accordance with the fourth preferred embodiment of the present invention respectively, the imagery optical system comprises five lens elements, an infrared filter (460), an aperture stop (400) and an image sensor (480), and the five lens elements sequentially arranged from an object side to an image side along an optical axis include: the first lens element (410) with positive refractive power and made of plastic, and having a convex object-side surface (411) and a concave image-side surface (412) along the optical axis, and both object-side surface (411) and image-side surface (412) are aspheric; the second lens element (420) with positive refractive power, made of plastic, and having a convex object-side surface (421) and a concave image-side surface (422) proximate to the optical axis, and both object-side surface (421) and image-side surface (422) are aspheric; the third lens element (430) with negative refractive power, made of plastic, and having a convex object-side surface (431) and a concave image-side surface (432) proximate to the optical axis, and both object-side surface (431) and image-side surface (432) are aspheric; the fourth lens element (440) with positive refractive power, made of plastic, and having a concave object-side surface (441) and a convex image-side surface (442) proximate to the optical axis, and both object-side surface (441) and image-side surface (442) are aspheric; the fifth lens element (450) with negative refractive power, made of plastic, and having a concave object-side surface (451) and a concave image-side surface (452) proximate to the optical axis, and both object-side surface (451) and image-side surface (452) are aspheric, and at least one of the object-side surface (451) and image-side surface (452) has at least one inflection point; an infrared filter (IR-filter) (460), made of glass which is a panel glass and does not affect the focal length of the imagery optical system of the present invention; an image sensor (480) installed at the image plane (470). In this preferred embodiment, the imagery optical system further comprises an aperture stop (400) disposed between the first lens element (410) and an object to be photographed, and the aperture stop (400) is a front aperture.

With reference to FIG. 18 (Table 7) for the optical data of the object-side surface of the first lens element (411), the image-side surface of the first lens element (412), the object-side surface of the second lens element (421), the image-side surface of the second lens element (422), the object-side surface of the third lens element (431), and the image-side surface of the third lens element (432), the object-side surface of the fourth lens element (441), the image-side surface of the fourth lens element (442), and the object-side surface of the fifth lens element (451) and the image-side surface of the fifth lens element (452) of this preferred embodiment are in compliance with the aspheric formula equation as shown in Equation (15) and the aspheric surface parameters are listed in FIG. 19 (Table 8).

In the imagery optical system of the fourth preferred embodiment, the overall focal length is f=3.62 (mm), the overall aperture value (f-number) Fno=2.50, and half of the maximum view angle is HFOV=38.0 (degrees).

With reference to Table 7 for the following data of this preferred embodiment, $T_{34}$ is the axial distance from the image-side surface of the third lens element (432) to the object-side surface of the fourth lens element (441); $T_{45}$ is the axial distance from the image-side surface of the fourth lens element (442) to the object-side surface of the fifth lens element (451); $R_4$ is the curvature radius of the image-side surface of the second lens element (422); $R_5$ is the curvature radius of the object-side surface of the third lens element (431); $v_1$ is the Abbe number of the first lens element (410), $v_3$ is the Abbe number of the third lens element (430), and they satisfy Relations (1), (2) and (3) as follows: $T_{45}/T_{34}$=1.12; $R_4/R_5$=−1.03; and $v_1−v_3$=32.5.

In this preferred embodiment, the imagery optical system further comprises an aperture stop (400) disposed between the first lens element (410) and an object to be photographed, and the axial distance from the object-side surface of the first lens element (411) to the image sensor (480) at the image plane (470) is TTL, and an image sensor is installed at the image plane, and half of the diagonal of the effective photosensitive area of the image sensor (480) is ImgH, and the axial distance from the aperture stop (400) to the image plane (470) is SL, and they satisfy the relations of TTL/ImgH=1.55 and SL/TTL=0.96 as shown in Relations (4) and (7) respectively. The overall focal length of the imagery optical system is f, the focal length of the first lens element (410) is $f_1$, the focal length of the second lens element (420) is $f_2$, the focal length of the third lens element (430) is $f_3$, the focal length of the fourth lens element (440) is $f_4$, the focal length of the fifth lens element (450) is $f_5$, and they satisfy the relations of $f/f_3$=−0.71; $(f/f_1)+(f/f_2)$=1.57; and $|f_5/f_4|$=1.03 as shown in Relations (9), (10) and (11) respectively.

In the imagery optical system of this preferred embodiment, the thickness of the fourth lens element (440) along the optical axis is $CT_4$, the axial distance from the object-side surface of the first lens element (411) to the image-side surface of the third lens element (432) is $D_{R1R6}$, the axial distance from the object-side surface of the first lens element (411) to the image-side surface of the fifth lens element (452) is $T_d$, and they satisfy the relations of $T_{34}/CT_4$=0.80 and $D_{R1R6}/T_d$=0.38 as shown in Relations (8) and (12) respectively. The curvature radius of the object-side surface of the fourth lens element (441) is $R_7$, the curvature radius of the image-side surface of the fourth lens element (442) is $R_8$, and they satisfy the relation of $(R_7+R_8)/(R_7−R_8)$=5.17 as shown in Relation (13), and related computing data of the equation are listed in FIG. 34 (Table 23).

From the optical data as shown in FIG. 18 (Table 7) and the series of aberration curves as shown in FIG. 4B, good compensation effects of the longitudinal spherical aberration, astigmatic field curving and distortion can be achieved by the imagery optical system in accordance with this preferred embodiment of the present invention.

<Fifth Preferred Embodiment>

Figure 5A:
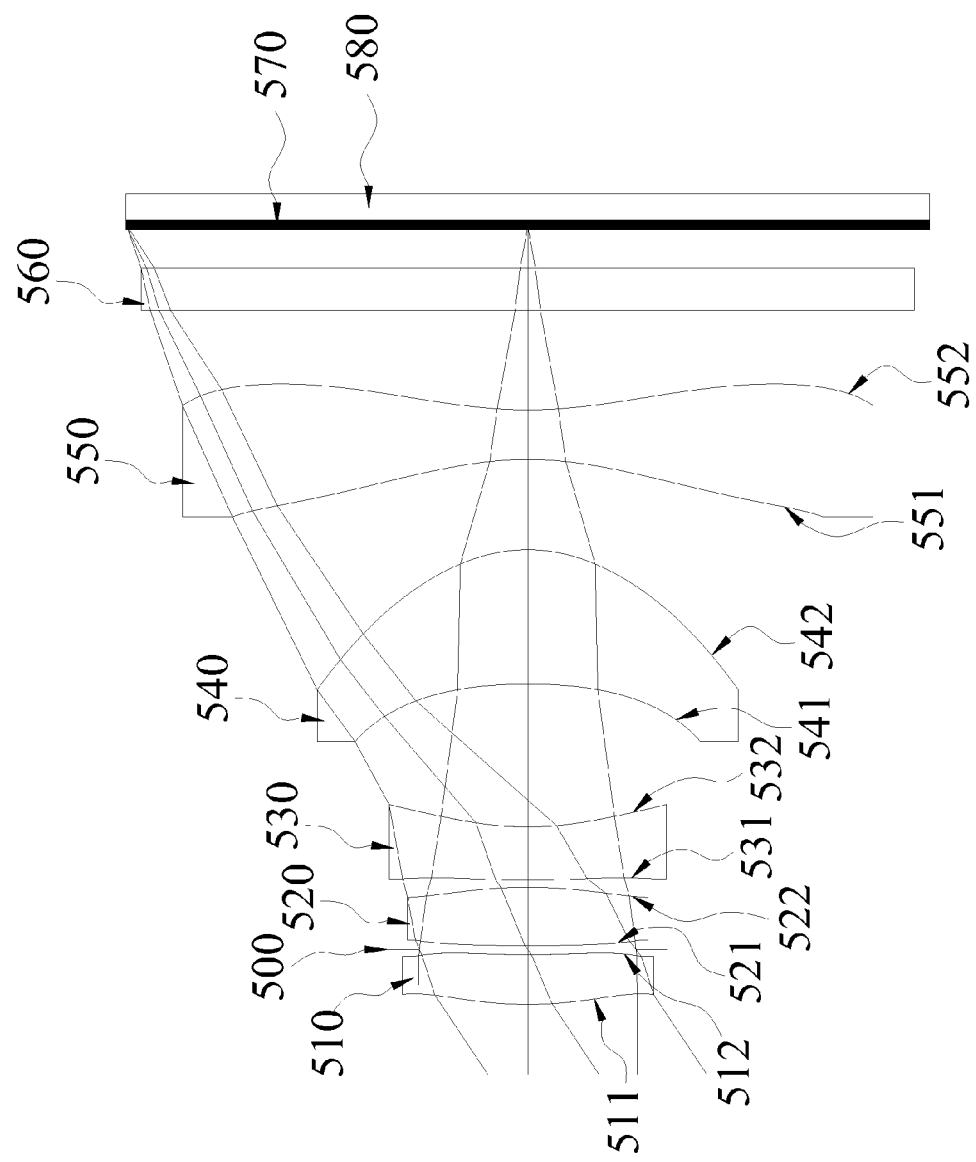
FIG. 5A is a schematic view of an imagery optical system in accordance with the fifth preferred embodiment of the present invention.
Figure 5B:
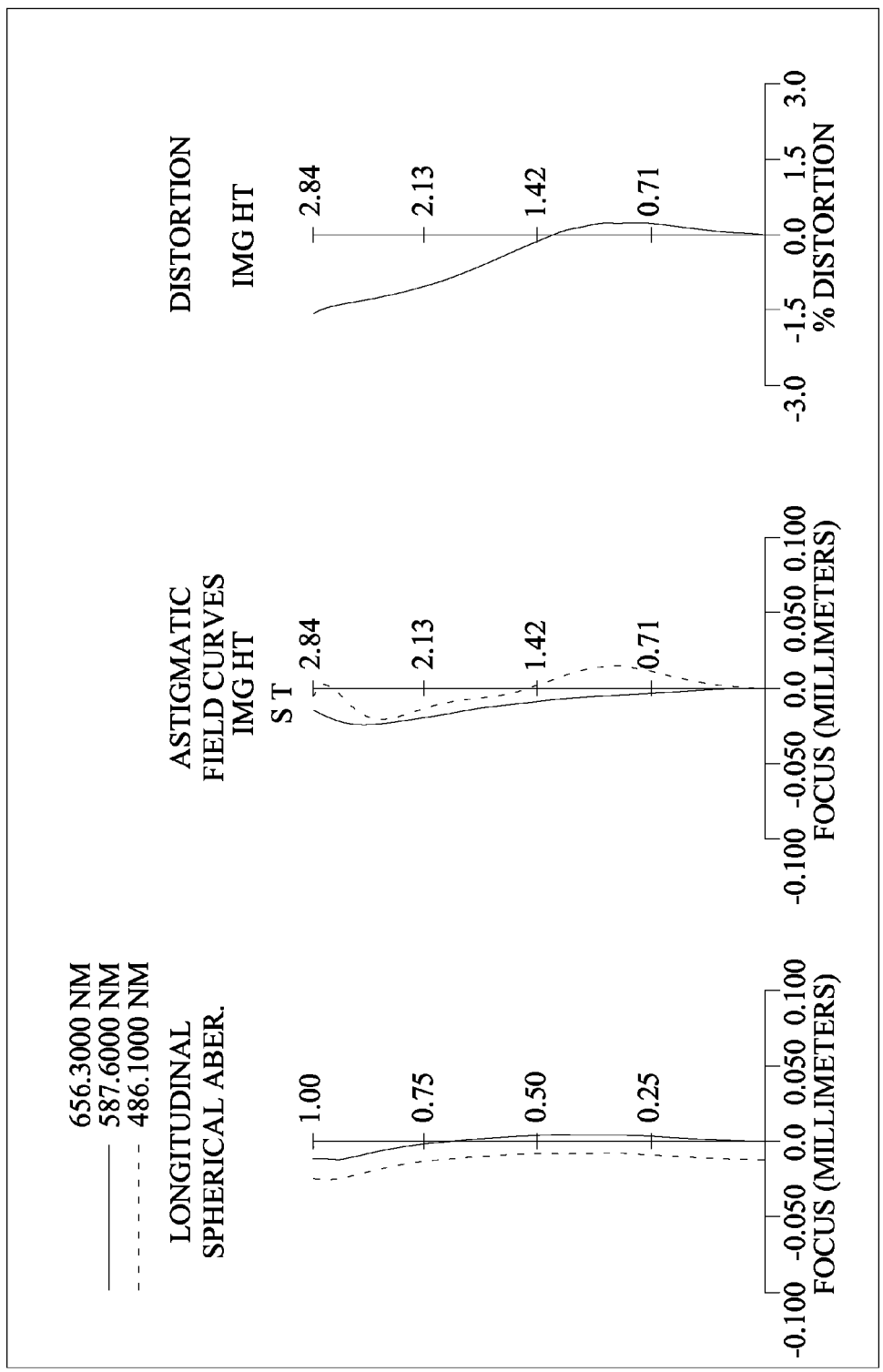
FIG. 5B is a series of aberration curves of the fifth preferred embodiment of the present invention.

With reference to FIGS. 5A and 5B for a schematic view of an imagery optical system and a series of aberration curves in accordance with the fifth preferred embodiment of the present invention respectively, the imagery optical system comprises five lens elements, an infrared filter (560), an aperture stop (500) and an image sensor (580), and the five lens elements sequentially arranged from an object side to an image side along an optical axis include: the first lens element (510) with positive refractive power, made of plastic and having a convex object-side surface (511) and a concave image-side surface (512) along the optical axis, and both object-side surface (511) and image-side surface (512) are aspheric; the second lens element (520) with positive refractive power, made of plastic, and having a convex object-side surface (521) and a convex image-side surface (522) proximate to the optical axis, and both object-side surface (521) and image-side surface (522) are aspheric; the third lens element (530) with negative refractive power, made of plastic, and having a convex object-side surface (531) and a concave image-side surface (532) proximate to the optical axis, and both object-side surface (531) and image-side surface (532) are aspheric; the fourth lens element (540) with positive refractive power, made of plastic, and having a concave object-side surface (541) and a convex image-side surface (542) proximate to the optical axis, and both object-side surface (541) and image-side surface (542) are aspheric; the fifth lens element (550) with negative refractive power, made of plastic, and having a concave object-side surface (551) and a concave image-side surface (552) proximate to the optical axis, and both object-side surface (551) and image-side surface (552) are aspheric, and at least one of the object-side surface (551) and image-side surface (552) has at least one inflection point; an infrared filter (IR-filter) (560), made of glass which is a panel glass and does not affect the focal length of the imagery optical system of the present invention; an image sensor (580) installed at the image plane (570). In this preferred embodiment, the imagery optical system further comprises an aperture stop (500) disposed between the first lens element (510) and the second lens element (520), and the aperture stop (500) is a middle aperture.

With reference to FIG. 20 (Table 9) for the optical data of the object-side surface of the first lens element (511), the image-side surface of the first lens element (512), the object-side surface of the second lens element (521), the image-side surface of the second lens element (522), the object-side surface of the third lens element (531), and the image-side surface of the third lens element (532), the object-side surface of the fourth lens element (541), the image-side surface of the fourth lens element (542), and the object-side surface of the fifth lens element (551) and the image-side surface of the fifth lens element (552) of this preferred embodiment are in compliance with the aspheric formula equation as shown in Equation (15) and the aspheric surface parameters are listed in FIG. 21 (Table 10).

In the imagery optical system of the fifth preferred embodiment, the overall focal length is f=4.32 (mm), the overall aperture value (f-number) Fno=2.80, and half of the maximum view angle is HFOV=33.7 (degrees).

With reference to Table 9 for the following data of this preferred embodiment, $T_{34}$ is the axial distance from the image-side surface of the third lens element (532) to the object-side surface of the fourth lens element (541); $T_{45}$ is the axial distance from the image-side surface of the fourth lens element (542) to the object-side surface of the fifth lens element (551); $R_4$ is the curvature radius of the image-side surface of the second lens element (522); $R_5$ is the curvature radius of the object-side surface of the third lens element (531); $v_1$ is the Abbe number of the first lens element (510), $v_3$ is the Abbe number of the third lens element (530), and they satisfy Relations (1), (2) and (3) as follows: $T_{45}/T_{34}$=0.63; $R_4/R_5$=−0.52; and $v_1−v_3$=32.5.

In this preferred embodiment, the imagery optical system further comprises an aperture stop (500) disposed between the first lens element (510) and the second lens element (520), and the axial distance from the object-side surface of the first lens element (511) to the image sensor (580) at the image plane (570) is TTL, and an image sensor is installed at the image plane, and half of the diagonal of the effective photosensitive area of the image sensor (580) is ImgH, and the axial distance from the aperture stop (500) to the image plane (570) is SL, and they satisfy the relations of TTL/ImgH=1.90 and SL/TTL=0.93 as shown in Relations (4) and (7) respectively. The overall focal length of the imagery optical system is f, the focal length of the first lens element (510) is $f_1$, the focal length of the second lens element (520) is $f_2$, the focal length of the third lens element (530) is $f_3$, the focal length of the fourth lens element (540) is $f_4$, the focal length of the fifth lens element (550) is $f_5$, and they satisfy the relations of $f/f_3=-0.83$; $(f/f_1)+(f/f_2)=1.46$ and $|f_5/f_4|=0.94$ as shown in Relations (9), (10) and (11) respectively.

In the imagery optical system of this preferred embodiment, the thickness of the fourth lens element (540) along the optical axis is $CT_4$, the axial distance from the object-side surface of the first lens element (511) to the image-side surface of the third lens element (532) is $D_{R1R6}$, the axial distance from the object-side surface of the first lens element (511) to the image-side surface of the fifth lens element (552) is $T_d$, and they satisfy the relations of $T_{34}/CT_4=1.06$ and $D_{R1R6}/T_d=0.30$ as shown in Relations (8) and (12) respectively. The curvature radius of the object-side surface of the fourth lens element (541) is $R_7$, the curvature radius of the image-side surface of the fourth lens element (542) is $R_8$, and they satisfy the relation of $(R_7+R_8)/(R_7-R_8)=1.90$ as shown in Relation (13), and related computing data of the equation are listed in FIG. 34 (Table 23).

From the optical data as shown in FIG. 20 (Table 9) and the series of aberration curves as shown in FIG. 5B, good compensation effects of the longitudinal spherical aberration, astigmatic field curving and distortion can be achieved by the imagery optical system in accordance with this preferred embodiment of the present invention.

<Sixth Preferred Embodiment>

Figure 6A:
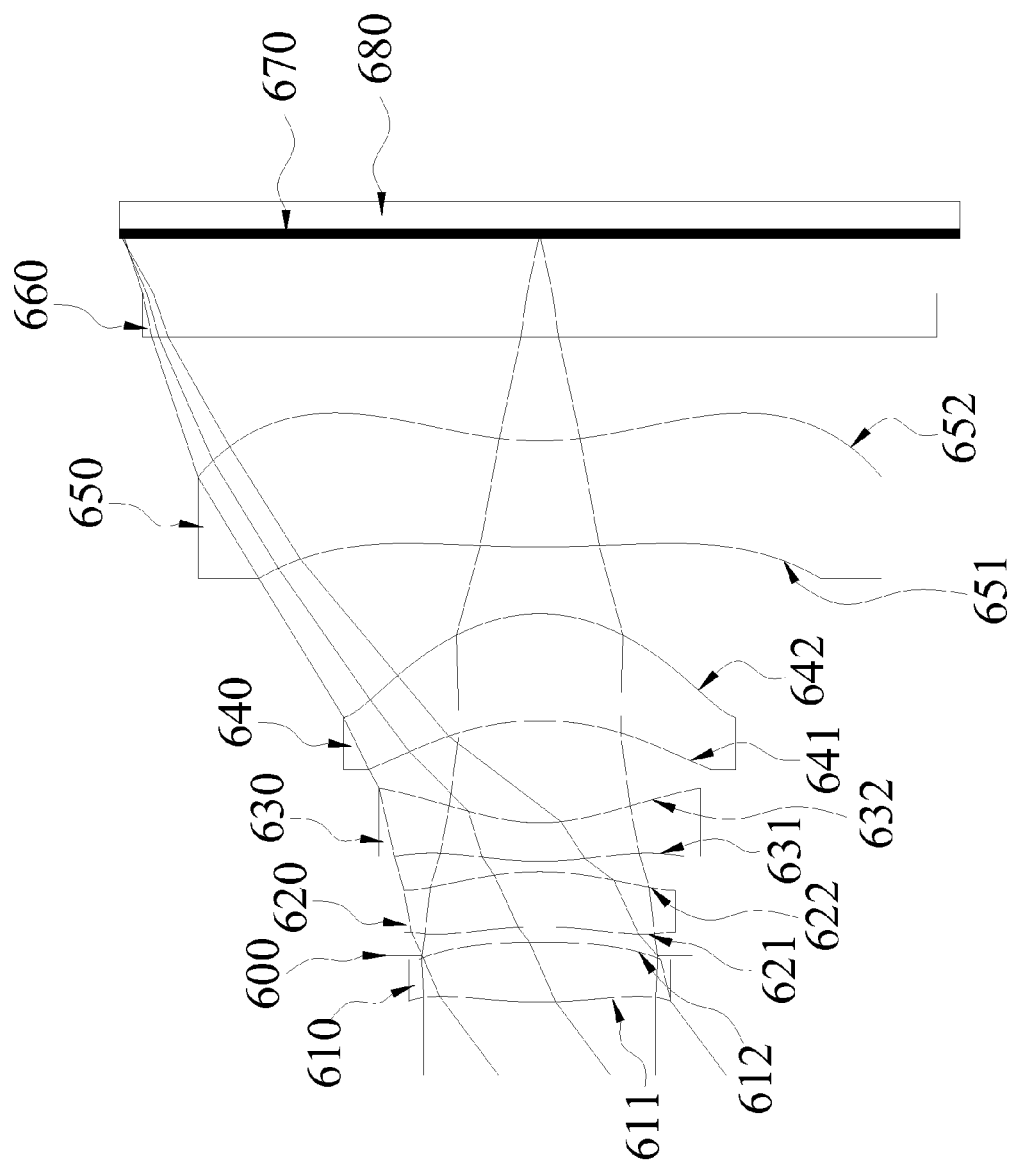
FIG. 6A is a schematic view of an imagery optical system in accordance with the sixth preferred embodiment of the present invention.
Figure 6B:
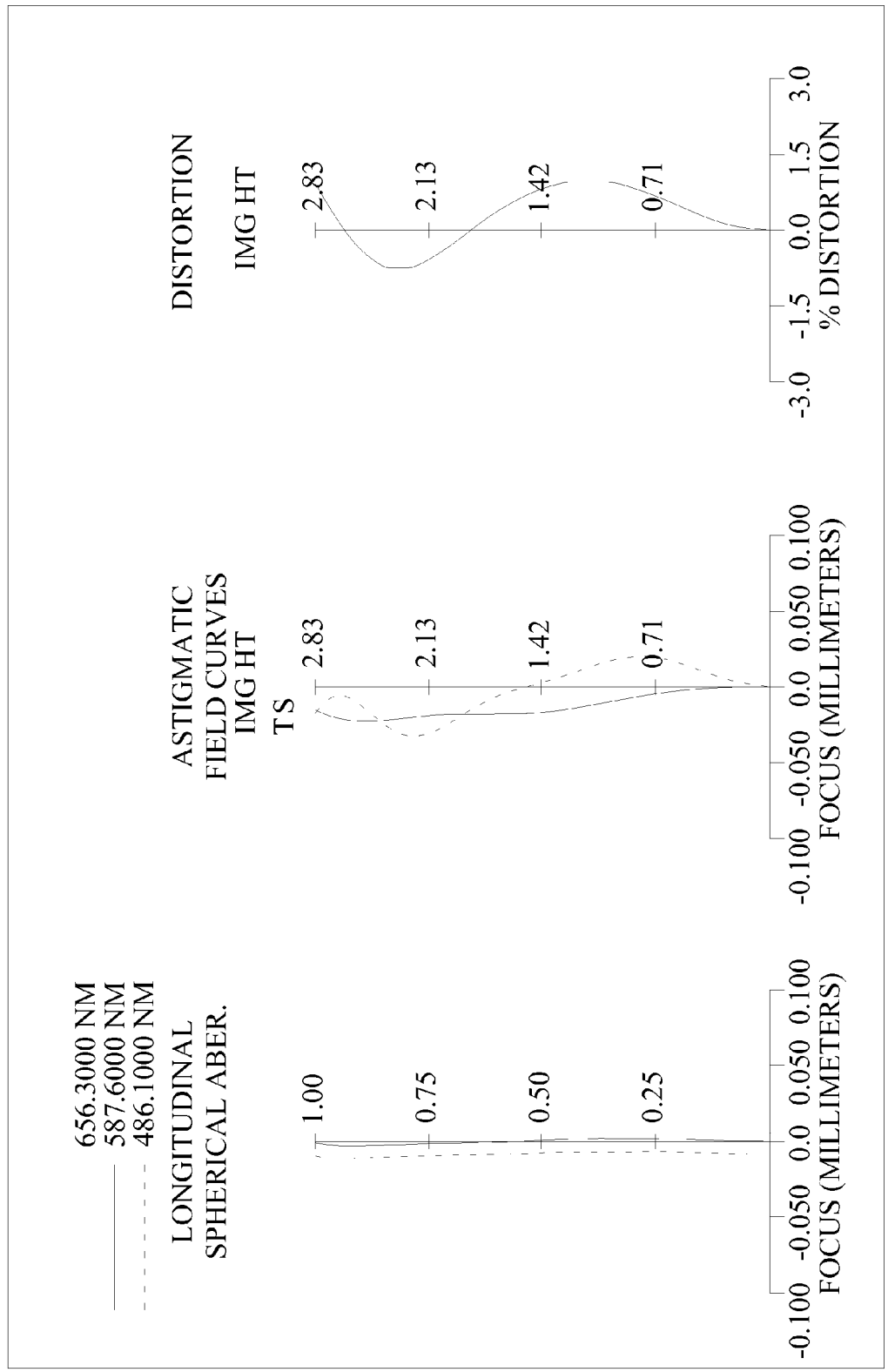
FIG. 6B is a series of aberration curves of the sixth preferred embodiment of the present invention.

With reference to FIGS. 6A and 6B for a schematic view of an imagery optical system and a series of aberration curves in accordance with the sixth preferred embodiment of the present invention respectively, the imagery optical system comprises five lens elements, an infrared filter (660), an aperture stop (600) and an image sensor (680), and the five lens elements sequentially arranged from an object side to an image side along an optical axis include: a bi-convex first lens element (610) with positive refractive power, made of plastic, and both object-side surface (611) and image-side surface (612) are aspheric; the second lens element (620) with positive refractive power, made of plastic, and having a concave object-side surface (621) and a convex image-side surface (622) proximate to the optical axis, and both object-side surface (621) and image-side surface (622) are aspheric; the third lens element (630) with negative refractive power, made of plastic, and having a convex object-side surface (631) and a concave image-side surface (632) proximate to the optical axis, and both object-side surface (631) and image-side surface (632) are aspheric; the fourth lens element (640) with positive refractive power, made of plastic, and having a concave object-side surface (641) and a convex image-side surface (642) proximate to the optical axis, and both object-side surface (641) and image-side surface (642) are aspheric; the fifth lens element (650) with negative refractive power, made of plastic, and having a convex object-side surface (651) and a concave image-side surface (652) proximate to the optical axis, and both object-side surface (651) and image-side surface (652) are aspheric, and at least one of the object-side surface (651) and image-side surface (652) has at least one inflection point; an infrared filter (IR-filter) (660), made of glass which is a panel glass and does not affect the focal length of the imagery optical system of the present invention; an image sensor (680) installed at the image plane (670). In this preferred embodiment, the imagery optical system further comprises an aperture stop (600) disposed between the first lens element (610) and the second lens element (620).

With reference to FIG. 22 (Table 11) for the optical data of the object-side surface of the first lens element (611), the image-side surface of the first lens element (612), the object-side surface of the second lens element (621), the image-side surface of the second lens element (622), the object-side surface of the third lens element (631), and the image-side surface of the third lens element (632), the object-side surface of the fourth lens element (641), the image-side surface of the fourth lens element (642), and the object-side surface of the fifth lens element and the image-side surface of the fifth lens element (652) of this preferred embodiment are in compliance with the aspheric formula equation as shown in Equation (15) and the aspheric surface parameters are listed in FIG. 23 (Table 12).

In the imagery optical system of the sixth preferred embodiment, the overall focal length is $f=3.77$ (mm), the overall aperture value (f-number) Fno=2.40, and half of the maximum view angle is HFOV=36.7 (degrees).

With reference to Table 11 for the following data of this preferred embodiment, $T_{34}$ is the axial distance from the image-side surface of the third lens element (632) to the object-side surface of the fourth lens element (641); $T_{45}$ is the axial distance from the image-side surface of the fourth lens element (642) and the object-side surface of the fifth lens element (651); $R_4$ is the curvature radius of the image-side surface of the second lens element (622); $R_5$ is the curvature radius of the object-side surface of the third lens element (631); $v_1$ is the Abbe number of the first lens element (610), $v_3$ is the Abbe number of the third lens element (630), and they satisfy Relations (1), (2) and (3) as follows: $T_{45}/T_{34}=0.66$; $R_4/R_5=-0.79$; $v_1-v_3=32.1$.

In this preferred embodiment, the imagery optical system further comprises an aperture stop (600) disposed between the first lens element (610) and the second lens element (620), and the axial distance from the object-side surface of the first lens element (611) to the image sensor (680) at the image plane (670) is TTL, and an image sensor is installed at the image plane, and half of the diagonal of the effective photosensitive area of the image sensor (680) is ImgH, and the axial distance from the aperture stop (600) to the image plane (670) is SL, and they satisfy the relations of TTL/ImgH=1.80 and SL/TTL=0.94 as shown in Relations (4) and (7) respectively. The overall focal length of the imagery optical system is f, the focal length of the first lens element (610) is $f_1$, the focal length of the second lens element (620) is $f_2$, the focal length of the third lens element (630) is $f_3$, the focal length of the fourth lens element (640) is $f_4$, the focal length of the fifth lens element (650) is $f_5$, and they satisfy the relations of $f/f_3=-0.82$; $(f/f_1)+(f/f_2)=1.44$ and $|f_5/f_4|=1.36$ as shown in Relations (9), (10) and (11) respectively.

In the imagery optical system of this preferred embodiment, the thickness of the fourth lens element (640) along the optical axis is $CT_4$, the axial distance from the object-side surface of the first lens element (611) to the image-side surface of the third lens element (632) is $D_{R1R6}$, the axial distance from the object-side surface of the first lens element (611) to the image-side surface of the fifth lens element (652) is $T_d$, and they satisfy the relations of $T_{34}/CT_4=0.96$ and $D_{R1R6}/T_d=0.32$ as shown in Relations (8) and (12) respectively. The curvature radius of the object-side surface of the fourth lens element (641) is $R_7$, the curvature radius of the image-side surface of the fourth lens element (642) is $R_8$, and they satisfy the relation of $(R_7+R_8)/(R_7-R_8)=3.88$ as shown in Relation (13), and related computing data of the equation are listed in FIG. 34 (Table 23).

From the optical data as shown in FIG. 22 (Table 11) and the series of aberration curves as shown in FIG. 6B, good compensation effects of the longitudinal spherical aberration, astigmatic field curving and distortion can be achieved by the imagery optical system in accordance with this preferred embodiment of the present invention.

<Seventh Preferred Embodiment>

Figure 7A:
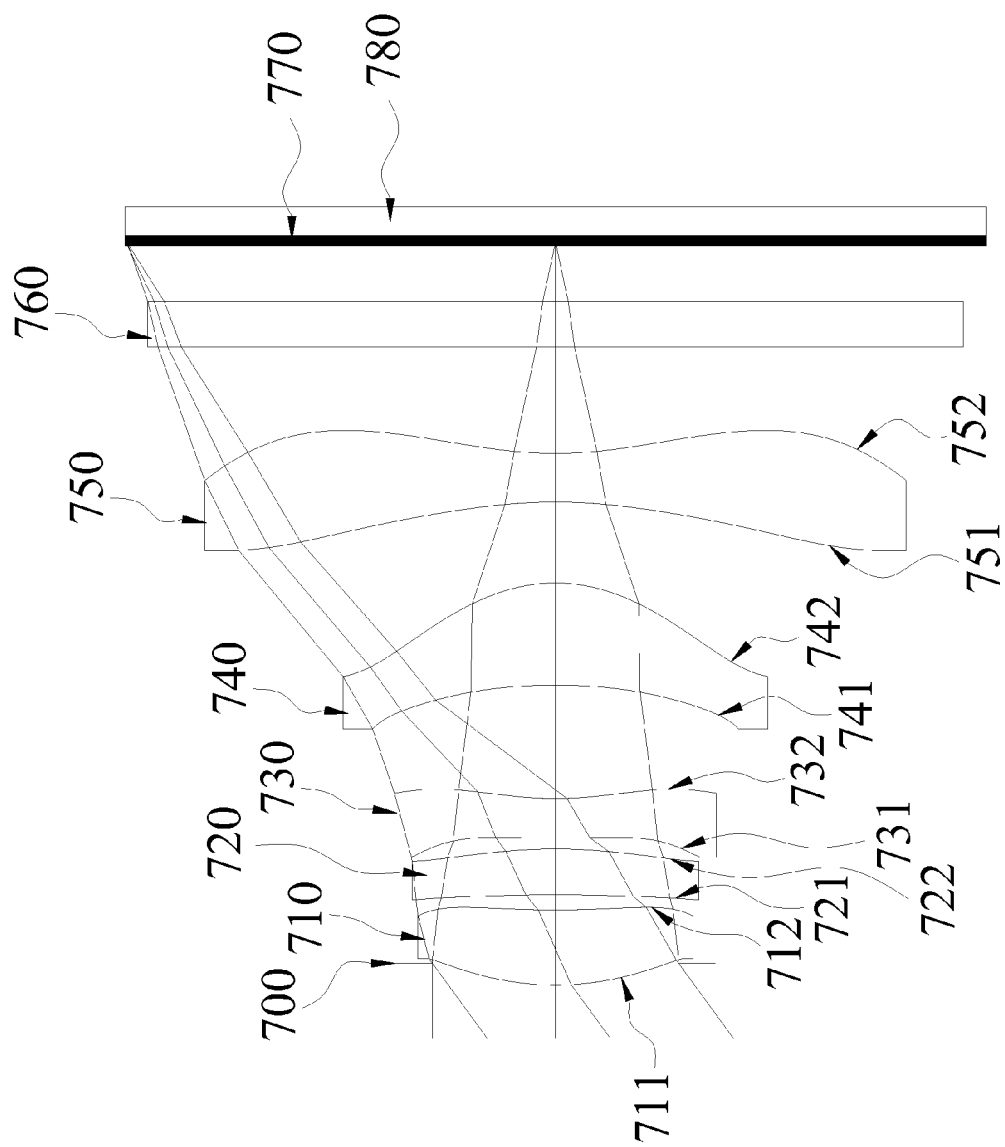
FIG. 7A is a schematic view of an imagery optical system in accordance with the seventh preferred embodiment of the present invention.
Figure 7B:
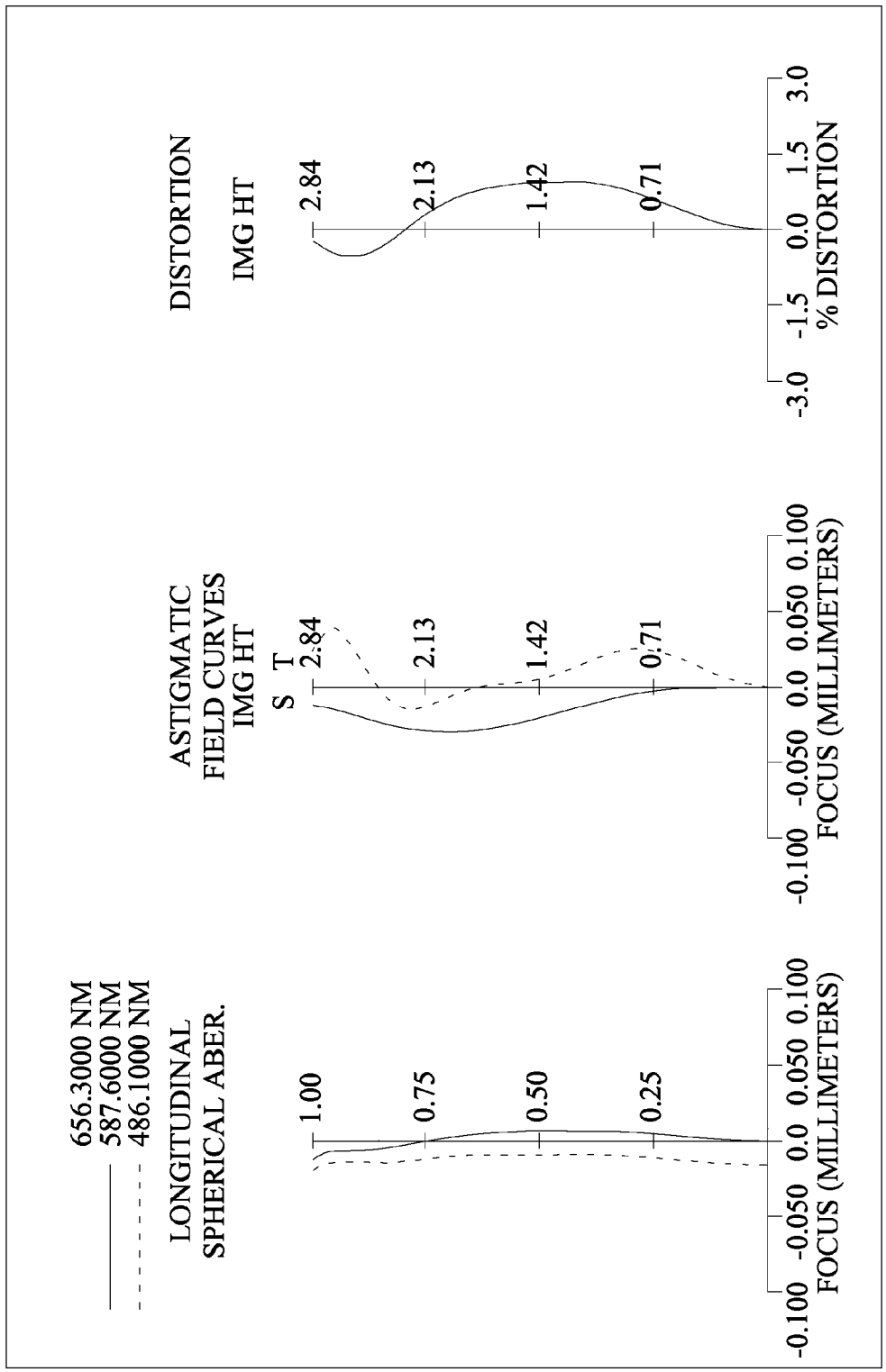
FIG. 7B is a series of aberration curves of the seventh preferred embodiment of the present invention.

With reference to FIGS. 7A and 7B for a schematic view of an imagery optical system and a series of aberration curves in accordance with the seventh preferred embodiment of the present invention respectively, the imagery optical system comprises five lens elements, an infrared filter (760), an aperture stop (700) and an image sensor (780), and the five lens elements sequentially arranged from an object side to an image side along an optical axis include: the first lens element (710) with positive refractive power, made of plastic, and having a convex object-side surface (711) and a concave image-side surface (712), and both object-side surface (711) and image-side surface (712) are aspheric; the second lens element (720) with positive refractive power, made of plastic, and having a concave object-side surface (721) and a convex image-side surface (722) proximate to the optical axis, and both object-side surface (721) and image-side surface (722) are aspheric; the third lens element (730) with negative refractive power, made of plastic, and having a convex object-side surface (731) and a concave image-side surface (732) proximate to the optical axis, and both object-side surface (731) and image-side surface (732) are aspheric; the fourth lens element (740) with positive refractive power, made of plastic, and having a concave object-side surface (741) and a convex image-side surface (742) proximate to the optical axis, and both object-side surface (741) and image-side surface (742) are aspheric; the fifth lens element (750) with negative refractive power, made of plastic, and having a concave object-side surface (751) and a concave image-side surface (752) proximate to the optical axis, and both object-side surface (751) and image-side surface (752) are aspheric, and at least one of the object-side surface (751) and image-side surface (752) has at least one inflection point; an infrared filter (IR-filter) (760), made of glass which is a panel glass and does not affect the focal length of the imagery optical system of the present invention; an image sensor (780) installed along the image plane (770). In this preferred embodiment, the imagery optical system further comprises an aperture stop (700) disposed between the first lens element (710) and an object to be photographed, and the aperture stop (700) is a front aperture.

With reference to FIG. 24 (Table 13) for the optical data of the object-side surface of the first lens element (711), the image-side surface of the first lens element (712), the object-side surface of the second lens element (721), the image-side surface of the second lens element (722), the object-side surface of the third lens element (731), and the image-side surface of the third lens element (732), the object-side surface of the fourth lens element (741), the image-side surface of the fourth lens element (742), and the object-side surface of the fifth lens element (751) and the image-side surface of the fifth lens element (752) of this preferred embodiment are in compliance with the aspheric formula equation as shown in Equation (15) and the aspheric surface parameters are listed in FIG. 25 (Table 14).

In the imagery optical system of the seventh preferred embodiment, the overall focal length is f=3.89 (mm), the overall aperture value (f-number) Fno=2.40, and half of the maximum view angle is HFOV=36.1 (degrees).

With reference to Table 13 for the following data of this preferred embodiment, $T_{34}$ is the axial distance from the image-side surface of the third lens element (732) to the object-side surface of the fourth lens element (741); $T_{45}$ is the axial distance from the image-side surface of the fourth lens element (742) to the object-side surface of the fifth lens element (751); $R_4$ is the curvature radius of the image-side surface of the second lens element (722); $R_5$ is the curvature radius of the object-side surface of the third lens element (731); $v_1$ is the Abbe number of the first lens element (710), $v_3$ is the Abbe number of the third lens element (730), and they satisfy Relations (1), (2) and (3) as follows: $T_{45}/T_{34}=0.71$; $R_4/R_5=-0.43$; and $v_1-v_3=32.5$.

In this preferred embodiment, the imagery optical system further comprises an aperture stop (700) disposed between the first lens element (710) and an object to be photographed, and the axial distance from the object-side surface of the first lens element (711) to the image sensor (780) at the image plane (770) is TTL, and an image sensor is installed at the image plane, and half of the diagonal of the effective photosensitive area of the image sensor (780) is ImgH, and the axial distance from the aperture stop (700) to the image plane (770) is SL, and they satisfy the relations of TTL/ImgH=1.69 and SL/TTL=0.97 as shown in Relations (4) and (7) respectively. The overall focal length of the imagery optical system is f, the focal length of the first lens element (710) is $f_1$, the focal length of the second lens element (720) is $f_2$, the focal length of the third lens element (730) is $f_3$, the focal length of the fourth lens element (740) is $f_4$, the focal length of the fifth lens element (750) is $f_5$, and they satisfy the relations of $f/f_3=-0.74$; $(f/f_1)+(f/f_2)=1.29$; $|f_5/f_4|=1.09$ as shown in Relations (9), (10) and (11) respectively.

In the imagery optical system of this preferred embodiment, the thickness of the fourth lens element (740) along the optical axis is $CT_4$, the axial distance from the object-side surface of the first lens element (711) to the image-side surface of the third lens element (732) is $D_{R1R6}$, the axial distance from the object-side surface of the first lens element (711) to the image-side surface of the fifth lens element (752) is $T_d$, and they satisfy the relations of $T_{34}/CT_4=1.11$ and $D_{R1R6}/T_d=0.35$ as shown in Relations (8) and (12) respectively. The curvature radius of the object-side surface of the fourth lens element (741) is $R_7$, the curvature radius of the image-side surface of the fourth lens element (742) is $R_8$, and they satisfy the relation of $(R_7+R_8)/(R_7-R_8)=1.75$ as shown in Relation (13), and related computing data of the equation are listed in FIG. 34 (Table 23).

From the optical data as shown in FIG. 24 (Table 13) and the series of aberration curves as shown in FIG. 7B, good compensation effects of the longitudinal spherical aberration, astigmatic field curving and distortion can be achieved by the imagery optical system in accordance with this preferred embodiment of the present invention.

<Eighth Preferred Embodiment>

Figure 8A:
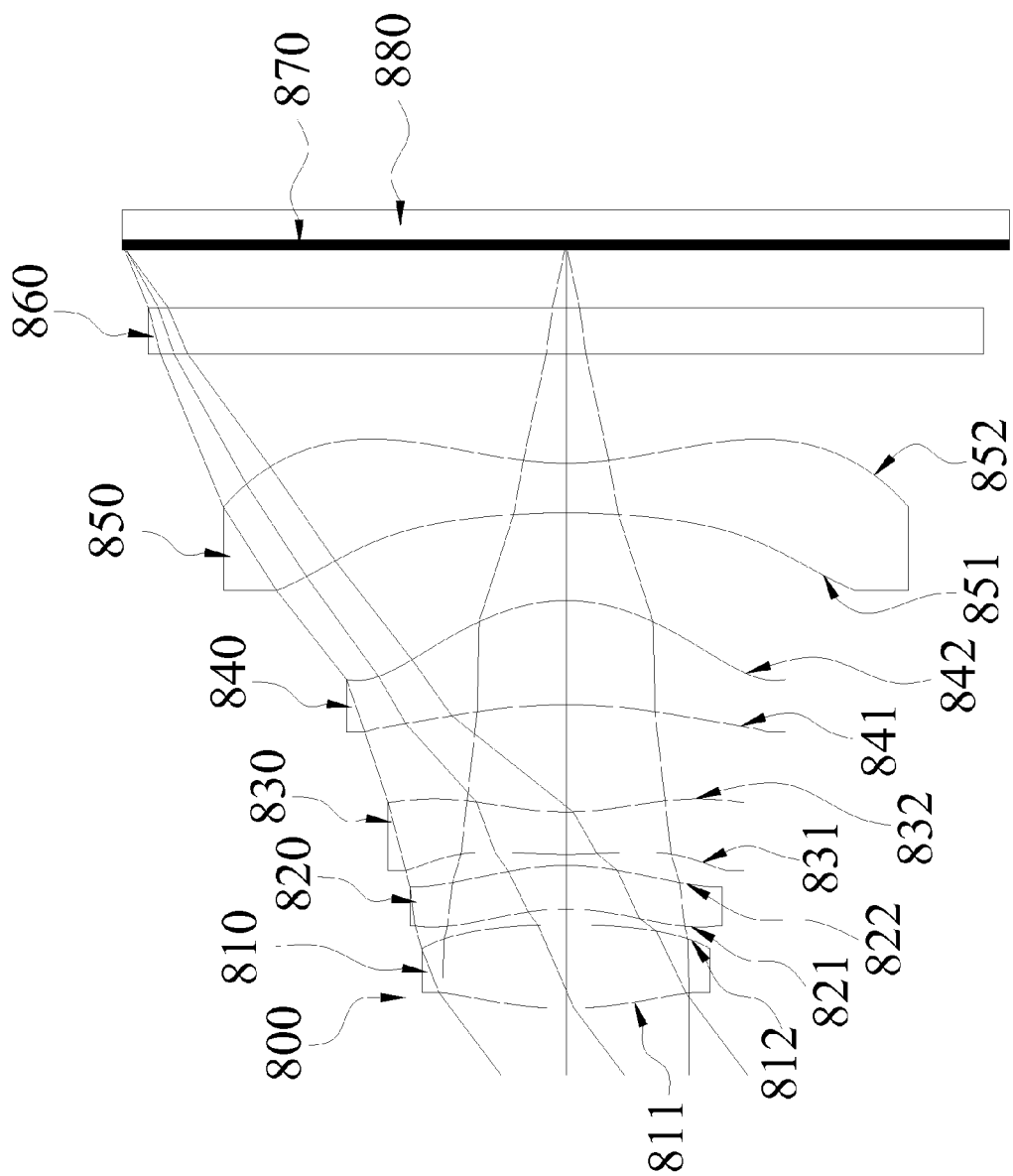
FIG. 8A is a schematic view of an imagery optical system in accordance with the eighth preferred embodiment of the present invention.
Figure 8B:
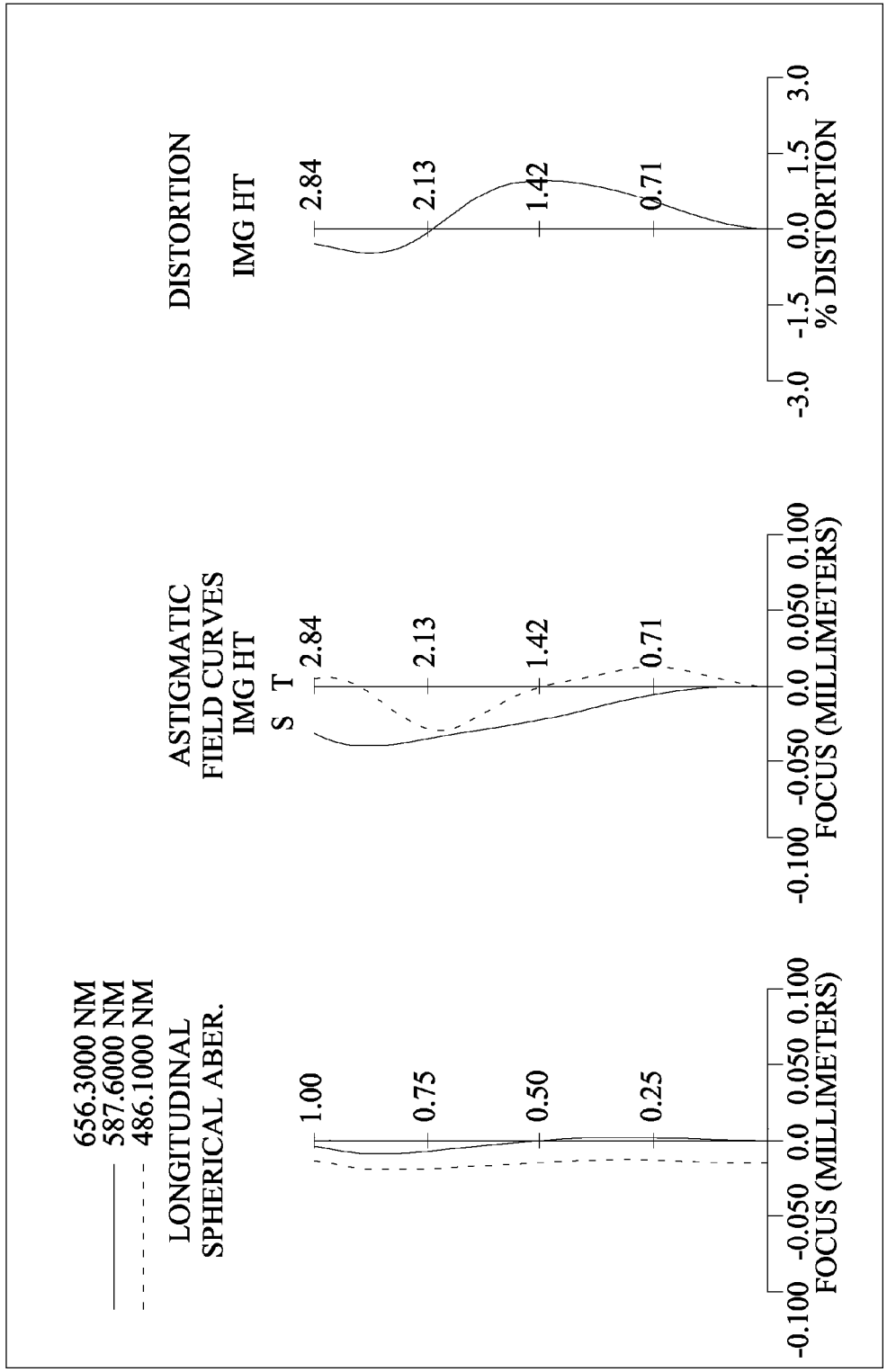
FIG. 8B is a series of aberration curves of the eighth preferred embodiment of the present invention.

With reference to FIGS. 8A and 8B for a schematic view of an imagery optical system and a series of aberration curves in accordance with the eighth preferred embodiment of the present invention respectively, the imagery optical system comprises five lens elements, an infrared filter (860), an aperture stop (800) and an image sensor (880), and the five lens elements sequentially arranged from an object side to an image side along an optical axis include: a bi-convex first lens element (810) with positive refractive power, made of plastic, and both object-side surface (811) and image-side surface (812) are aspheric; the second lens element (820) with positive refractive power, made of plastic, and having a concave object-side surface (821) and a convex image-side surface (822) proximate to the optical axis, and both object-side surface (821) and image-side surface (822) are aspheric; the third lens element (830) with negative refractive power, made of plastic, and having a convex object-side surface (831) and a concave image-side surface (832) proximate to the optical axis, and both object-side surface (831) and image-side surface (832) are aspheric; the fourth lens element (840) with positive refractive power, made of plastic, and having a concave object-side surface (841) and a convex image-side surface (842) proximate to the optical axis, and both object-side surface (841) and image-side surface (842) are aspheric; the fifth lens element (850) with negative refractive power, made of plastic, and having a concave object-side surface (851) and a concave image-side surface (852) proximate to the optical axis, and both object-side surface (851) and image-side surface (852) are aspheric, and at least one of the object-side surface (851) and image-side surface (852) has at least one inflection point; an infrared filter (IR-filter) (860), made of glass which is a panel glass and does not affect the focal length of the imagery optical system of the present invention; an image sensor (880) installed at the image plane (870). In this preferred embodiment, the imagery optical system further comprises an aperture stop (800) disposed between the first lens element (810) and an object to be photographed, and the aperture stop (800) is a front aperture.

With reference to FIG. 26 (Table 15) for the optical data of the object-side surface of the first lens element (811), the image-side surface of the first lens element (812), the object-side surface of the second lens element (821), the image-side surface of the second lens element (822), the object-side surface of the third lens element (831), and the image-side surface of the third lens element (832), the object-side surface of the fourth lens element (841), the image-side surface of the fourth lens element (842), and the object-side surface of the fifth lens element (851) and the image-side surface of the fifth lens element (852) of this preferred embodiment are in compliance with the aspheric formula equation as shown in Equation (15) and the aspheric surface parameters are listed in FIG. 27 (Table 15).

In the imagery optical system of the eighth preferred embodiment, the overall focal length is f=3.79 (mm), the overall aperture value (f-number) Fno=2.40, and half of the maximum view angle is HFOV=36.9 (degrees).

With reference to Table 15 for the following data of this preferred embodiment, $T_{34}$ is the axial distance from the image-side surface of the third lens element (832) to the object-side surface of the fourth lens element (841); $T_{45}$ is the axial distance from the image-side surface of the fourth lens element (842) to the object-side surface of the fifth lens element (851); $R_4$ is the curvature radius of the image-side surface of the second lens element (822); $R_5$ is the curvature radius of the object-side surface of the third lens element (831); $v_1$ is the Abbe number of the first lens element (810), $v_3$ is the Abbe number of the third lens element (830), and they satisfy Relations (1), (2) and (3) as follows: $T_{45}/T_{34}$=0.82; $R_4/R_5$=−0.37; and $v_1-v_3$=32.5.

In this preferred embodiment, the imagery optical system further comprises an aperture stop (800) disposed between the first lens element (810) and an object to be photographed, and the axial distance from the object-side surface of the first lens element (811) to the image sensor (880) at the image plane (870) is TTL, and an image sensor is installed at the image plane, and half of the diagonal of the effective photosensitive area of the image sensor (880) is ImgH, and the axial distance from the aperture stop (800) to the image plane (870) is SL, and they satisfy the relations of TTL/ImgH=1.69 and SL/TTL=0.99 as shown in Relations (4) and (7) respectively. The overall focal length of the imagery optical system is f, the focal length of the first lens element (810) is $f_1$, the focal length of the second lens element (820) is $f_2$, the focal length of the third lens element (830) is $f_3$, the focal length of the fourth lens element (840) is $f_4$, the focal length of the fifth lens element (850) is $f_5$, and they satisfy the relations of f/$f_3$=−0.78; (f/$f_1$)+(f/$f_2$)=1.35; |$f_5/f_4$|=1.08 as shown in Relations (9), (10) and (11) respectively.

In the imagery optical system of this preferred embodiment, the thickness of the fourth lens element (840) along the optical axis is $CT_4$, the axial distance from the object-side surface of the first lens element (811) to the image-side surface of the third lens element (832) is $D_{R1R6}$, the axial distance from the object-side surface of the first lens element (811) to the image-side surface of the fifth lens element (852) is $T_d$, and they satisfy the relations of $T_{34}/CT_4$=1.03 and $D_{R1R6}/T_d$=0.36 as shown in Relations (8) and (12) respectively. The curvature radius of the object-side surface of the fourth lens element (841) is $R_7$, the curvature radius of the image-side surface of the fourth lens element (842) is $R_8$, and they satisfy the relation of $(R_7+R_8)/(R_7-R_8)$=1.84 as shown in Relation (13), and related computing data of the equation are listed in FIG. 34 (Table 23).

From the optical data as shown in FIG. 26 (which is Table 15) and the series of aberration curves as shown in FIG. 8B, good compensation effects of the longitudinal spherical aberration, astigmatic field curving and distortion can be achieved by the imagery optical system in accordance with this preferred embodiment of the present invention.

<Ninth Preferred Embodiment>

Figure 9A:
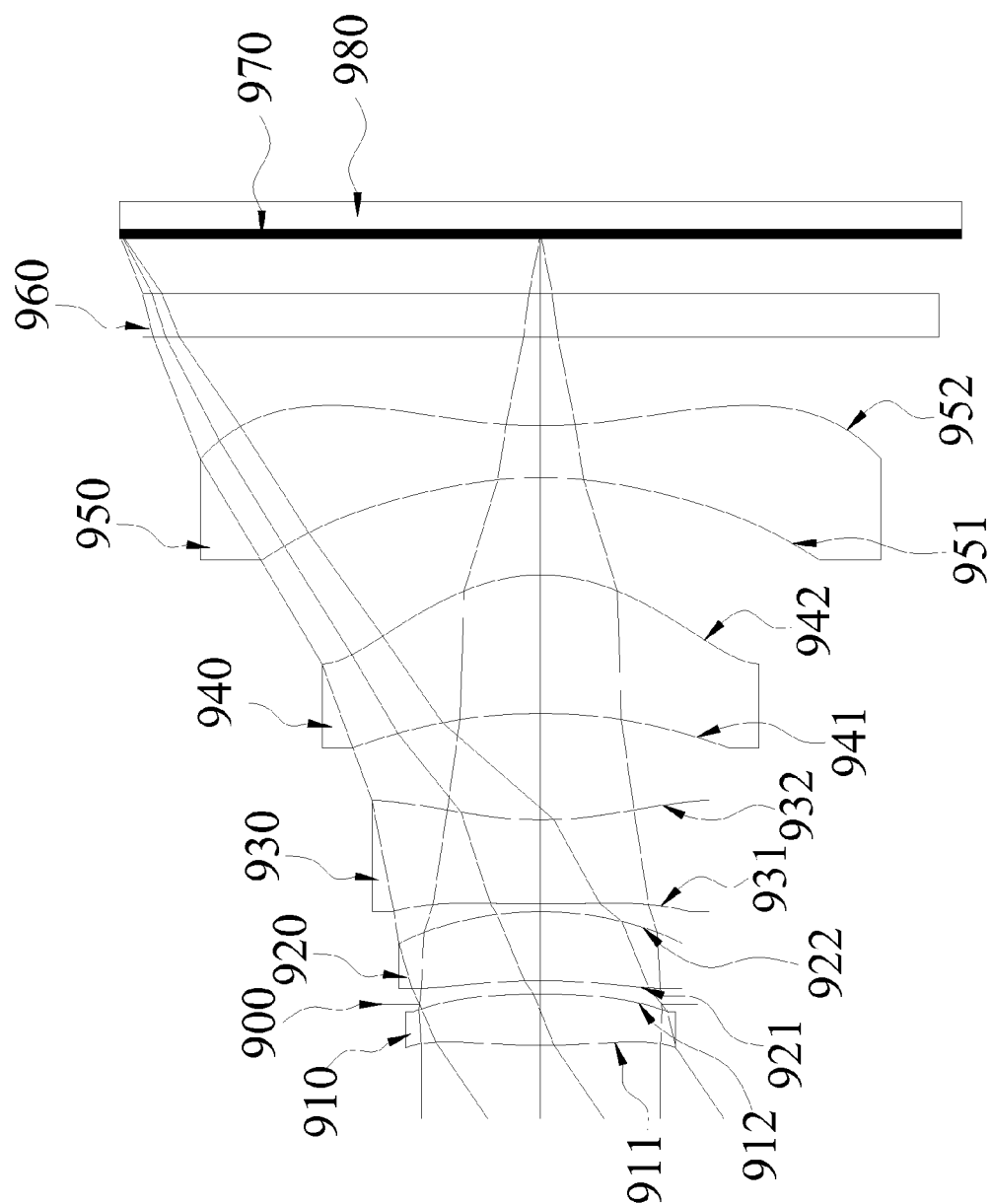
FIG. 9A is a schematic view of an imagery optical system in accordance with the ninth preferred embodiment of the present invention.
Figure 9B:
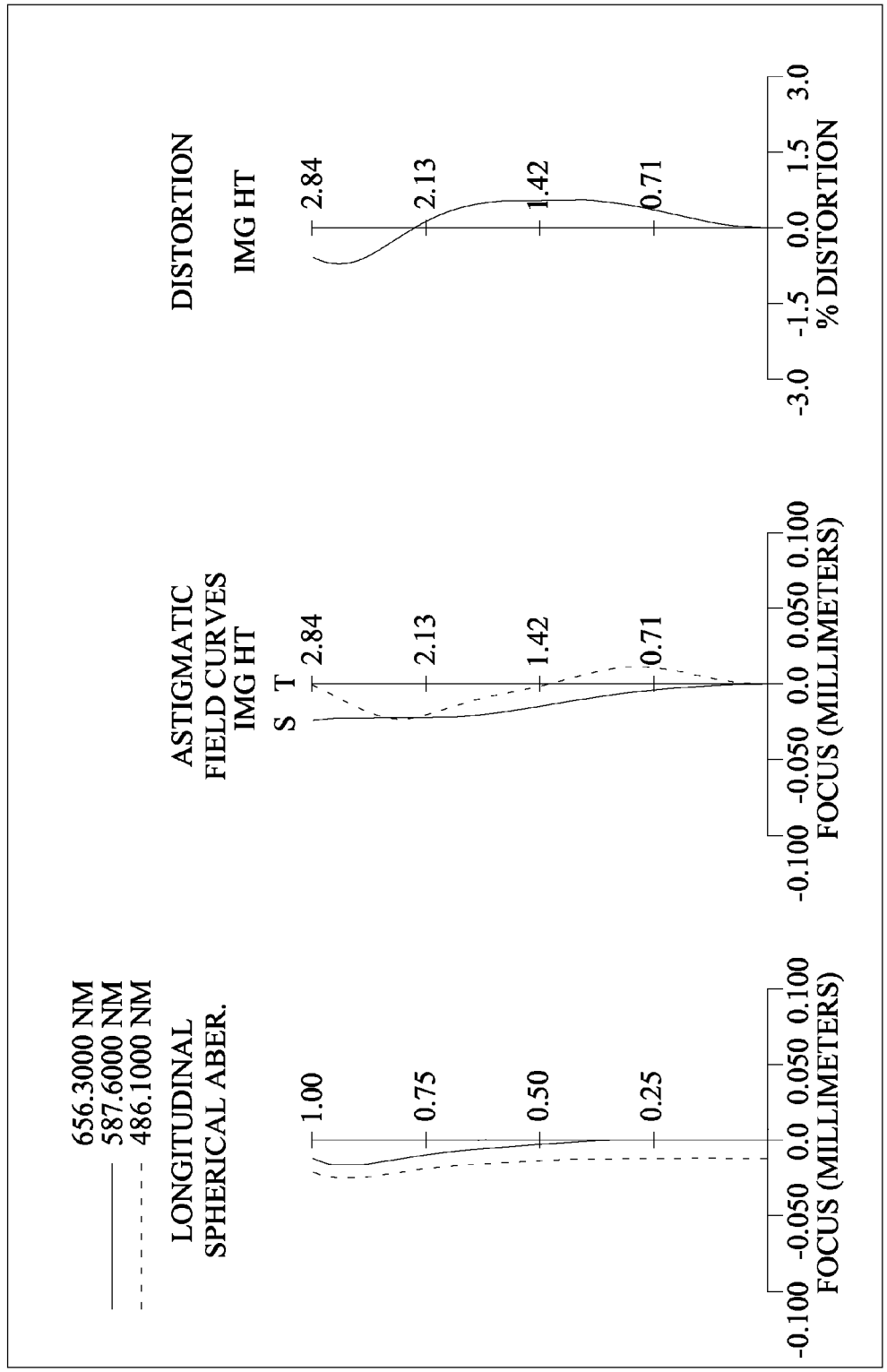
FIG. 9B is a series of aberration curves of the ninth preferred embodiment of the present invention.

With reference to FIGS. 9A and 9B for a schematic view of an imagery optical system and a series of aberration curves in accordance with the ninth preferred embodiment of the present invention respectively, the imagery optical system comprises five lens elements, an infrared filter (960), an aperture stop (900) and an image sensor (980), and the five lens elements sequentially arranged from an object side to an image side along an optical axis include: a bi-convex first lens element (910) with positive refractive power, made of plastic, and both object-side surface (911) and image-side surface (912) are aspheric; the second lens element (920) with positive refractive power, made of plastic, and having a concave object-side surface (921) and a convex image-side surface (922) proximate to the optical axis, and both object-side surface (921) and image-side surface (922) are aspheric; the third lens element (930) with negative refractive power, made of plastic, and having a concave object-side surface (931) and a convex image-side surface (932) proximate to the optical axis, and both object-side surface (931) and image-side surface (932) are aspheric; the fourth lens element (940) with positive refractive power, made of plastic, and having a concave object-side surface (941) aligned towards the object side and a convex image-side surface (942) and aligned towards the image side, proximate to the optical axis, and both object-side surface (941) and image-side surface (942) are aspheric; the fifth lens element (950) with negative refractive power, made of plastic, and having a concave object-side surface (951) and a concave image-side surface (952) proximate to the optical axis, and both object-side surface (951) and image-side surface (952) are aspheric, and at least one of the object-side surface (951) and image-side surface (952) has at least one inflection point; an infrared filter (IR-filter) (960), made of glass which is a panel glass and does not affect the focal length of the imagery optical system of the present invention; an image sensor (980) installed at the image plane (970). In this preferred embodiment, the imagery optical system further comprises an aperture stop (900) disposed between the first lens element (910) and the second lens element (920), and the aperture stop (900) is a middle aperture.

With reference to FIG. 28 (Table 17) for the optical data of the object-side surface of the first lens element (911), the image-side surface of the first lens element (912), the object-side surface of the second lens element (921), the image-side surface of the second lens element (922), the object-side surface of the third lens element (931), and the image-side surface of the third lens element (932), the object-side surface of the fourth lens element (941), the image-side surface of the fourth lens element (942), and the object-side surface of the fifth lens element (951) and the image-side surface of the fifth lens element (952) of this preferred embodiment are in compliance with the aspheric formula equation as shown in Equation (15) and the aspheric surface parameters are listed in FIG. 29 (Table 18).

In the imagery optical system of the ninth preferred embodiment, the overall focal length is f=4.20 (mm), the overall aperture value (f-number) Fno=2.60, and half of the maximum view angle is HFOV=34.2 (degrees).

With reference to Table 17 for the following data of this preferred embodiment, $T_{34}$ is the axial distance from the image-side surface of the third lens element (932) to the object-side surface of the fourth lens element (941); $T_{45}$ is the axial distance from the image-side surface of the fourth lens element (942) and the object-side surface of the fifth lens element (951); $R_4$ is the curvature radius of the image-side surface of the second lens element (922); $R_5$ is the curvature radius of the object-side surface of the third lens element (931); $v_1$ is the Abbe number of the first lens element (910), $v_3$ is the Abbe number of the third lens element (930), and they satisfy Relations (1), (2) and (3) as follows: $T_{45}/T_{34}$=0.91; $R_4/R_5$=−0.22; and $v_1-v_3$=32.5.

In this preferred embodiment, the imagery optical system further comprises an aperture stop (900), which is a middle aperture disposed between the second lens element (920) and the third lens element (930), and the axial distance from the object-side surface of the first lens element (911) to the image sensor (980) at the image plane (970) is TTL, and an image sensor is installed at the image plane, and half of the diagonal of the effective photosensitive area of the image sensor (980) is ImgH, and the axial distance from the aperture stop (900) to the image plane (970) is SL, and they satisfy the relations of TTL/ImgH=1.90; SL/TTL=0.95 as shown in Relations (4) and (7) respectively. The overall focal length of the imagery optical system is f, the focal length of the first lens element (910) is $f_1$, the focal length of the second lens element (920) is $f_2$, the focal length of the third lens element (930) is $f_3$, the focal length of the fourth lens element (940) is $f_4$, the focal length of the fifth lens element (950) is $f_5$, and they satisfy the relations of $f/f_3$=−0.82; $(f/f_1)+(f/f_2)$=1.47; $|f_5/f_4|$=0.94 as shown in Relations (9), (10) and (11) respectively.

In the imagery optical system of this preferred embodiment, the thickness of the fourth lens element (940) along the optical axis is $CT_4$, the axial distance from the object-side surface of the first lens element (911) to the image-side surface of the third lens element (932) is $D_{R1R6}$, the axial distance from the object-side surface of the first lens element (911) to the image-side surface of the fifth lens element (952) is $T_d$, and they satisfy the relations of $T_{34}/CT_4$=0.77 and $D_{R1R6}/T_d$=0.36 as shown in Relations (8) and (12) respectively. The curvature radius of the object-side surface of the fourth lens element (941) is $R_7$, the curvature radius of the image-side surface of the fourth lens element (942) is $R_8$, and they satisfy the relation of $(R_7+R_8)/(R_7-R_8)$=1.91 as shown in Relation (13), and related computing data of the equation are listed in FIG. 34 (Table 23).

From the optical data as shown in FIG. 28 (Table 17) and the series of aberration curves as shown in FIG. 9B, good compensation effects of the longitudinal spherical aberration, astigmatic field curving and distortion can be achieved by the imagery optical system in accordance with this preferred embodiment of the present invention.

<Tenth Preferred Embodiment>

Figure 10B:
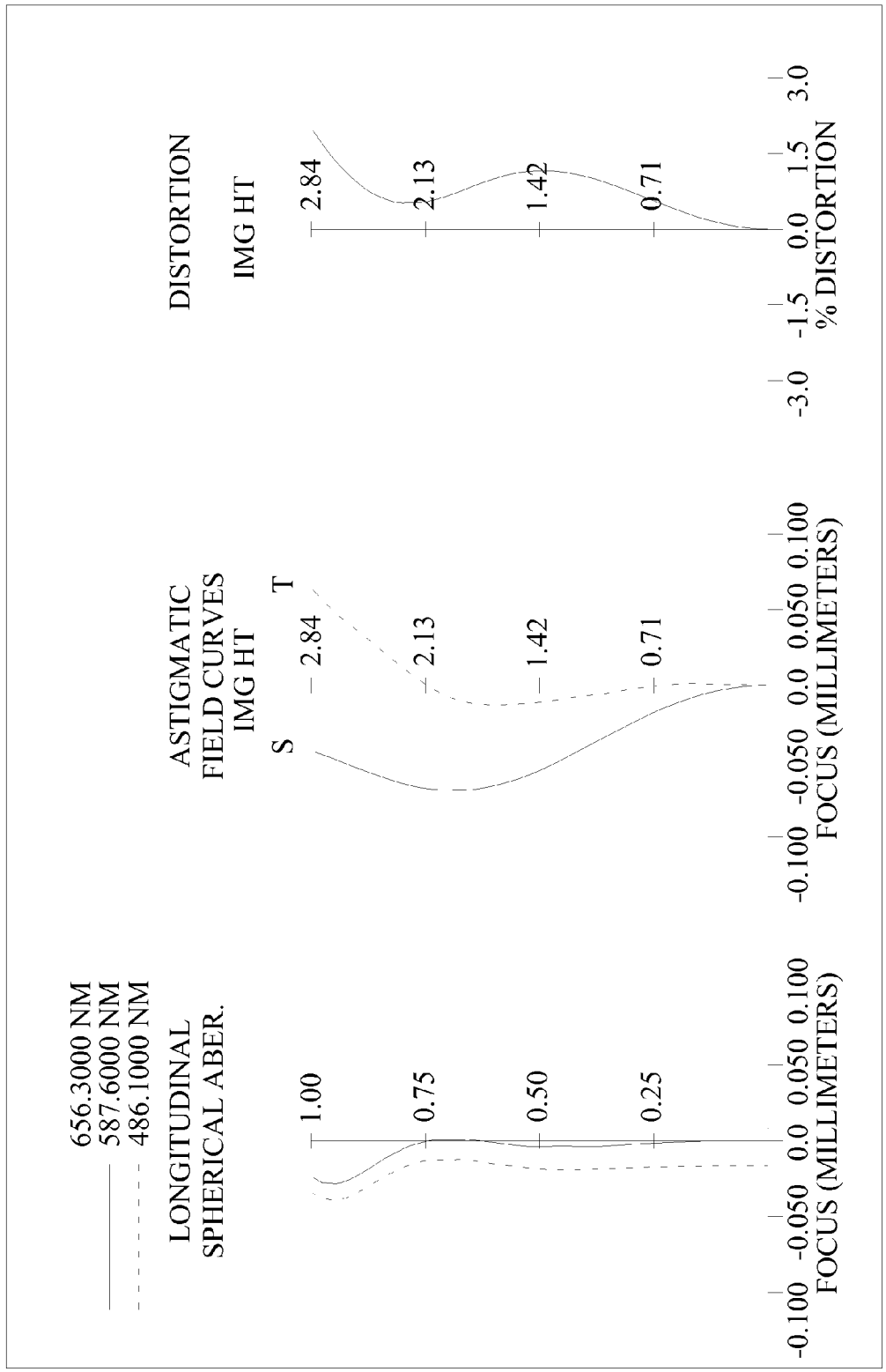
FIG. 10B is a series of aberration curves of the tenth preferred embodiment of the present invention.

With reference to FIGS. 10A and 10B for a schematic view of an imagery optical system and a series of aberration curves in accordance with the tenth preferred embodiment of the present invention respectively, the imagery optical system comprises five lens elements, an infrared filter (1060), an aperture stop (1000) and an image sensor (1080), and the five lens elements sequentially arranged from an object side to an image side along an optical axis include: the first lens element (1010) with positive refractive power, made of plastic, and having a convex object-side surface (1011) and a concave image-side surface (1012), and both object-side surface (1011) and image-side surface (1012) are aspheric; the second lens element (1020) with positive refractive power, made of plastic, and having a convex object-side surface (1021) and a convex image-side surface (1022) proximate to the optical axis, and both object-side surface (1021) and image-side surface (1022) are aspheric; the third lens element (1030) with negative refractive power, made of plastic, and having a convex object-side surface (1031) and a concave image-side surface (1032) proximate to the optical axis, and both object-side surface (1031) and image-side surface (1032) are aspheric; the fourth lens element (1040) with positive refractive power, made of plastic, and having a concave object-side surface (1041) and a convex image-side surface (1042) proximate to the optical axis, and both object-side surface (1041) and image-side surface (1042) are aspheric; the fifth lens element (1050) with negative refractive power, made of plastic, and having a concave object-side surface (1051) and a convex image-side surface (1052) proximate to the optical axis, and both object-side surface (1051) and image-side surface (1052) are aspheric; an infrared filter (IR-filter) (1060), made of glass which is a panel glass and does not affect the focal length of the imagery optical system of the present invention; an image sensor (1080) installed at the image plane (1070). In this preferred embodiment, the imagery optical system further comprises an aperture stop (1000) disposed between the first lens element (1010) and an object to be photographed, and the aperture stop (1000) is a front aperture.

With reference to FIG. 30 (Table 19) for the optical data of the object-side surface of the first lens element (1011), the image-side surface of the first lens element (1012), the object-side surface of the second lens element (1021), the image-side surface of the second lens element (1022), the object-side surface of the third lens element (1031), and the image-side surface of the third lens element (1032), the object-side surface of the fourth lens element (1041), the image-side surface of the fourth lens element (1042), and the object-side surface of the fifth lens element (1051) and the image-side surface of the fifth lens element (1052) of this preferred embodiment are in compliance with the aspheric formula equation as shown in Equation (15) and the aspheric surface parameters are listed in FIG. 31 (Table 20).

In the imagery optical system of the tenth preferred embodiment, the overall focal length is f=3.96 (mm), the overall aperture value (f-number) Fno=2.80, and half of the maximum view angle is HFOV=35.2 (degrees).

With reference to Table 19 for the following data of this preferred embodiment, $T_{34}$ is the axial distance from the image-side surface of the third lens element (1032) to the object-side surface of the fourth lens element (1041); $T_{45}$ is the axial distance from the image-side surface of the fourth lens element (1042) to the object-side surface of the fifth lens element (1051); $R_4$ is the curvature radius of the image-side surface of the second lens element (1022); $R_5$ is the curvature radius of the object-side surface of the third lens element (1031); $v_1$ is the Abbe number of the first lens element (1010), $v_3$ is the Abbe number of the third lens element (1030), and they satisfy Relations (1), (2) and (3) as follows: $T_{45}/T_{34}=1.01$; $R_4/R_5=-0.92$; $v_1-v_3=32.5$.

In this preferred embodiment, the imagery optical system further comprises an aperture stop (1000) disposed between the first lens element (1010) and an object to be photographed, and the axial distance from the object-side surface of the first lens element (1011) to the image sensor (1080) at the image plane (1070) is TTL, and an image sensor (1080) is installed at the image plane, and half of the diagonal of the effective photosensitive area of the image sensor (1080) is ImgH, and the axial distance from the aperture stop (1000) to the image plane (1070) is SL, and they satisfy the relations of TTL/ImgH=1.77; SL/TTL=0.98 as shown in Relations (4) and (7) respectively. The overall focal length of the imagery optical system is f, the focal length of the first lens element (1010) is $f_1$, the focal length of the second lens element (1020) is $f_2$, the focal length of the third lens element (1030) is $f_3$, the focal length of the fourth lens element (1040) is $f_4$, the focal length of the fifth lens element (1050) is $f_5$, and they satisfy the relations of $f/f_3=-0.95$; $(f/f_1)+(f/f_2)=1.92$; $|f_5/f_4|=0.19$ as shown in Relations (9), (10) and (11) respectively.

In the imagery optical system of this preferred embodiment, the thickness of the fourth lens element (1040) along the optical axis is $CT_4$, the axial distance from the object-side surface of the first lens element (1011) to the image-side surface of the third lens element (1032) is $D_{R1R6}$, the axial distance from the object-side surface of the first lens element (1011) to the image-side surface of the fifth lens element (1052) is $T_d$, and they satisfy the relations of $T_{34}/CT_4=1.11$ and $D_{R1R6}/T_d=0.35$ as shown in Relations (8) and (12) respectively. The curvature radius of the object-side surface of the fourth lens element (1041) is $R_7$, the curvature radius of the image-side surface of the fourth lens element (1042) is $R_8$, and they satisfy the relation of $(R_7+R_8)/(R_7-R_8)=-28.88$ as shown in Relation (13), and related computing data of the equation are listed in FIG. 34 (Table 23).

From the optical data as shown in FIG. 30 (Table 19) and the series of aberration curves as shown in FIG. 10B, good compensation effects of the longitudinal spherical aberration, astigmatic field curving and distortion can be achieved by the imagery optical system in accordance with this preferred embodiment of the present invention.

<Eleventh Preferred Embodiment>

Figure 11A:
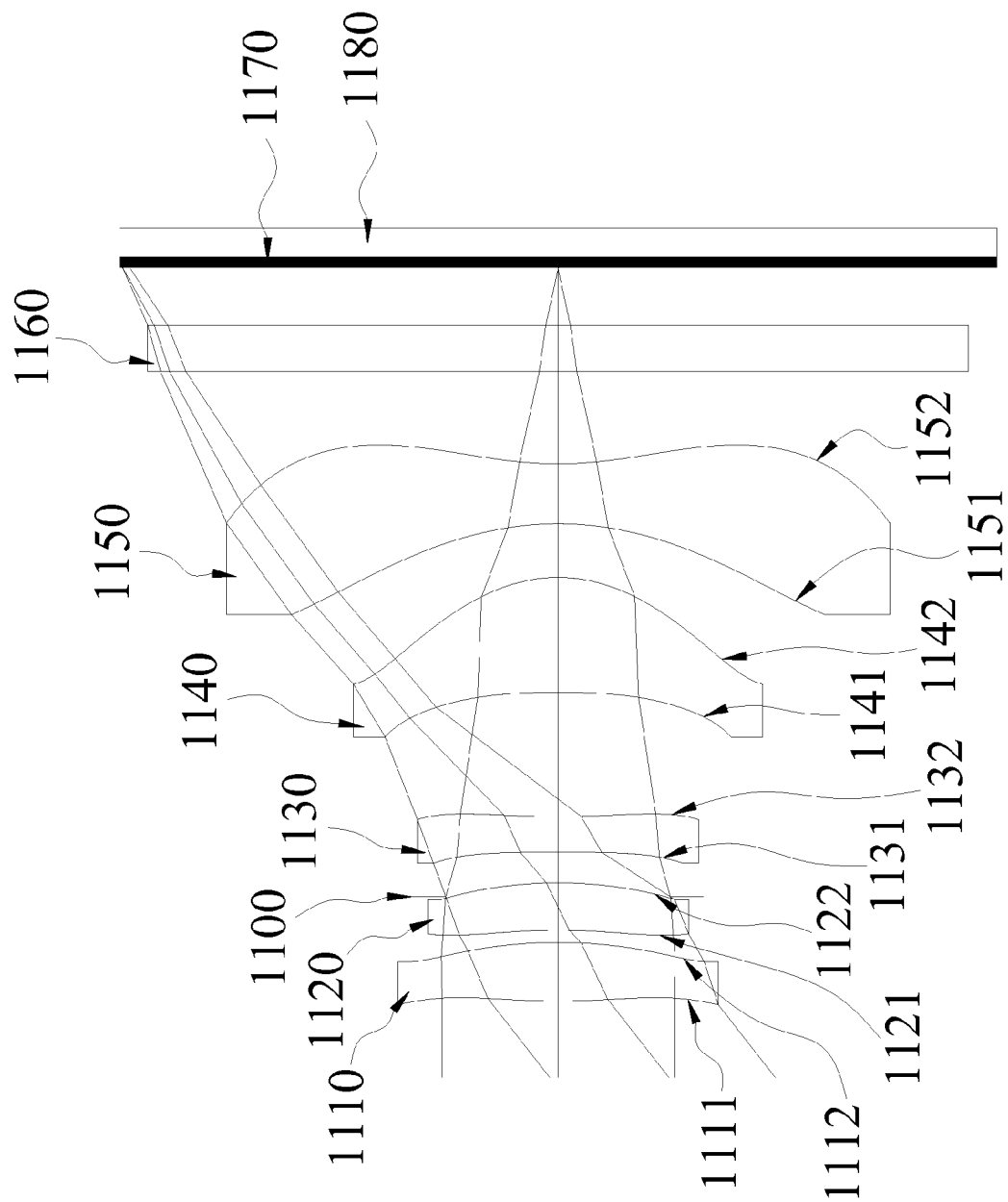
FIG. 11A is a schematic view of an imagery optical system in accordance with the eleventh preferred embodiment of the present invention.
Figure 11B:
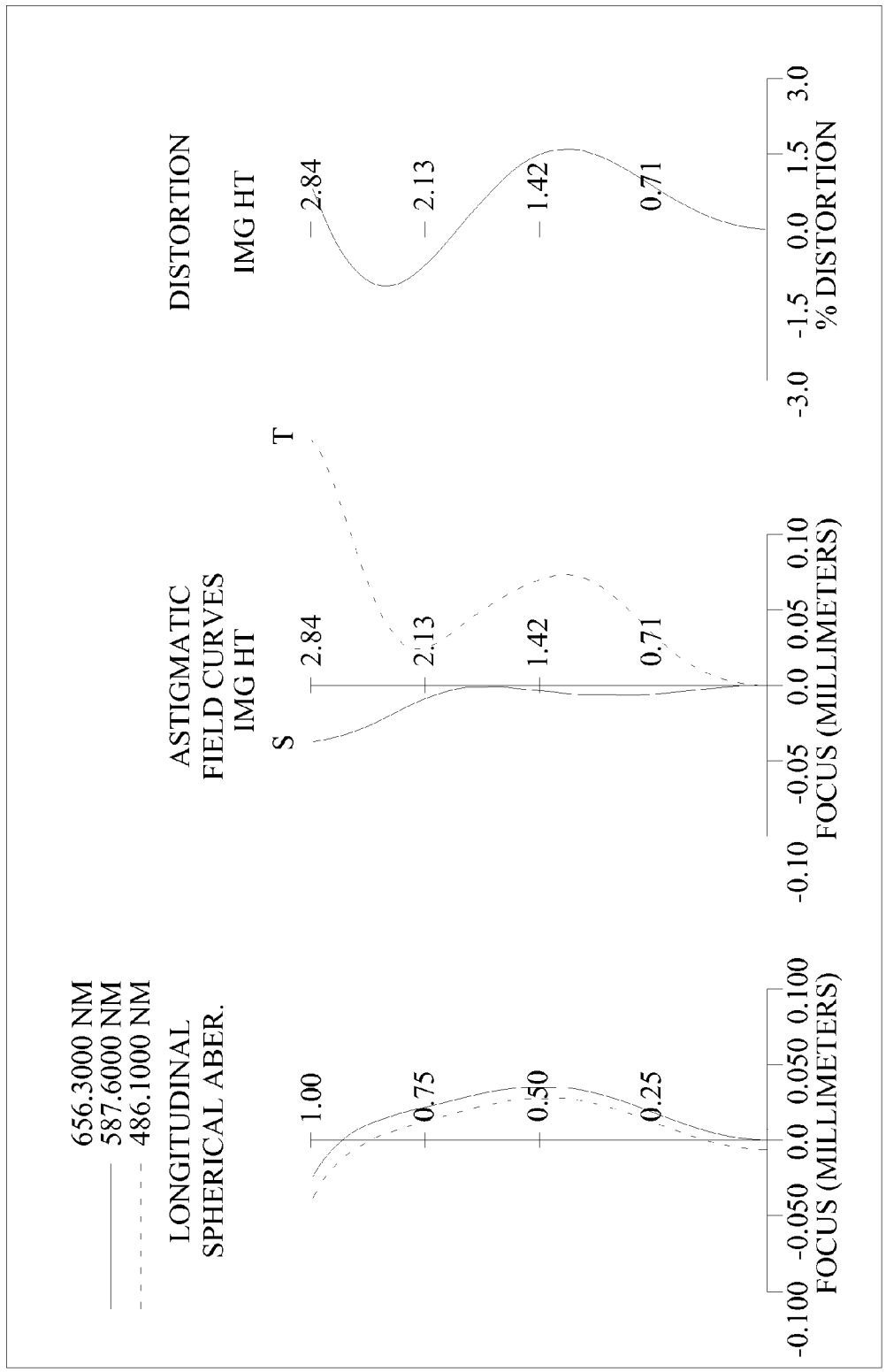
FIG. 11B is a series of aberration curves of the eleventh preferred embodiment of the present invention.
Figure 1B:
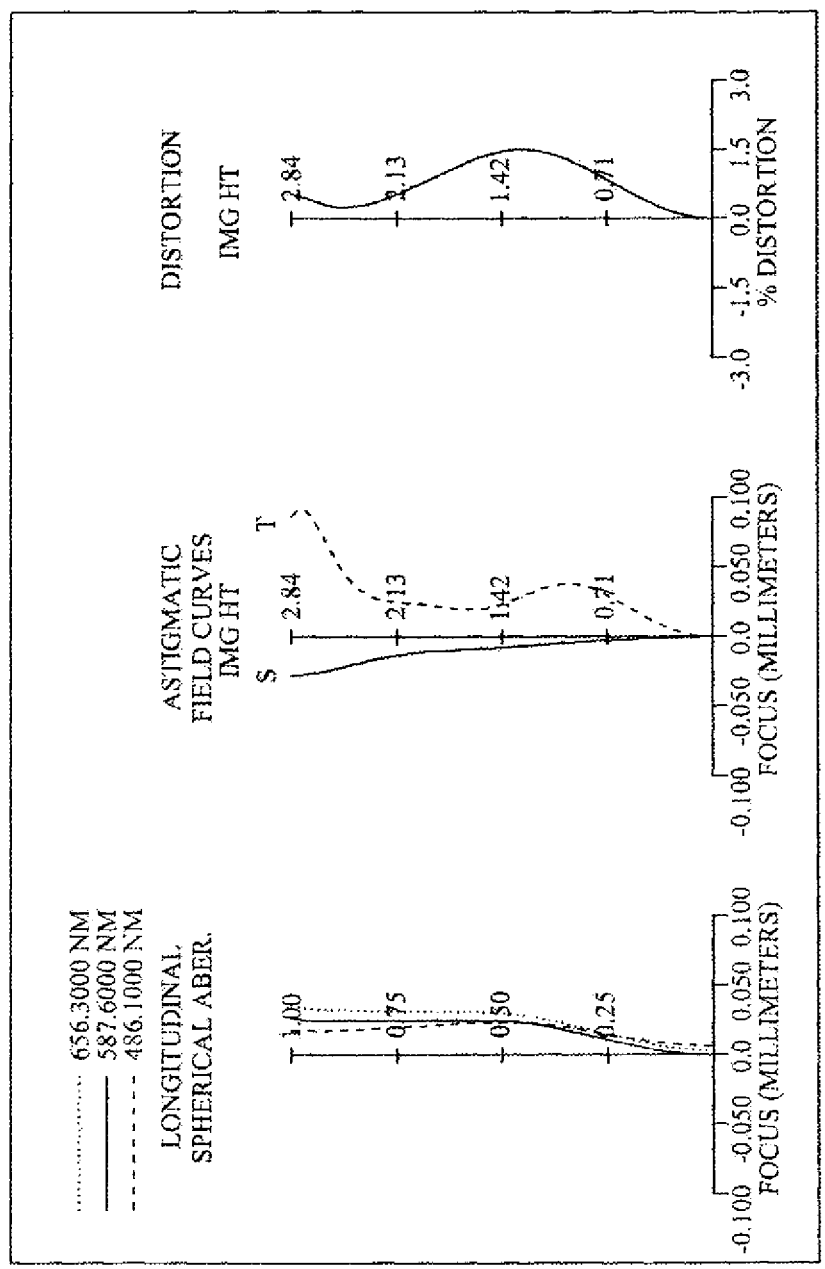
Figure 2B:
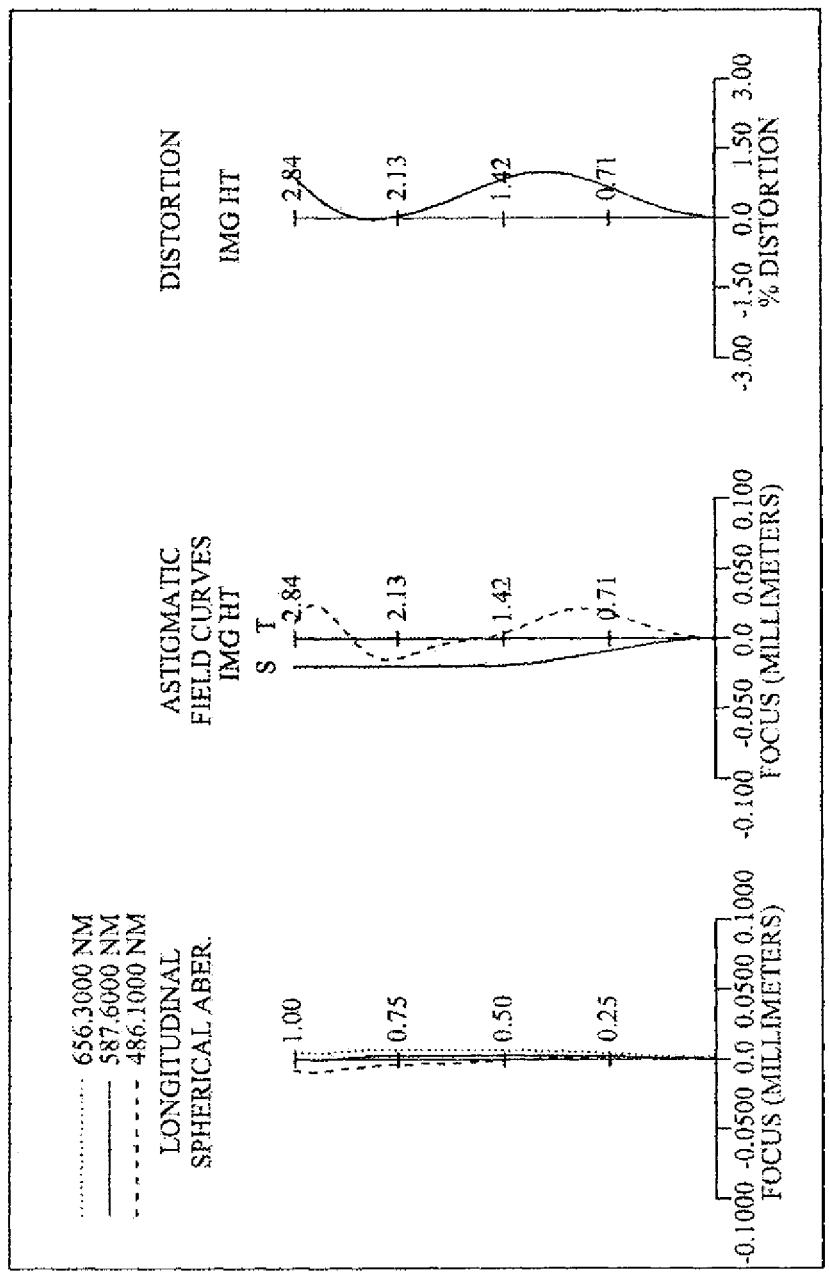
Figure 3B:
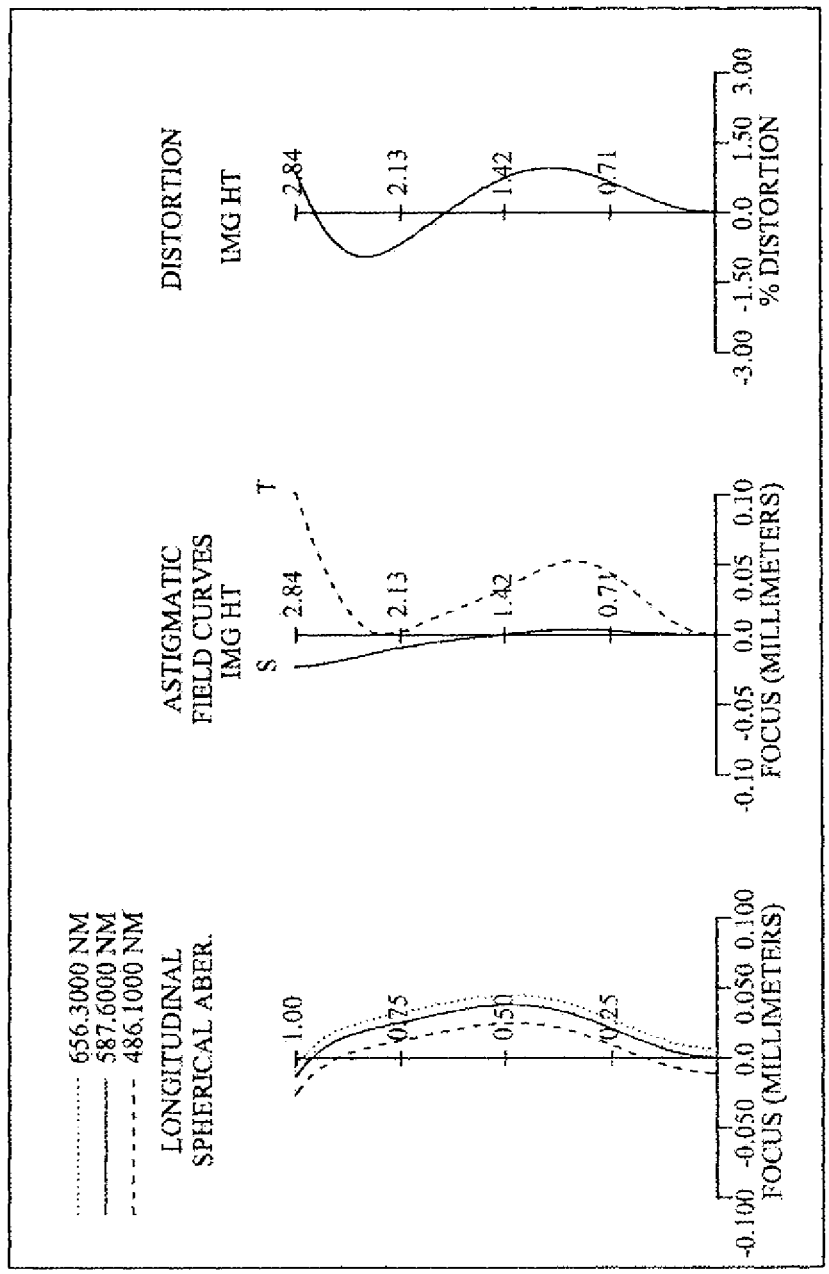
Figure 4B:
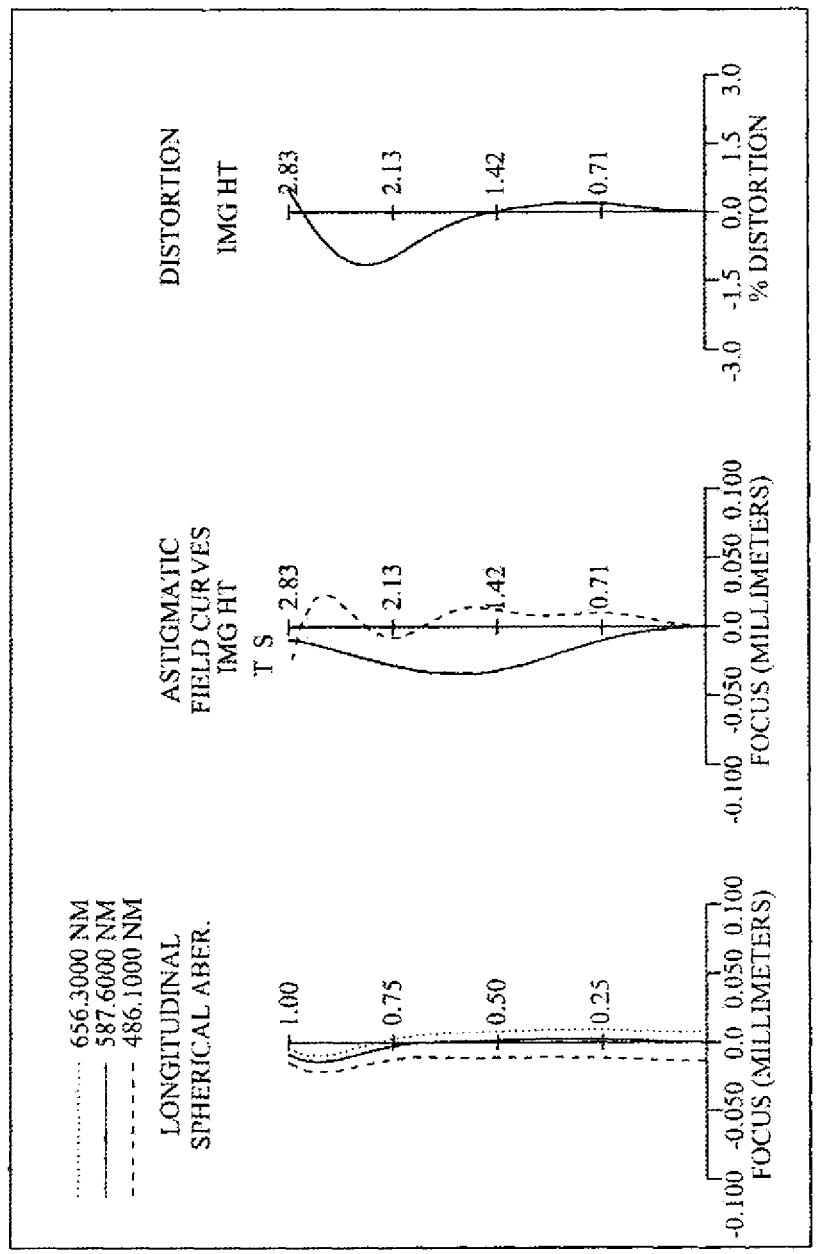
Figure 5B:
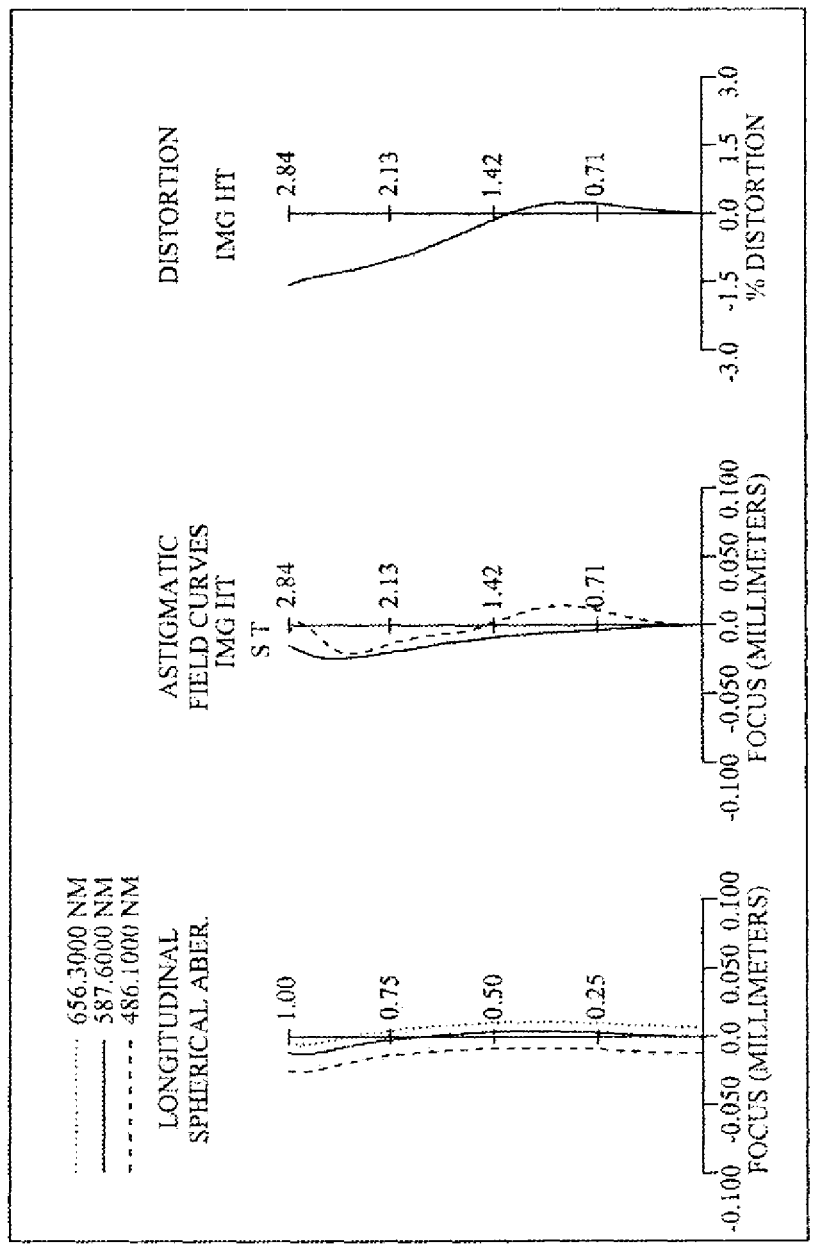
Figure 6B:
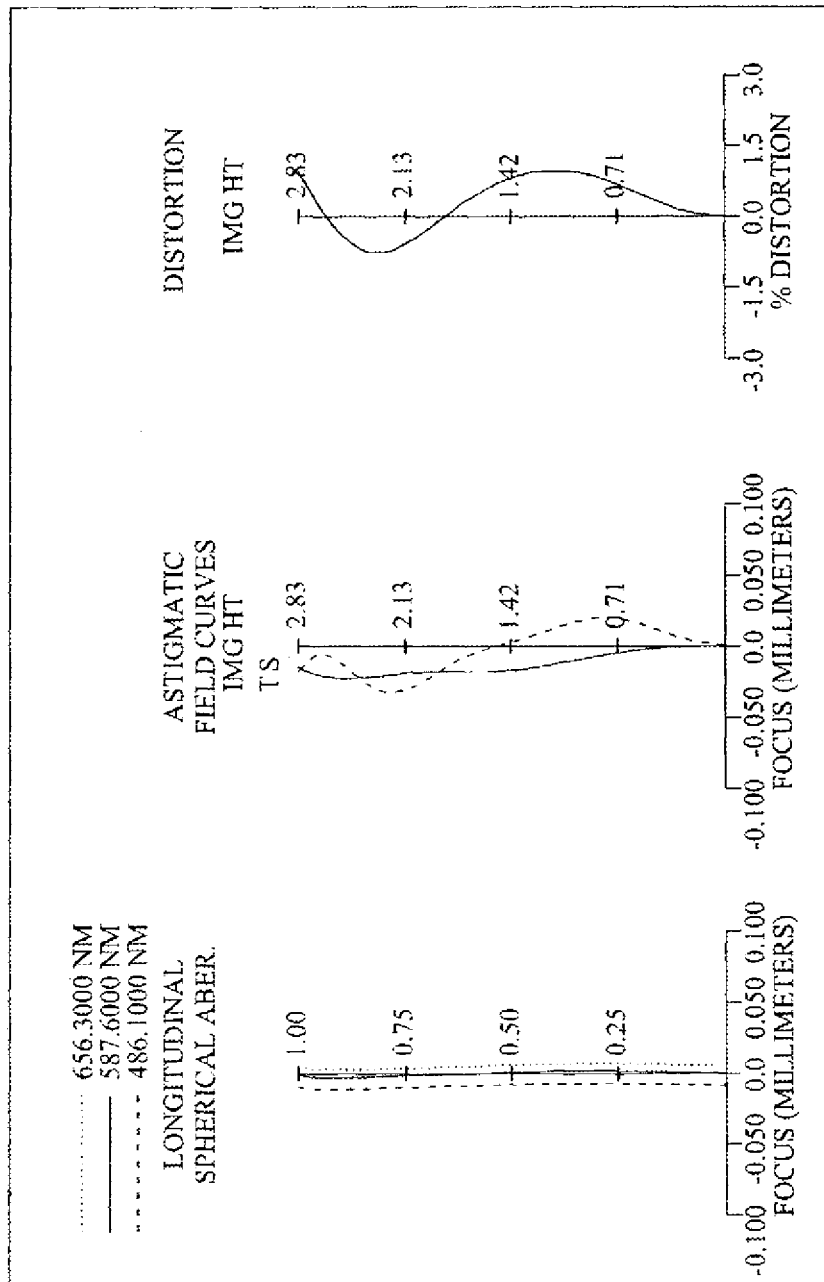
Figure 7B:
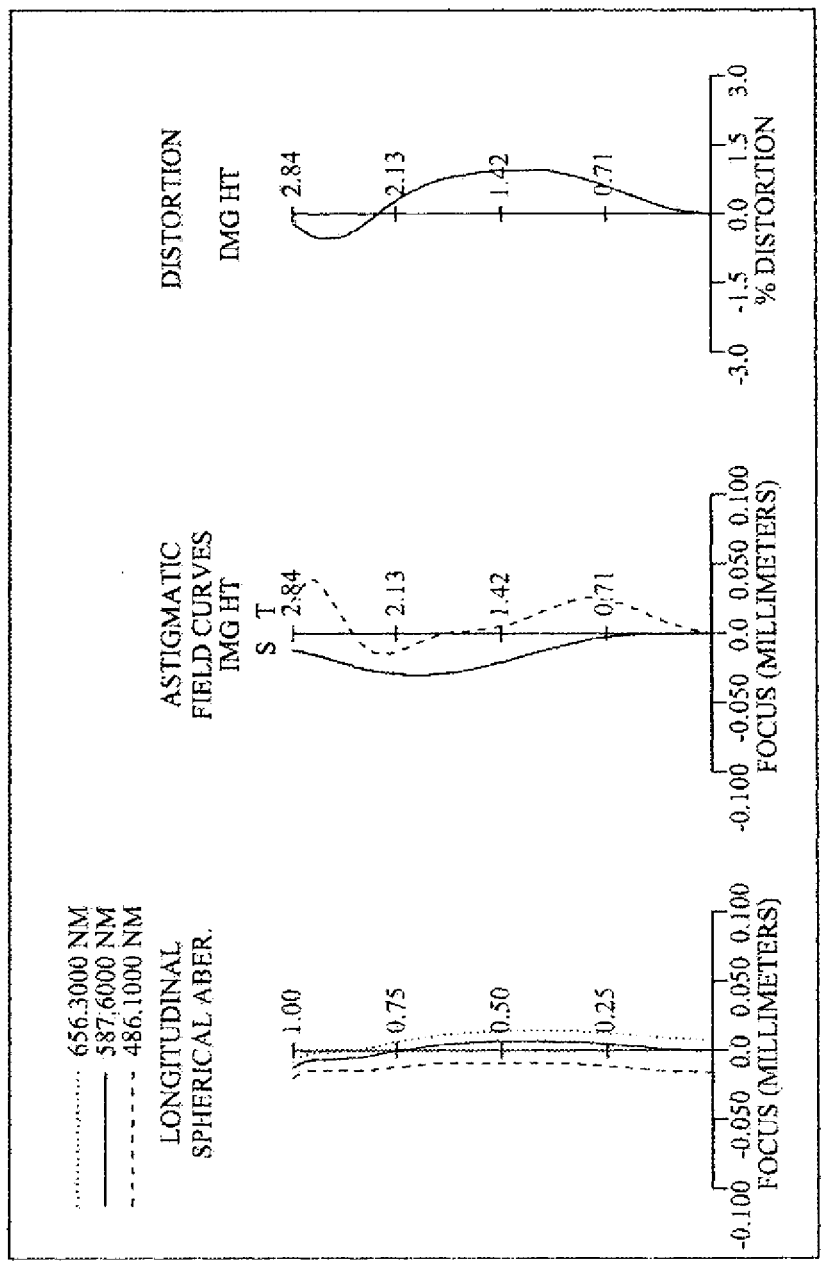
Figure 8B:
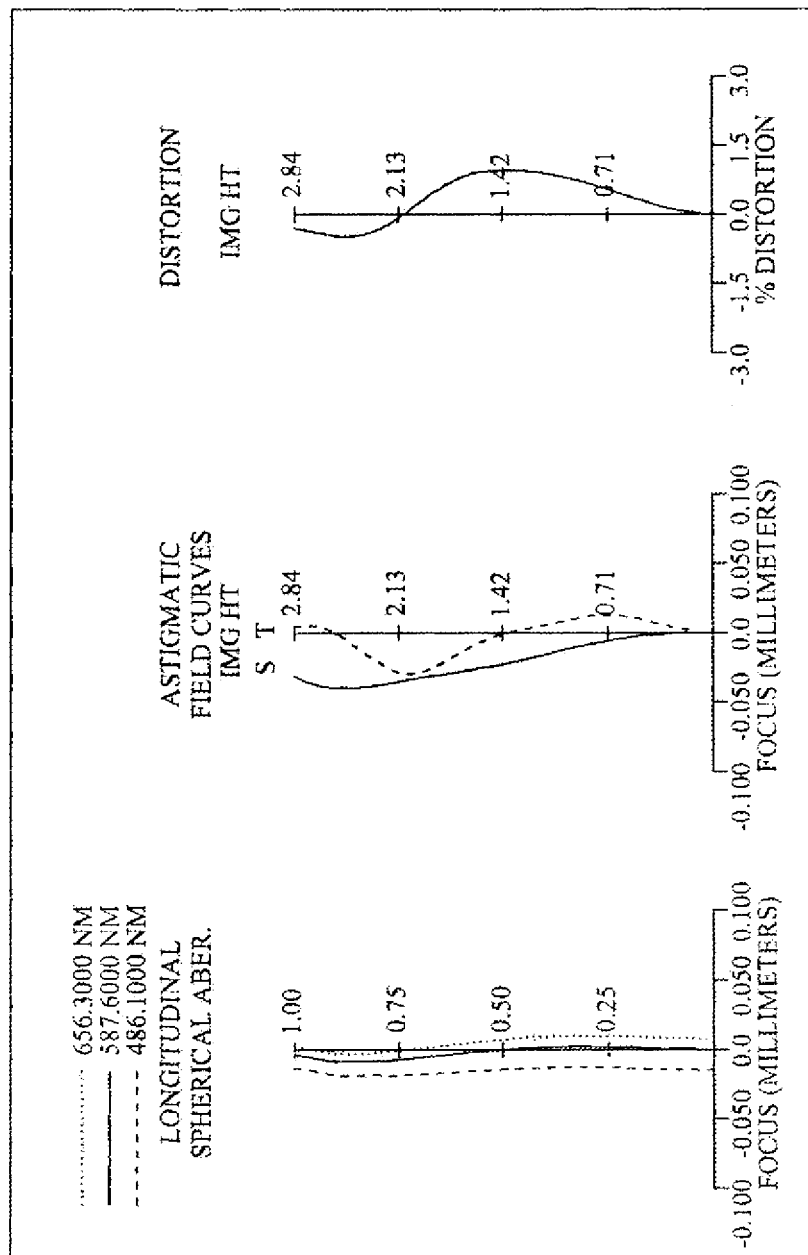
Figure 9B:
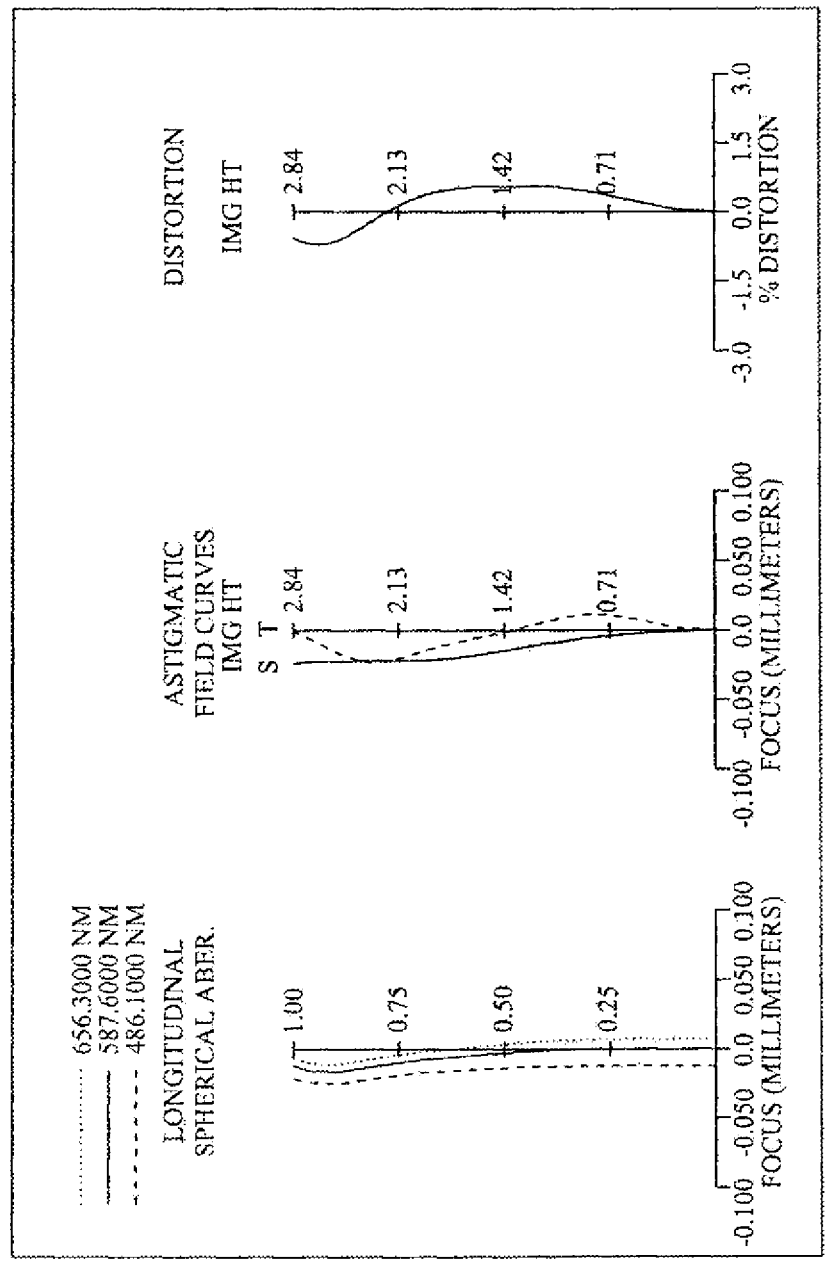
Figure 10B:
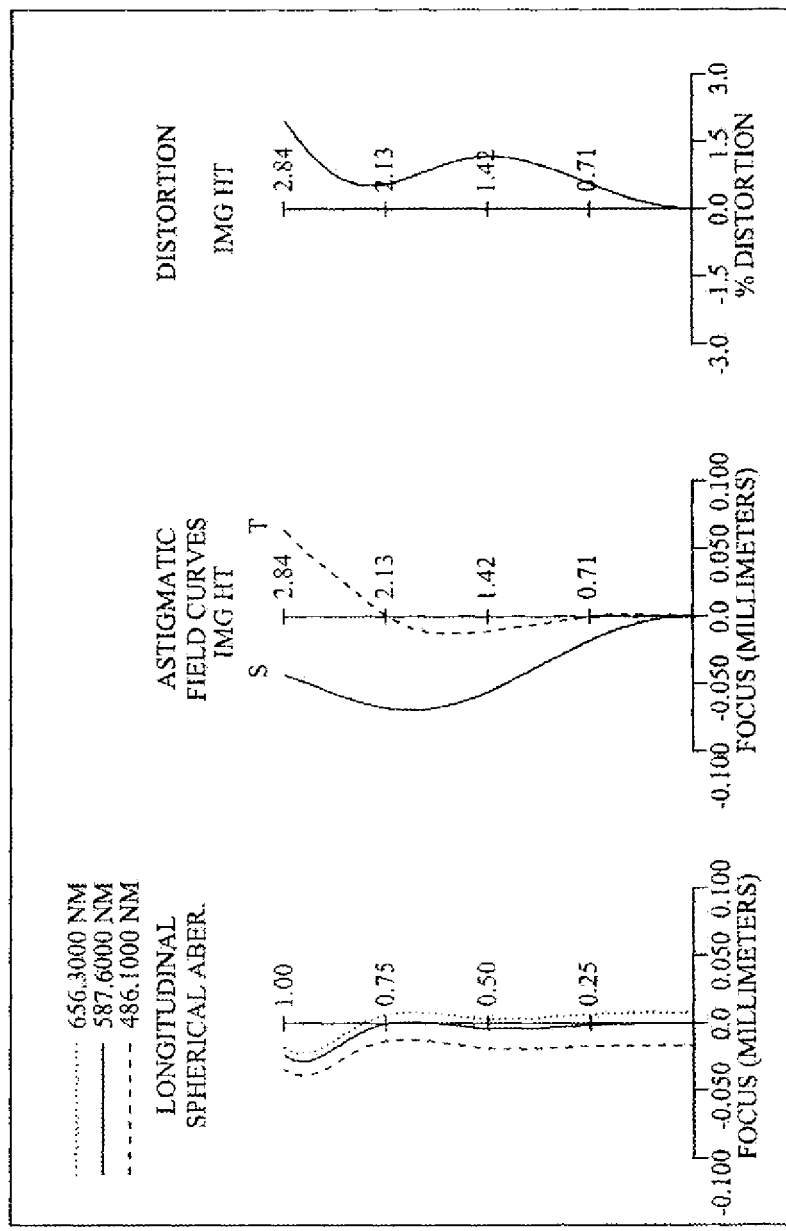
Figure 11B:
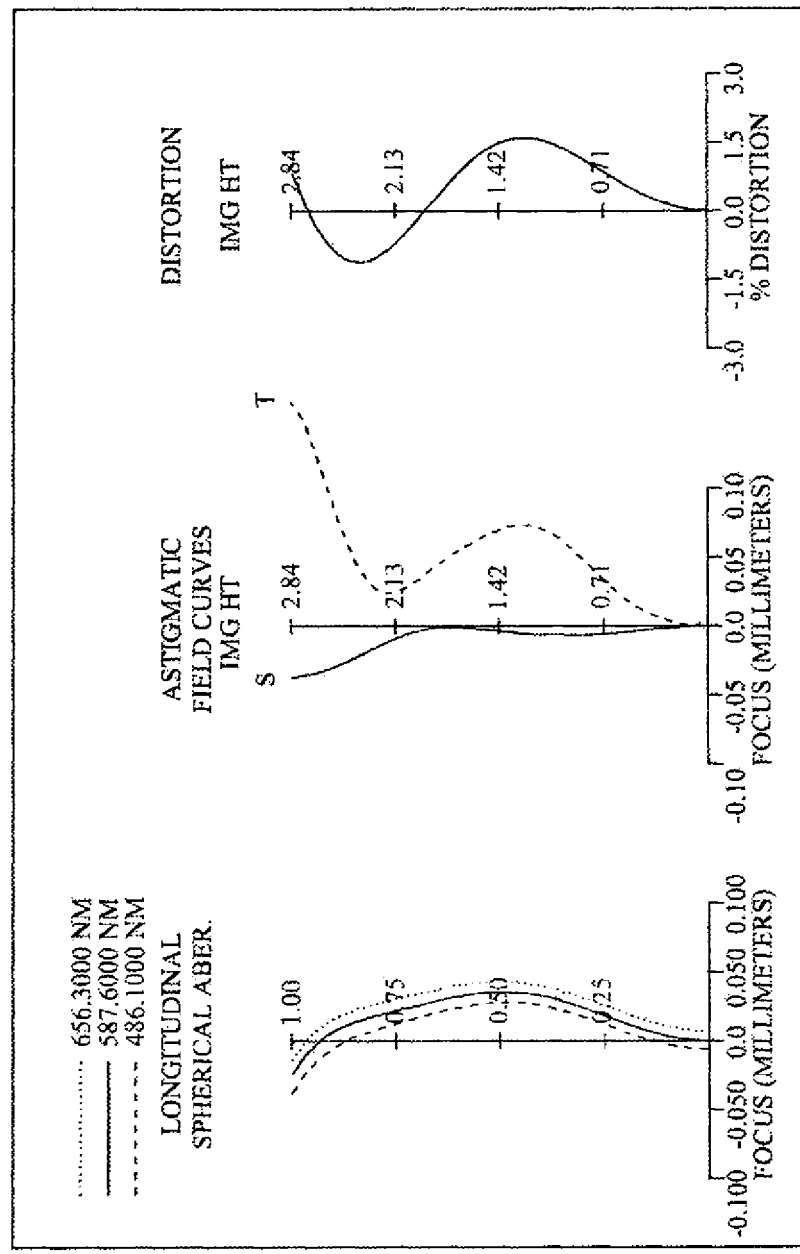

With reference to FIGS. 11A and 11B for a schematic view and a series of aberration curves of an imagery optical system in accordance with the eleventh preferred embodiment of the present invention respectively, the imagery optical system comprises five lens elements, an infrared elimination filter (1160), an aperture stop (1100) and an image sensor (1180), and the five lens elements sequentially arranged from an object side to an image side along an optical axis include: a bi-convex first lens element (1110) with positive refractive power, made of glass, and both object-side surface (1111) and image-side surface (1112) are aspheric; the second lens element (1120) with positive refractive power, made of plastic, and having a concave object-side surface (1121) and a convex image-side surface (1122) proximate to the optical axis, and both object-side surface (1121) and image-side surface (1122) are aspheric; the third lens element (1130) with negative refractive power, made of plastic, and having a concave object-side surface (1131) and a concave image-side surface (1132) proximate to the optical axis, and both object-side surface (1131) and image-side surface (1132) are aspheric; the fourth lens element (1140) with positive refractive power, made of plastic, and having a concave object-side surface (1141) and a convex image-side surface (1142) proximate to the optical axis, and both object-side surface (1141) and image-side surface (1142) are aspheric; the fifth lens element (1150) with negative refractive power, made of plastic, and having a concave object-side surface (1151) and a concave image-side surface (1152) proximate to the optical axis, and both object-side surface (1151) and image-side surface (1152) are aspheric; an infrared filter (IR-filter) (1160), made of glass which is a panel glass and does not affect the focal length of the imagery optical system of the present invention; an image sensor (1180) installed at the image plane (1170). In this preferred embodiment, the imagery optical system further comprises an aperture stop (1100) disposed between the second lens element (1120) and the third lens element (1130), and the aperture stop (1100) is a middle aperture.

With reference to FIG. 32 (Table 21) for the optical data of the object-side surface of the first lens element (1011), the image-side surface of the first lens element (1012), the object-side surface of the second lens element (1021), the image-side surface of the second lens element (1022), the object-side surface of the third lens element (1031), and the image-side surface of the third lens element (1032), the object-side surface of the fourth lens element (1041), the image-side surface of the fourth lens element (1042), and the object-side surface of the fifth lens element (1051) and the image-side surface of the fifth lens element (1052) of this preferred embodiment are in compliance with the aspheric formula equation as shown in Equation (15) and the aspheric surface parameters are listed in FIG. 33 (Table 22).

In the imagery optical system of the eleventh preferred embodiment, the overall focal length is f=3.60 (mm), the overall aperture value (f-number) Fno=2.40, and half of the maximum view angle is HFOV=37.9 (degrees).

With reference to Table 21 for the following data of this preferred embodiment, $T_{34}$ is the axial distance from the image-side surface of the third lens element (1132) to the object-side surface of the fourth lens element (1141); $T_{45}$ is the axial distance from the image-side surface of the fourth lens element (1142) to the object-side surface of the fifth lens element (1151); $R_4$ is the curvature radius of the image-side surface of the second lens element (1122); $R_5$ is the curvature radius of the object-side surface of the third lens element (1131); $v_1$ is the Abbe number of the first lens element (1110), $v_3$ is the Abbe number of the third lens element (1130), and they satisfy Relations (1), (2) and (3) as follows: $T_{45}/T_{34}=0.43$; $R_4/R_5=0.14$; and $v_1-v_3=42.7$.

In this preferred embodiment, the imagery optical system further comprises an aperture stop (1100), which is a middle aperture disposed between the second lens element (1120) and the third lens element (1130), and the axial distance from the object-side surface of the first lens element (1111) to the image sensor (1180) at the image plane (1170) is TTL, and an image sensor is installed at the image plane, and half of the diagonal of the effective photosensitive area of the image sensor (1180) is ImgH, and the axial distance from the aperture stop (1100) to the image plane (1170) is SL, and they satisfy the relations of TTL/ImgH=1.66 and SL/TTL=0.86 as shown in Relations (4) and (7) respectively. The overall focal length of the imagery optical system is f, the focal length of the first lens element (1110) is $f_1$, the focal length of the second lens element (1120) is $f_2$, the focal length of the third lens element (1130) is $f_3$, the focal length of the fourth lens element (1140) is $f_4$, the focal length of the fifth lens element (1150) is $f_5$, and they satisfy the relations of $f/f_3=-0.54$; $(f/f_1)+(f/f_2)=1.22$; and $|f_5/f_4|=0.96$ as shown in Relations (9), (10) and (11) respectively.

In the imagery optical system of this preferred embodiment, the thickness of the fourth lens element (1140) along the optical axis is $CT_4$, the axial distance from the object-side surface of the first lens element (1111) to the image-side surface of the third lens element (1132) is $D_{R1R6}$, the axial distance from the object-side surface of the first lens element (1111) to the image-side surface of the fifth lens element (1152) is $T_d$, and they satisfy the relations of $T_{34}/CT_4=1.08$ and $D_{R1R6}/T_d=0.34$ as shown in Relations (8) and (12) respectively. The curvature radius of the object-side surface of the fourth lens element (1141) is $R_7$, the curvature radius of the image-side surface of the fourth lens element (1142) is $R_8$, and they satisfy the relation of $(R_7+R_8)/(R_7-R_8)=1.39$ as shown in Relation (13), and related computing data of the equation are listed in FIG. 34 (Table 23).

From the optical data as shown in FIG. 32 (Table 21) and the series of aberration curves as shown in FIG. 11B, good compensation effects of the longitudinal spherical aberration, astigmatic field curving and distortion can be achieved by the imagery optical system in accordance with this preferred embodiment of the present invention.

In the imagery optical system of the present invention, the lens can be made of glass or plastic. If the lens is made of a glass material, the refractive power for the imagery optical system can be selected more flexibly. If the lens is made of a plastic material, the production cost can be reduced effectively. In addition, an aspheric surface is formed on an optical surface of the lens, and the aspheric surface can be easily manufactured into a shape other than that of a spherical surface to have more control factors to eliminate or reduce aberrations, so as to reduce the number of lenses used and the total length of the imagery optical system of the present invention.

In the imagery optical system of the present invention, if the lens surface is convex, the lens surface proximate to the axis is convex; and if the lens surface is concave, the lens surface proximate to the axis is concave.

In the imagery optical system of the present invention, at least one aperture stop (not shown in the figure) can be provided for reducing stray lights and improving the image quality.

Tables 1 to 22 (corresponding to FIGS. 12 to 33 respectively) show changes of values of an imagery optical system in accordance with each preferred embodiment of the present invention. However, the changes of values in the preferred embodiments of the present invention are obtained from experiments. Even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

What is claimed is:

1. An imagery optical system, sequentially arranged from an object side to an image side, comprising:
    a first lens element with positive refractive power;
    a second lens element with positive refractive power;
    a third lens element;
    a fourth lens element having a concave object-side surface and a convex image-side surface, and at least one of the object-side and image-side surfaces being aspheric;
    a fifth lens element made of plastic, and having at least one of object-side and image-side surfaces being aspheric, and at least one of the object-side and image-side surfaces having at least one inflection point;
    wherein, an axial distance between the third lens element and the fourth lens element is $T_{34}$, an axial distance between the fourth lens element and the fifth lens element is $T_{45}$, a curvature radius of the image-side surface of the second lens element is $R_4$, a curvature radius of the object-side surface of the third lens element is $R_5$, an Abbe number of the first lens element is $v_1$, an Abbe number of the third lens element is $v_3$, and the following relations are satisfied:

$0.1<T_{45}/T_{34}<2.0$;

$-3.0<R_4/R_5<0.7$; and $28.0<v_1-v_3$.

2. The imagery optical system of claim 1, wherein the object-side surface of the first lens element is convex, and the image-side surface of the second lens element is convex.

3. The imagery optical system of claim 2, wherein the image-side surface of the fifth lens element is concave.

4. The imagery optical system of claim 3, further comprising a stop and an image plane, wherein an axial distance from the object-side surface of the first lens element to the image plane is TTL, an axial distance from the stop to the image plane is SL, and the following relation is satisfied:

$0.7<SL/TTL<1.2$.

5. The imagery optical system of claim 4, wherein the axial distance between the third lens element and the fourth lens element is $T_{34}$, a thickness of the fourth lens element near the optical axis is $CT_4$, and the following relation is satisfied:

$0.3<T_{34}/CT_4<2.0$.

6. The imagery optical system of claim 5, wherein a focal length of the imagery optical system is f, a focal length of the first lens element is $f_1$, a focal length of the second lens element is $f_2$, and the following relation is satisfied:

$1.0<(f/f_1)+(f/f_2)<2.2$.

7. The imagery optical system of claim 5, wherein a focal length of the fifth lens element is $f_5$, a focal length of the fourth lens element is $f_4$, and the following relation is satisfied:

$0.7<|f_5/f_4|<2.0$.

8. The imagery optical system of claim 7, wherein the axial distance between the third lens element and the fourth lens element is $T_{34}$, the axial distance between the fourth lens element and the fifth lens element is $T_{45}$, and preferably the following relation is satisfied:

$0.3<T_{45}/T_{34}<1.3$.

9. The imagery optical system of claim 4, wherein a focal length of the imagery optical system is f, a focal length of the third lens element is $f_3$ and the following relation is satisfied:

$-1.2<f/f_3<-0.4$.

10. The imagery optical system of claim 9, wherein the curvature radius of the image-side surface of the second lens element is $R_4$, the curvature radius of the object-side surface of the third lens element is $R_5$, and preferably the following relation is satisfied:

$-1.5<R_4/R_5<0.2$.

11. The imagery optical system of claim 9, wherein an axial distance from the object-side surface of the first lens element to the image-side surface of the third lens element is $D_{R1R6}$, an axial distance from the object-side surface of the first lens element to the image-side surface of the fifth lens element is $T_d$, and the following relation is satisfied:

$0.20<D_{R1R6}/T_d<0.45$.

12. The imagery optical system of claim 9, wherein the fourth lens element has positive refractive power, the fifth lens element has negative refractive power, and the image-side surface of the third lens element is concave.

13. The imagery optical system of claim 12, wherein a curvature radius of the object-side surface of the fourth lens element is $R_7$, a curvature radius of the image-side surface of the fourth lens element is $R_8$, and the following relation is satisfied:

$1.30<(R_7+R_8)/(R_7-R_8)$.

14. The imagery optical system of claim 1, further comprising an image sensor at an image plane, wherein an axial distance from the object-side surface of the first lens element to the image plane is TTL, and ImgH is half of the diagonal length of an effective photosensitive area of the image sensor; and the following relation is satisfied:

$TTL/ImgH<2.1$.

15. An imagery optical system, sequentially arranged from an object side to an image side, comprising:
 a first lens element with positive refractive power, having a convex object-side surface;
 a second lens element with positive refractive power, having a convex image-side surface;
 a third lens element with negative refractive power;
 a fourth lens element having a concave object-side surface and a convex image-side surface, and at least one of the object-side and image-side surfaces being aspheric;
 a fifth lens element made of plastic having a concave object-side surface and a concave image-side surface, and at least one of the object-side and image-side surfaces being aspheric, and at least one of the object-side and image-side surfaces of the fifth lens element having at least one inflection point;
 wherein an axial distance between the third lens element and the fourth lens element is $T_{34}$, an axial distance between the fourth lens element and the fifth lens element is $T_{45}$, a curvature radius of the image-side surface of the second lens element is $R_4$, a curvature radius of the object-side surface of the third lens element is $R_5$, and the following relations are satisfied:

$0.1<T_{45}/T_{34}<2.0$; and $-3.0<R_4/R_5<0.7$ wherein a focal length of the fifth lens element is $f_5$, a focal length of the fourth lens element is $f_4$, and the following relation is satisfied:

$0.7<|f5/f4|<2.0$.

16. The imagery optical system of claim 15, wherein the axial distance between the third lens element and the fourth lens element is $T_{34}$, the axial distance between the fourth lens element and the fifth lens element is $T_{45}$, and preferably the following relation is satisfied:

$0.3<T_{45}/T_{34}<1.3$.

17. The imagery optical system of claim 16, wherein an Abbe number of the first lens element is $v_1$, an Abbe number of the third lens element is $v_3$, and the following relation is satisfied:

$28.0<v_1-v_3$.

18. The imagery optical system of claim 16, wherein a focal length of the imagery optical system is f, a focal length of the first lens element is $f_1$, a focal length of the second lens element is $f_2$, and the relation is satisfied:

$1.0<(f/f_1)+(f/f_2)<2.2$.

19. The imagery optical system of claim 16, wherein a focal length of the imagery optical system is f, a focal length of the first lens element is $f_1$, a focal length of the second lens element is $f_2$, and the relation is satisfied:

$1.2<(f/f_1)+(f/f_2)<1.7$.

20. The imagery optical system of claim 16, wherein the image-side surface of the third lens element is concave, and at least one of the object-side and image-side surfaces of the third lens element has at least one inflection point.

21. The imagery optical system of claim 15, wherein a curvature radius of the object-side surface of the fourth lens element is $R_7$, a curvature radius of the image-side surface of the fourth lens element is $R_8$, and the following relation is satisfied:

$1.30<(R_7+R_8)/(R_7-R_8)$.

22. The imagery optical system of claim 15, wherein the curvature radius of the image-side surface of the second lens element is $R_4$, the curvature radius of the object-side surface of the third lens element is $R_5$, and preferably the following relation is satisfied:

$-1.5<R_4/R_5<0.2$.

23. An imagery optical system, sequentially from an object side to an image side, comprising:
 a first lens element with positive refractive power, having a convex object-side surface;
 a second lens element with positive refractive power;
 a third lens element with negative refractive power;
 a fourth lens element with positive refractive power, having a concave object-side surface and a convex image-side surface, and at least one of the object-side and image-side surfaces being aspheric; and
 a fifth lens element with negative refractive power, made of plastic, having a concave image-side surface, and at least one of the object-side and image-side surfaces having at least one inflection point;
 wherein an axial distance between the third lens element and the fourth lens element is $T_{34}$, an axial distance between the fourth lens element and the fifth lens element is $T_{45}$, an Abbe number of the first lens element is $v_1$, an Abbe number of the third lens element is $v_3$, and the following relations are satisfied:

$0.1<T_{45}/T_{34}<2.0$; and $28.0<v_1-v_3$ wherein a focal length of the imagery optical system is f, a focal length of the first lens element is $f_1$ a focal length of the second lens element is $f_2$ and the following relation is satisfied:

$1.0<(f/f_1)+(f/f_2)<2.2$.

24. The imagery optical system of claim 23, wherein an axial distance from the object-side surface of the first lens element to the image-side surface of the third lens element is $D_{R1R6}$, an axial distance from the object-side surface of the first lens element to the image-side surface of the fifth lens element is $T_d$, and the relation is satisfied:

$0.20<D_{R1R6}/T_d<0.45$.

25. The imagery optical system of claim 23, further comprising a stop and an image plane, wherein the object-side surface of the fifth lens element is concave, and an axial distance from the object-side surface of the first lens element to the image plane is TTL, an axial distance from the stop to the image plane is SL, and the following relation is satisfied:

$0.7<SL/TTL<1.2$.

26. The imagery optical system of claim 23, wherein a focal length of the fifth lens element is $f_5$, a focal length of the fourth lens element is $f_4$, and the following relation is satisfied:

$$0.7 < |f_5/f_4| < 2.0.$$

* * * * *

UNITED STATES PATENT AND TRADEMARK OFFICE
CERTIFICATE OF CORRECTION

PATENT NO. : 8,482,863 B2
APPLICATION NO. : 13/182853
DATED : July 9, 2013
INVENTOR(S) : Tsung-Han Tsai and Hsin-Hsuan Huang It is certified that error appears in the above-identified patent and that said Letters Patent is hereby corrected as shown below:

In the Drawings

Delete Drawing Sheets 2-22 and substitute therefore with the attached Drawing Sheets 2-22 consisting of replacement FIGS. 1B-11B.

Signed and Sealed this
Thirteenth Day of May, 2014

Michelle K. Lee
*Deputy Director of the United States Patent and Trademark Office*